(12) United States Patent
Wang

(10) Patent No.: US 12,538,946 B2
(45) Date of Patent: Feb. 3, 2026

(54) ATOMIZING MODULES, POWER SUPPLY MODULES, AND AEROSOL GENERATING DEVICES

(71) Applicant: YIBLA (USA) TECHNOLOGY CO., LTD., City of Industry, CA (US)

(72) Inventor: Guangrui Wang, ShenZhen (CN)

(73) Assignee: YIBLA (USA) TECHNOLOGY CO., LTD., City of Industry, CA (US)

( * ) Notice: Subject to any disclaimer, the term of this patent is extended or adjusted under 35 U.S.C. 154(b) by 0 days.

(21) Appl. No.: 19/038,576

(22) Filed: Jan. 27, 2025

(65) Prior Publication Data
US 2026/0013570 A1    Jan. 15, 2026

(30) Foreign Application Priority Data

| Jul. 15, 2024 | (CN) | ............................ 202421673228.2 |
| Jul. 17, 2024 | (CN) | ............................ 202410964755.7 |
| Aug. 6, 2024 | (CN) | ............................ 202421893806.3 |
| Aug. 19, 2024 | (CN) | ............................ 202422012154.4 |
| Aug. 20, 2024 | (CN) | ............................ 202422026714.1 |

(Continued)

(51) Int. Cl.
*A24F 40/53* (2020.01)
*A24F 7/02* (2006.01)
(Continued)

(52) U.S. Cl.
CPC ............... *A24F 40/53* (2020.01); *A24F 7/02* (2013.01); *A24F 40/10* (2020.01); *A24F 40/42* (2020.01);
(Continued)

(58) Field of Classification Search
None
See application file for complete search history.

(56) References Cited

U.S. PATENT DOCUMENTS

| 9,451,791 B2 | 9/2016 | Sears et al. |
| 11,547,149 B2 | 1/2023 | Qiu et al. |
| | (Continued) | |

FOREIGN PATENT DOCUMENTS

| CN | 105077592 A | 11/2015 |
| CN | 208957008 U | 6/2019 |
| | (Continued) | |

*Primary Examiner* — Philip Y Louie
*Assistant Examiner* — Nicole A Szumigalski
(74) *Attorney, Agent, or Firm* — Fish & Richardson P.C.

(57) ABSTRACT

Atomizing modules, power supply modules and an aerosol generating devices are provided. In one aspect, an aerosol generating device includes an atomizing module for atomizing a liquid aerosol-forming substrate and a power supply module for providing electric energy for the atomizing module. The atomizing module has: a first end face and a second end face opposite to each other along a first height direction, and a first side wall located between the first end face and the second end face along a first circumferential direction. The power supply module has: a third end face and a fourth end face opposite to each other along a second height direction, and a second side wall located between the third end surface and the fourth end surface along a second circumferential direction. The second side wall of the power supply module is detachably connected to the first side wall of the atomizing module.

29 Claims, 39 Drawing Sheets

(30) Foreign Application Priority Data

Sep. 2, 2024 (CN) .................. 202422147613.X
Oct. 15, 2024 (CN) .................. 202422497040.3
Oct. 17, 2024 (CN) .................. 202411456907.9
Jan. 16, 2025 (CN) .................. 202510080385.5

(51) Int. Cl.

| | | |
|---|---|---|
| A24F 40/10 | (2020.01) | |
| A24F 40/42 | (2020.01) | |
| A24F 40/485 | (2020.01) | |
| A24F 40/51 | (2020.01) | |
| A24F 40/60 | (2020.01) | |
| A24F 40/65 | (2020.01) | |
| A24F 40/90 | (2020.01) | |
| H05K 5/00 | (2006.01) | |
| H05K 7/14 | (2006.01) | |
| A61M 15/06 | (2006.01) | |

(52) U.S. Cl.

CPC ............ *A24F 40/485* (2020.01); *A24F 40/51* (2020.01); *A24F 40/60* (2020.01); *A24F 40/65* (2020.01); *A24F 40/90* (2020.01); *H05K 5/0086* (2013.01); *H05K 7/1427* (2013.01); *A61M 15/06* (2013.01)

(56) References Cited

U.S. PATENT DOCUMENTS

| | | | | |
|---|---|---|---|---|
| 2015/0077981 | A1* | 3/2015 | Cormack | A24F 40/70 29/874 |
| 2017/0196264 | A1* | 7/2017 | Liu | A24F 40/60 |
| 2017/0325503 | A1* | 11/2017 | Liu | A24F 40/485 |
| 2020/0260780 | A1* | 8/2020 | Bessant | G06F 1/1652 |
| 2020/0352232 | A1* | 11/2020 | An | F21V 31/005 |
| 2021/0106059 | A1* | 4/2021 | Wang | A24F 40/485 |
| 2022/0046993 | A1* | 2/2022 | Liu | A24F 40/10 |
| 2022/0346459 | A1* | 11/2022 | Qiu | A24F 40/95 |
| 2022/0361581 | A1* | 11/2022 | Lin | G06F 21/44 |
| 2023/0225403 | A1* | 7/2023 | Chen | A24F 40/485 131/330 |
| 2024/0292887 | A1* | 9/2024 | Li | A24F 40/53 |
| 2024/0306708 | A1* | 9/2024 | Wakabayashi | A24F 47/00 |
| 2024/0398010 | A1* | 12/2024 | Cannell | H05B 3/42 |
| 2025/0311789 | A1* | 10/2025 | Zhou | G09F 9/33 |

FOREIGN PATENT DOCUMENTS

| | | |
|---|---|---|
| CN | 209058135 U | 7/2019 |
| CN | 210809277 U | 6/2020 |
| CN | 211672480 U | 10/2020 |
| CN | 113693297 A | 11/2021 |
| CN | 215347031 U | 12/2021 |
| CN | 216983581 U | 7/2022 |
| CN | 115517416 A | 12/2022 |
| CN | 218418450 U | 2/2023 |
| CN | 106263034 B | 9/2023 |
| CN | 219741851 U | 9/2023 |
| CN | 219741865 U | 9/2023 |
| CN | 219741877 U | 9/2023 |
| CN | 117137201 A | 12/2023 |
| CN | 117426564 A | 1/2024 |
| CN | 117530495 A | 2/2024 |
| CN | 221128833 U | 6/2024 |
| CN | 118266659 A | 7/2024 |
| CN | 118300228 A | 7/2024 |
| CN | 118302074 A | 7/2024 |
| CN | 118402650 A | 7/2024 |

\* cited by examiner

ATOMIZING MODULES, POWER SUPPLY MODULES, AND AEROSOL GENERATING DEVICES

CROSS-REFERENCE TO RELATED APPLICATIONS

The present disclosure claims the priority of Chinese patent application No. 202421673228.2 filed on Jul. 15, 2024, entitled "Bendable Display Assembly and Aerosol Generating Device"; Chinese patent application No. 202410964755.7 filed on Jul. 17, 2024, entitled "Aerosol Generating Device"; Chinese patent application No. 202421893806.3 filed on Aug. 6, 2024, entitled "Flexible Display Assembly and Vapor Fog Generation Device"; Chinese patent application No. 202422012154.4 filed on Aug. 19, 2024, entitled "Aerosol Generating Device"; Chinese patent application No. 202422026714.1 filed on Aug. 20, 2024, entitled "Power Supply Device and Aerosol Generation System"; Chinese patent application No. 202422147613.X filed on Sep. 2, 2024, entitled "Aerosol Generation Device"; Chinese patent application No. 202422497040.3 filed on Oct. 15, 2024, entitled "Atomization Module and Electronic Atomization Device"; Chinese patent application No. 202411456907.9 filed on Oct. 17, 2024, entitled "Atomization Module and Aerosol Generating Device"; and Chinese patent application No. 202510080385.5 filed on Jan. 16, 2025, entitled "Atomizing modules, Power Supply Modules and Aerosol Generation Devices." The entire contents of these applications are incorporated herein by reference.

TECHNICAL FIELD

The present disclosure relates to the field of electronic atomizing technology, particularly to atomizing modules, power supply modules and aerosol generating devices.

BACKGROUND

An aerosol generating device is an electronic device capable of atomizing liquid aerosol-forming substrate such as e-liquid and medicinal liquid into aerosols by means of electric heating.

SUMMARY

Implementations of the present disclosure provides atomizing modules, power supply modules, and aerosol generating devices, which can address the technical problem of high cost of use of closed disposable electronic atomizing products.

One aspect of the present disclosure features an aerosol generating device, including: an atomizing module and a power supply module. The atomizing module includes a first housing, an atomizing core, and a first electrode assembly. The first housing has a first end face and a second end face opposite to each other along a height direction of the first housing, and the first housing has a first side wall located between the first end face and the second end face along a circumferential direction of the first housing. An interior of the first housing is provided with an airway and a storage cavity for storing a liquid aerosol-forming substrate, and the atomizing core is disposed in an airflow path of the airway and is in communication with the storage cavity. The first electrode assembly is electrically connected to the atomizing core, and a portion of the first electrode assembly is exposed on the first side wall. The power supply module includes a second housing, a battery, and a second electrode assembly. The second housing has a third end face and a fourth end face opposite to each other along a height direction of the second housing, and the second housing has a second side wall located between the third end face and the fourth end face along a circumferential direction of the second housing. The battery is mounted in the second housing and is electrically connected to the second electrode assembly, a portion of the second electrode assembly is exposed on the second side wall, and the second side wall is detachably connected to the first side wall and the second electrode assembly is in electrical contact with the first electrode assembly.

In some implementations, the atomizing module further includes a first control circuit board mounted in the first housing. The first control circuit board is electrically connected to the atomizing core, and the first electrode assembly, respectively. The first electrode assembly includes a first positive electrode, a first negative electrode, and a first communication electrode that are spaced apart from each other. The power supply module further includes a second control circuit board mounted in the second housing, and the second control circuit board is electrically connected to the battery and the second electrode assembly, respectively. The second electrode assembly includes a second positive electrode, a second negative electrode, and a second communication electrode that are spaced apart from each other. The second positive electrode is electrically in contact with the first positive electrode, the second negative electrode is electrically in contact with the first negative electrode, and the second communication electrode is in electrical contact with the first communication electrode.

In some implementations, the first control circuit board is configured to transmit pre-stored first inspection information to the second control circuit board after the first negative electrode is in contact with the second negative electrode and the first communication electrode is in contact with the second communication electrode, and where the second control circuit board is configured to: in response to determining that the first inspection information matches a pre-stored second inspection information, establish an electrical connection between the second positive electrode and the battery, and in response to determining that the first inspection information does not match the second inspection information, perform at least one of disconnecting the electrical connection between the second positive electrode and the battery, or outputting a prompt message.

In some implementations, the atomizing module further includes: an airflow sensor for detecting changes in airflow of the airway, and the airflow sensor is mounted in the first housing, where the first control circuit board includes a first control unit and a first switch tube, the first control unit is respectively electrically connected to the first switch tube, the airflow sensor, the atomizing core, the first negative electrode, and the first communication electrode, and the first switch tube is electrically connected to the atomizing core and the first positive electrode, respectively, where the second control circuit board includes a second control unit and a second switch tube, the second control unit is electrically connected to the battery, the second switch tube, the second negative electrode, and the second communication electrode, respectively, and the second switch tube is electrically connected to the battery and the second positive electrode, respectively, where the first control unit is configured to: transmit the first inspection information to the second control unit after the first negative electrode is in contact with the second negative electrode and the first communication electrode is in contact with the second communication electrode, and control the first switch tube to be turned on when the second positive electrode is in a conductive state with the battery and the first control unit receives a suction signal sent by the airflow sensor, and where the second control unit is configured to: in response to determining that the first inspection information matches the second inspection information, control the second switch tube to be turned on, and in response to determining that the first inspection information does not match the second inspection information, perform at least one of controlling the second switch tube to be turned off or outputting a prompt message.

In some implementations, the power supply module further includes a second control circuit board mounted in the second housing, a display assembly for displaying visual information, and a protective shell including a light-transmitting material, where the second control circuit board is electrically connected to the battery, the second electrode assembly, and the display assembly, respectively, and where the display assembly is mounted on a circumferential side wall of the second housing other than the second side wall, and the protective shell is mounted on the second housing and covers the display assembly.

In some implementations, the second housing includes a body portion and a side panel portion with the second side wall, where the body portion has the third end face, the fourth end face, and an opening toward the first side wall, and a side of the side panel portion facing away from the second side wall is fixed at the opening, where the battery and the second control circuit board are both disposed in the body portion, and where the display assembly is disposed on a circumferential side wall of the body portion, the protective shell is arranged to wrap around the body portion, and the protective shell is snap-fit connected to the side panel portion.

In some implementations, at least two first snap portions and at least two second snap portions are provided on the side of the side panel portion back to the second side wall, the at least two first snap portions are arranged at intervals along a width direction of the side panel portion, and the at least two second snap portions are arranged at intervals along a height direction of the side panel portion, where at least two first snap holes are provided on the body portion, a first inner wall of the protective shell facing the third end face and a second inner wall of the protective shell facing the fourth end face are both provided with at least one second snap hole, and where the at least two first snap portions are snap-fitted with the at least two first snap holes in one-to-one correspondence; each of the at least two second snap portions is snap-fitted with each of the at least two second snap holes in one-to-one correspondence.

In some implementations, the second housing further has three third side walls located between the third end face and the fourth end face along the circumferential direction of the second housing, where the display assembly includes a flexible display, and the display assembly is mounted on the second housing along the circumferential direction of the second housing and covers the three third side walls, and where one of the three third side walls is disposed back-to-back with the second side wall along a first direction of the second housing, and the remaining two of the three third side walls are disposed back-to-back with each other along a second direction of the second housing; the first direction, the second direction, and the height direction of the second housing are mutually perpendicular to each other.

In some implementations, an outer surface of the second housing is provided with a mounting groove extending along the circumferential direction of the second housing, a groove wall surface of the mounting groove includes the three third side walls, and the display assembly is fixed in the mounting groove and covers the three third side walls, and where a gap between an inner surface of the protective shell and the side surface of the display assembly back to the second housing has a size in a range from 0.1 mm to 2 mm.

In some implementations, along the height direction of the second housing, the display assembly has a first edge and a second edge opposite to each other, and where a minimum vertical height between the first edge and the second edge is h1, a maximum vertical height between the first edge and the second edge is h2, and a vertical height between the third end face and the fourth end face is h3, and where $0.5h3 \leq h1 \leq 0.9h3$ and $0.5h3 \leq h2 \leq 0.9h3$.

In some implementations, the power supply module further includes a charging interface and a switch button, and where the charging interface is electrically connected to the second control circuit board, the fourth end face is provided with a penetration hole in communication with an external environment, the charging interface is provided in correspondence to the penetration hole, and the switch button is exposed on an outer surface of the second housing and is electrically connected to the second control circuit board.

In some implementations, the atomizing module further includes a liquid storage cup and a mouthpiece assembly, and where the airway includes an atomizing channel, and a mouthpiece mounting port is provided at a top of the first housing, where the liquid storage cup is installed in the first housing, an interior of the liquid storage cup is provided with the atomizing channel and the storage cavity, where the atomizing core is installed in the atomizing channel, and where the liquid storage cup is provided with a liquid injection hole at the top of the liquid storage cup and opposite to the mouthpiece mounting port, the liquid injection hole being in communication with the storage cavity, and where the mouthpiece assembly includes a mouthpiece body with a suction channel and a seal disposed within the mouthpiece body, where the mouthpiece body is detachably connected to the mouthpiece mounting port and the suction channel is in communication with the atomizing channel, and where the seal is configured to seal the liquid injection hole.

In some implementations, the mouthpiece body is rotationally connected to the mouthpiece mounting port and is capable of being rotated to a first position and a second position relative to the first housing, where an outer peripheral wall of the mouthpiece body is convexly provided with a limiting protrusion, and an inner peripheral wall of the mouthpiece mounting port is convexly provided with a step portion, and where the step portion is provided with a notch capable of being passed through by the limiting protrusion, and where: when the mouthpiece body is rotated to the first position, the seal covers an orifice of the liquid injection hole and the limiting protrusion is misaligned with the notch to enable the limiting protrusion to abut against a side surface of the step portion facing the liquid storage cup, and when the mouthpiece body is rotated to the second position, the limiting protrusion is positioned opposite to the notch to enable the limiting protrusion to pass through the notch in a direction away from the liquid storage cup.

In some implementations, the aerosol generating device further including at least one first magnetic member fixed on the first side wall, and at least one second magnetic member fixed on the second side wall, where the at least one first magnetic member and the at least one second magnetic member are attracted to each other, and where the atomizing module further includes: a mouthpiece assembly and a liquid storage cup installed in the first housing, where the mouthpiece assembly is connected to the first end face and is in communication with the airway, and the airway includes an atomizing channel, where the liquid storage cup includes a top cover, a bottom cover, an air tube with the atomizing channel and a cup body that is hollow and through, the top cover being fitted to a top end of the cup body, the bottom cover being fitted to a bottom end of the cup body, where the top cover is provided with a first mounting hole, the bottom cover is provided with a second mounting hole, and a first end of the air tube is sealed and fitted into the first mounting hole and a second end of the air tube is sealed and fitted into the second mounting hole, and where the top cover, the bottom cover, the air tube and the cup body together define the storage cavity, a liquid inlet hole communicated with the storage cavity is arranged on the side wall of the air tube, and the atomizing core is mounted in the air tube and covers the liquid inlet hole.

In some implementations, the storage cavity is provided with a liquid storage cotton that is arranged to cover the liquid inlet hole, and where a side of the top cover facing the bottom cover is provided with a protruding block that is located in the storage cavity, and where, along a height direction of the cup body, there is a first minimum distance H1 between an end face of the protruding block backing away from the top cover and a side surface of the liquid storage cotton facing the protruding block, and a second minimum distance H2 between a hole wall of the liquid inlet hole and a side surface of the liquid storage cotton facing the bottom cover, and where H1≤ H2.

In some implementations, the first side wall is provided with a protruding portion, an end surface of the first electrode assembly is exposedly disposed on the protruding portion, and the second side wall is concavely disposed with a limiting groove adapted to the protruding portion, and where the second electrode assembly is exposedly disposed inside the limiting groove, and the protruding portion fits in the limiting groove.

Another aspect of the present disclosure features An atomizing module, including: a first housing, where a top of the first housing is provided with a mouthpiece mounting port, and the first housing has a bottom wall or a circumferential side wall; a liquid storage cup mounted in the first housing, where an interior of the liquid storage cup is provided with an atomizing channel and a storage cavity for storing a liquid aerosol-forming substrate, and where a liquid injection hole in communication with the storage cavity is provided at an top of the liquid storage cup, and the liquid injection hole is provided opposite to the mouthpiece mounting port; an atomizing core arranged in the atomizing channel and is in communication with the storage cavity; a first electrode assembly exposedly arranged on the bottom wall or the circumferential side wall of the first housing, where the first electrode assembly is electrically connected to the atomizing core; and a mouthpiece assembly including a mouthpiece body having a suction channel and a seal disposed within the mouthpiece body, where the mouthpiece body is detachably connected to the mouthpiece mounting port and the suction channel is in communication with the atomizing channel, and where the seal is configured to seal the liquid injection hole, where the atomizing module is configured to be detachably combined with a power supply module that includes a second housing, a battery and a second electrode assembly, where the battery is mounted in the second housing and is electrically connected to the second electrode assembly, and the second electrode assembly is exposedly disposed on the second housing, and where the bottom wall or the circumferential side wall of the first housing is configured to detachably connect to the second housing of the power supply module, and where the first electrode assembly is configured to be in electrical contact with the second electrode assembly of the power supply module.

In some implementations, the mouthpiece body is rotatably connected to the mouthpiece mounting port and is capable of being rotated to a first position and a second position relative to the first housing, an outer peripheral wall of the mouthpiece body is convexly provided with a limiting protrusion and an inner peripheral wall of the mouthpiece mounting port is convexly provided with a step portion, and the step portion is provided with a notch capable of being passed through by the limiting protrusion, and where: when the mouthpiece body is rotated to the first position, the seal covers an orifice of the liquid injection hole and the limiting protrusion is misaligned with the notch, such that the limiting protrusion is capable of abutting against a side surface of the step portion facing the liquid storage cup, and when the mouthpiece body is rotated to the second position, the limiting protrusion is positioned opposite to the notch, such that the limiting protrusion is capable of passing through the notch in a direction away from the liquid storage cup.

In some implementations, a material of the seal includes at least one of silicone, rubber, silicone rubber, or liquid-absorbent cotton, and where the seal has an annular structure with an air vent, and the air vent is respectively in corresponding communication with the suction channel and the atomizing channel.

In some implementations, the liquid storage cup includes a top cover, a bottom cover, an air tube with the atomizing channel, and a cup body that is hollow and through, the top cover being fitted to a top end of the cup body, the bottom cover being fitted to a bottom end of the cup body, where the top cover is provided with the liquid injection hole and a first mounting hole arranged at intervals from the liquid injection hole, the bottom cover is provided with a second mounting hole, and a first end of the air tube is sealed and fitted into the first mounting hole and a second end of the air tube is sealed and fitted into the second mounting hole, and where the top cover, the bottom cover, the air tube and the cup body together define the storage cavity, a liquid inlet hole communicated with the storage cavity is arranged on a side wall of the air tube, the atomizing core is mounted in the air tube and covers the liquid inlet hole, a side of the top cover facing away from the bottom cover is provided with an annular groove, a lower end of the mouthpiece body is rotated to fit into the annular groove, an inlet end of the suction channel is correspondingly in communication with the first mounting hole, and the seal is in contact with the top cover and covers an orifice of the liquid injection hole.

In some implementations, the atomizing module further including a liquid storage cotton arranged in the storage cavity, where the liquid storage cotton is arranged to cover the liquid inlet hole, and a spacing between a side surface of the top cover facing the bottom cover and a side surface of the liquid storage cotton facing the top cover has a size in a range from 4 mm to 12 mm.

A further aspect of the present disclosure features a power supply module for being detachably combined with an atomizing module that includes a first housing, an atomizing core and a first electrode assembly, the power supply module including: a second housing; a battery mounted in the second housing; a control circuit board mounted in the second housing and electrically connected to the battery; a second electrode assembly electrically connected to the control circuit board, where the second electrode assembly is configured to be in electrical contact with the first electrode assembly; a display assembly for displaying visual information, where the display assembly is electrically connected to the control circuit board; and a protective shell made of a light-transmitting material, where the protective shell is mounted on the second housing and covers the display assembly, where the first housing of the atomizing module has a first end surface and a second end surface opposite to each other along a height direction of the first housing, and the first housing has a first side wall located between the first end surface and the second end surface along a circumferential direction of the first housing, and where an interior of first housing is provided with an airway and a storage cavity for storing a liquid aerosol-forming substrate, the atomizing core is mounted in an air flow path of the airway and is in communication with the storage cavity, and the first electrode assembly is disposed exposedly on the first side wall and is electrically connected to the atomizing core, where the second housing of the power supply module has a third end face and a fourth end face opposite to each other along a height direction of the second housing, the second housing has a second side wall and three third side walls, which are located between the third end face and the fourth end face along a circumferential direction of the second housing, and where the second electrode assembly of the power supply module is disposed exposedly on the second side wall, and where the second side wall of the second housing is configured to detachably connect with the first side wall of the atomizing module, one of the three third side walls and the second side wall are disposed back-to-back with each other along a first direction of the second housing, and remaining two of the three third side walls are disposed back-to-back with each other along a second direction of the second housing, and the first direction, the second direction, and a height direction of the second housing are mutually perpendicular to each other.

In some implementations, the second housing includes: a body portion and a side panel portion having the second side wall, where the body portion has the third end face, the fourth end face, the three third side walls, and an opening for mounting of the side panel portion, and a side of the side panel portion facing away from the second side wall is fixed at the opening, where the battery and the control circuit board are both mounted within the body portion, the display assembly is mounted on the body portion, the protective shell is arranged to wrap around the body portion, and the protective shell is snap-fit connected to the side panel portion.

In some implementations, the power supply module further including: at least two first snap portions and at least two second snap portions that are provided on a side of the side panel portion facing away from the second side wall, where the at least two the first snap portions are spaced along a width direction of the side panel portion, and the at least two the second snap portions are spaced along a height direction of the side panel portion, and where at least two first snap holes are provided on the body portion, an inner wall of the protective shell facing the third end face and the inner wall of the protective shell facing the fourth end face are both provided with at least one second snap hole, the at least two first snap portions are snap-fitted in one-to-one correspondence with the at least two first snap holes, and each of the at least two second snap portions is snap-fitted in one-to-one correspondence with each of the at least two second snap holes.

In some implementations, the display assembly is a flexible display, where an outer surface of the second housing is provided with a mounting groove extending along the circumferential direction of the second housing, and a groove wall surface of the mounting groove includes the three third side walls, and where the display assembly is fixed in the mounting groove and covers at least two of the three third side walls.

In some implementations, along the height direction of the second housing, the display assembly has a first edge and a second edge opposite to each other, and where a minimum vertical height between the first edge and the second edge is h1, a maximum vertical height between the first edge and the second edge is h2, and a vertical height between the third end face and the fourth end face is h3, and where $0.5h3 \le h1 \le 0.9h3$, and $0.5h3 \le h2 \le 0.9h3$.

In some implementations, the display assembly includes: a display diaphragm made of a flexible material and a flexible printed circuit board with circuit traces, where the display assembly includes a plurality of light-emitting elements arranged on a first side of the flexible printed circuit board, the plurality of light-emitting elements being electrically connected to the circuit traces, where a second side of the flexible printed circuit board facing away from the plurality of light-emitting elements is connected to the second housing and covers the three third side walls, where the circuit traces is electrically connected to the control circuit board, where the display diaphragm is fixedly connected to the first side of the flexible printed circuit board and covers each of the plurality of light-emitting elements, the display diaphragm has a plurality of light transmitting regions for light emitted by the plurality of light-emitting elements to pass through, and a region of the display diaphragm other than the plurality of light transmitting regions is a light shielding region, and where a gap between an inner surface of the protective shell and the display diaphragm has a size in a range from 0.1 mm to 2 mm.

In some implementations, a gap between an inner surface of the protective shell and a side surface of the display assembly back to the second housing has a size in a range from 0.1 mm to 2 mm.

In some implementations, the power supply module further including a charging interface and a switch button, where the charging interface is electrically connected to the control circuit board, the fourth end face is provided with a penetration hole, and the charging interface is provided in correspondence to the penetration hole, and where the switch button is exposedly arranged on an outer surface of the second housing and is electrically connected to the control circuit board.

The details of one or more implementations of the subject matter of this present disclosure are set forth in the accompanying drawings and the description below. Other features, aspects, and advantages of the subject matter can become apparent from the description, the drawings, and the claims.

BRIEF DESCRIPTION OF DRAWINGS

The accompanying drawings, which are incorporated herein and form a part of the present disclosure, illustrate aspects of the present disclosure and, together with the description, further serve to explain the principles of the present disclosure and to enable a person of ordinary skill in the pertinent art to make and use the present disclosure.

Figure 1:
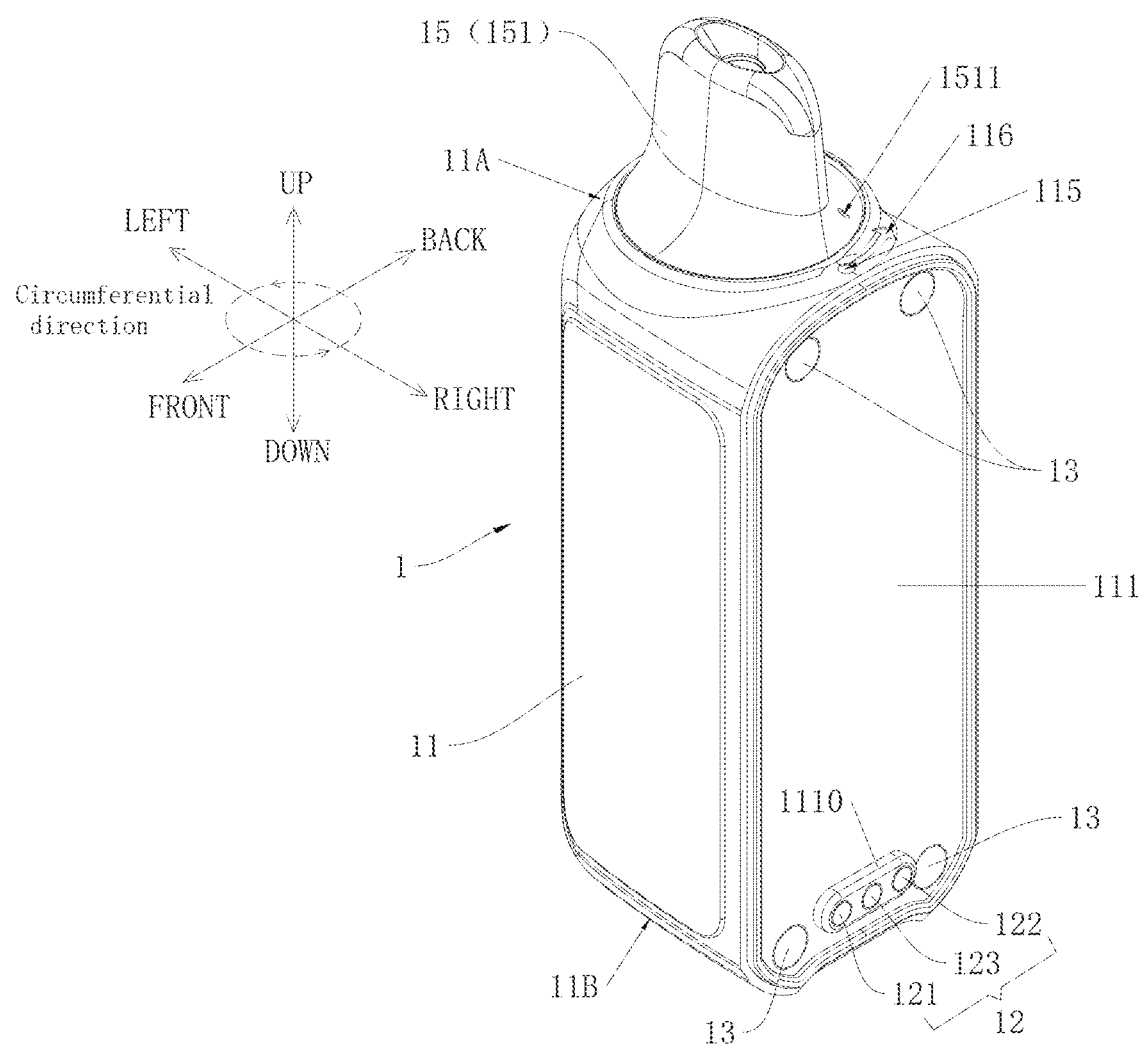
FIG. 1 is a schematic diagram of a three-dimensional structure of an example atomizing module when a mouthpiece assembly is in a first position in a first embodiment of the present disclosure.
Figure 2:
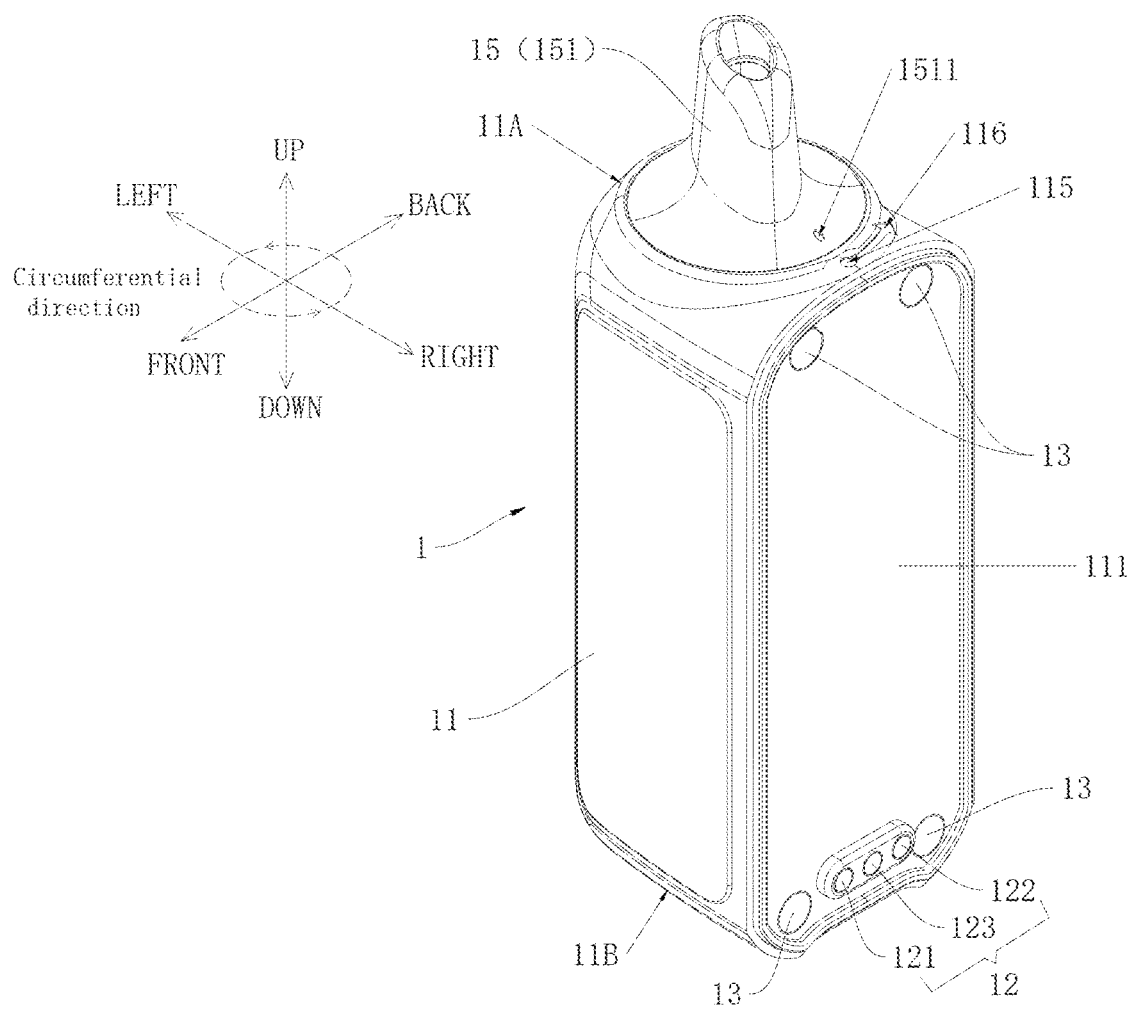
FIG. 2 is a schematic diagram of the three-dimensional structure of the atomizing module of FIG. 1 when the mouthpiece assembly is in a second position in the first embodiment of the present disclosure.

Like reference numbers and designations in the various drawings indicate like elements. It is also to be understood that the various exemplary implementations shown in the figures are merely illustrative representations and are not necessarily drawn to scale. The realization of the purpose of the present disclosure, functional features and advantages can be further described in conjunction with the embodiments and with reference to the accompanying drawings.

Attachment Label Description:

1—atomizing module; 10A—first airway; 10A1—air intake hole; 10—liquid storage cup; 101—top cover; 1011—first mounting hole; 1012—liquid injection hole; 1013—vent hole; 1014—annular groove; 1015—protruding block; 102—bottom cover; 1021—second mounting hole; 103—air tube; 1031—atomizing channel; 1032—liquid inlet hole; 104—cup body; 1041—storage cavity; 105—liquid storage cotton; 11—first housing; 11A—first end face; 11B—second end face; 110—mouthpiece mounting port; 111—first side wall; 1110—first protruding portion; 111A—second protruding portion; 112—step portion; 1120—notch; 113—first blocking bulge; 114—second blocking bulge; 1141—blocking surface; 114A—anti-rotation protrusion; 115—second marking groove; 116—arrow indicating groove; 117—air inlet channel; 118—first body portion; 1180—first snap hole; 1181—first opening; 119—first side panel portion; 1191—first snap portion; 12—first electrode assembly; 121—first positive electrode; 122—first negative electrode; 123—first communication electrode; 13—first magnetic member; 14—atomizing core; 15—mouthpiece assembly; 150—suction channel; 151—mouthpiece body; 1511—first marking groove; 1512—limiting protrusion; 15120—anti-rotation groove; 1513—shaft shoulder portion; 152—seal; 1520—air vent; 16—first control circuit board; 161—first control unit; 162—first switch tube; 17—first airflow sensor; 18—first switch button;

2—power supply module; 20A—second airway; 20A1—outlet end of the second airway; 21—second housing; 21A—third end face; 21B—fourth end face; 211—second side wall; 2110—first limiting groove; 211A—second limiting groove; 212—locating bulge; 213—third side wall; 214—first penetration hole; 215—mounting groove; 216—second body portion; 2160—second snap hole; 2161—second opening; 217—second side panel portion; 2171—second snap portion; 2172—third snap portion; 22—second electrode assembly; 221—second positive electrode; 222—second negative electrode; 223—second communication electrode; 23—second magnetic member; 24—battery; 25—second control circuit board; 251—second control unit; 252—second switch tube; 26—charging interface; 27—display assembly; 2700—locating hole; 2701—first edge; 2702—second edge; 271—flexible printed circuit board; 2710—circuit traces; 2711—first installation area; 2712—second installation area; 272—light-emitting element; 273—flexible reflective layer; 274—flexible light-shading sheet; 2741—light transmission hole; 275—flexible diffusion film; 276—display diaphragm; 2760—flexible display film; 2761—light transmission region; 2762—light shielding region; 277—current input interface; 278—current drive element; 279—metal test point; 27A—reinforcement sheet; 28—protective shell; 280—third snap hole; 281—second penetration hole; 29—second airflow sensor; 210—second switch button.

DETAILED DESCRIPTION

An aerosol generating device can include a storage cavity for storing a liquid aerosol-forming substrate, an atomizing core for heating and atomizing the liquid aerosol-forming substrate, and a battery for providing electrical energy for the atomizing core. The liquid aerosol-forming substrate in the storage cavity can be conducted to the atomizing core through capillary action and/or other means. In the process of inhalation by a user using the aerosol generating device, the battery provides electrical energy for the atomizing core, enabling the atomizing core to be energized and heated, and the heat generated by the energized heat of the atomizing core can atomize the liquid aerosol-forming substrate conducted to the atomizing core into an aerosol that can be inhaled by the user.

In some cases, the aerosol generating device is mostly a closed disposable product. The main characteristics of the type of product are that the atomizing core is not removable, the battery is not removable, and the storage cavity cannot be replenished with liquid aerosol-forming substrate. Once the atomizing core is damaged, or the battery is damaged, or the liquid aerosol-forming substrate in the storage cavity have been consumed by the atomizing core, the whole aerosol generating device is directly scrapped and can only be discarded, which not only increases the user's cost of use, but also is not conducive to environmental protection.

Implementations of the present disclosure provides atomizing modules, power supply modules, and aerosol generating devices, which can address the technical problem of high cost of use of closed disposable electronic atomizing products.

The technical solutions in the embodiments of the present disclosure can be clearly and completely described below in conjunction with the accompanying drawings in the embodiments of the present disclosure. Obviously, the described embodiments are only a part of the embodiments of the present disclosure and not all of them. Based on the embodiments in the present disclosure, all other embodiments obtained by a person of ordinary skill in the art without creative labor fall within the scope of protection of the present disclosure.

It is to be noted that if the embodiments of the present disclosure involve directional indications (such as up, down, left, right, front, back, top, bottom . . . ), the directional indication is only used to explain the relative positional relationship between the various parts and the movement in a particular attitude, etc., and if the particular attitude is changed, the directional indication can be changed accordingly. In addition, the use of the term "a" or "an" in the claims and/or the specification may mean "one," as well as "one or more," "at least one," and "one or more than one." As such, the terms "a," "an," and "the," as well as all singular terms, include plural referents unless the context clearly indicates otherwise. Likewise, plural terms shall include the singular unless otherwise required by context.

Furthermore, in the description of the embodiments of the present disclosure, the terms 'set' (and any forms thereof, such as "sets" and "setting"), 'mount' (and any forms thereof, such as "mounted" and "mounting"), 'connect' (and any forms thereof, such as "connected" and "connecting"), 'fix' (and any forms thereof, such as "fixed" and "fixing"), and the like used to indicate a connection relationship between the various components should be broadly construed unless otherwise expressly specified and limited. For example, it may be a fixed connection, a detachable connection, or a one-piece connection; it may be a mechanical connection, or an electrical connection; it may be a direct connection, or an indirect connection through an intermediate medium. For a person of ordinary skill in the art, the specific meaning of the above terms may be understood according to the specific circumstances.

In addition, if the embodiments of the present disclosure contain descriptions involving "first", "second", etc., the descriptions of "first", "second", etc. are used only for descriptive purposes, and are not to be construed as indicating or implying their relative importance or implicitly specifying the number of technical features indicated. As a result, a feature defined as "first" or "second" may include at least one such feature, either explicitly or implicitly.

In addition, if the term "and/or" appears in the whole text (including the claims), the meaning of the term "and/or" includes three parallel solutions, taking "A and/or B" as an example, including an A solution, or a B solution, or a solution that both A and B satisfy. In addition, a large number of technical features are recorded in the specification of the present disclosure and distributed in various technical schemes. If all possible combinations of technical features (i.e. technical schemes) of the present disclosure are listed, the specification will be too lengthy. In order to avoid this problem, various technical features disclosed in the above summary of the present disclosure, various technical features disclosed in the following implementations and implementations, and various technical features disclosed in the drawings can be freely combined with each other to form various new technical schemes (all of which are deemed to have been recorded in this specification), unless such combination of technical features is not technically feasible. For example, feature A+B+C is disclosed in one example, feature A+B+D+E is disclosed in another example. Features C and D are equivalent technical means that play the same role, only one of which is technically necessary to be chosen, and cannot be used at the same time. Feature E may be technically combined with feature C. Then, the scheme of A+B+C+D should not be considered as already recorded because of the technical infeasibility, while the scheme of A+B+C+E should be considered as already recorded.

FIGS. 1-11 illustrate a relevant structural composition of an atomizing module 1 provided in a first embodiment of the present disclosure. The atomizing module 1 includes a first housing 11, an atomizing core 14, a mouthpiece assembly 15, and a liquid storage cup 10 installed in the first housing 11.

The top of the first housing 11 is provided with a mouthpiece mounting port 110. It should be noted here that, in some implementations, a material of the first housing 11 can be a biodegradable material (such as polylactic acid, polybutylene terephthalate adipate, polyhydroxy fatty acid ester, or polybutylene terephthalate adipate, and so forth), or a plastic, or a metal, which may be determined according to an actual demand of the use. These implementations do not impose any specific limitations on a specific material of the first housing 11. In addition, the first housing 11 can be a one-piece structure or a split structure assembled from different shell structures, and a specific structural form of the first housing 11 can be determined according to the needs of actual use.

In some implementations, e.g., as shown in FIGS. 6-8 and FIG. 10, the first housing 11 includes a first body portion 118 and a first side panel portion 119 having a first side wall 111. The first body portion 118 has a first end face 11A, a second end face 11B, a mouthpiece mounting port 110, and a first opening 1181 for mounting of the first side panel portion 119. The liquid storage cup 10 is mounted in the first body portion 118. At least two first snap portions 1191 are provided on the side of the first side panel portion 119 back to the first side wall. The at least two first snap portions 1191 are spaced apart along the width direction of the first side panel portion 119 (e.g., the front-to-back direction in FIGS. 7-8 and FIG. 10). The inner wall of the first body portion 118 is provided with at least two first snap holes 1180 adjacent to the first opening 1181. Each of the at least two first snap portions 1191 is snap-fitted with each of the at least two first snap holes 1180 in one-to-one correspondence. In some examples, the first snap portion 1191 disposed at the front side of the first side panel portion 119 is snap-fitted with the first snap hole 1180 disposed at the front side of the first body portion 118, and the first snap portion 1191 disposed at the rear side of the first side panel portion 119 is snap-fitted with the first snap hole 1180 disposed at the rear side of the first body portion 118, thereby securing the first side panel portion 119 to the first opening 1181 of the first body portion 118 by a snap connection.

In some implementations, an interior of the liquid storage cup 10 is provided with an atomizing channel 1031 and a storage cavity 1041 for storing a liquid aerosol-forming substrate. The top of the liquid storage cup 10 can be provided with a liquid injection hole 1012 in communication with the storage cavity 1041. The liquid injection hole 1012 can be disposed opposite the mouthpiece mounting port 110.

In some implementations, the mouthpiece assembly 15 includes a mouthpiece body 151 having a suction channel 150 and a seal 152 disposed within the mouthpiece body 151. The mouthpiece body 151 can be detachably connected to the mouthpiece mounting port 110. The seal 152 can be configured to seal the liquid injection hole 1012. The suction channel 150 can be in communication with the atomizing channel 1031. When a user bites the mouthpiece body 151 to suction, a suction airflow can be formed in a path of the atomizing channel 1031 communicating with the suction channel 150.

In some implementations, a material of the seal 152 can be silicone, rubber, silicone rubber, or liquid-absorbent cotton (such as sponge or fiber cotton), or any material as long as it can meet the use of the demand. These examples do not make any specific limitation.

In some implementations, the removable connection between the mouthpiece body 151 and the first housing 11 can be a snap connection, a threaded connection, a plug-in connection, or any suitable connection that can meet the use of demand. The examples do not make any specific limitations. In addition, the material of the mouthpiece body 151 can be plastic or any suitable material, which may be determined according to the actual use requirements. An example material of the mouthpiece body 151 does not make any specific limitations.

The atomizing core 14 can be disposed in the atomizing channel 1031, so that the aerosol generated by the atomizing core 14 can be carried away by the suction airflow formed in the atomizing channel 1031 and discharged to the mouthpiece body 151 for inhalation by the user. The atomizing core 14 can be in communication with the storage cavity 1041 so that the atomizing core 14 can draw liquid aerosol-forming substrate from the storage cavity 1041 for heating and atomizing to generate the aerosol.

In some implementations, based on the above structural design, when the liquid aerosol-forming substrate in the liquid storage cup 10 has been consumed by the atomizing core 14 and it is necessary to replenish the liquid aerosol-forming substrate into the storage cavity 1041, the mouthpiece body 151 can be detached from the first housing 11 (the seal 152 can be detached from the first housing 11 together with the mouthpiece body 151 in the process), so that the liquid injection hole 1012 is exposed. Then, the liquid injection hole 1012 may be injected into the storage cavity 1041 through the liquid injection hole 1012, so as to realize the replenishment of the liquid aerosol-forming substrate. In some cases, the nozzle of the liquid injection bottle containing the liquid aerosol-forming substrate can be extended into the mouthpiece mounting port 110 and inserted into the liquid injection hole 1012. Then the liquid aerosol-forming substrate in the liquid injection bottle can be injected into the storage cavity 1041 by pouring the liquid injection bottle or squeezing the liquid injection bottle. In such a way, the replenishment of the liquid aerosol-forming substrate can be also realized.

After the completion of the replenishment of the liquid aerosol-forming substrate, the mouthpiece body 151 can be installed back to the mouthpiece mounting port 110 of the first housing 11, so that the seal 152 seals the injection hole 1012. Then the atomizing module 1 can be thus enabled to continue to be used. It can be seen that the atomizing module 1 provided in this embodiment can be used repeatedly by replenishing the liquid aerosol-forming substrate through the liquid injection hole 1012 after the liquid aerosol-forming substrate in the storage cavity 1041 has been consumed by the atomizing core 14, so that the atomizing module 1 provided in this embodiment not only enables to lower the user's cost of using the atomizing module 1 but also is conducive to environmental protection.

Furthermore, in this embodiment, the provision of the seal 152 can effectively reduce the risk of leakage of the liquid aerosol-forming substrate in the storage cavity 1041 from the liquid injection hole 1012. Moreover, the seal 152 is provided in the interior of the mouthpiece body 151 and does not extend out from the interior of the mouthpiece body 151. It is difficult for the user's hand to come into contact with the seal 152 during the process of disassembling and reassembling the mouthpiece body 151, which can effectively prevent the user's hand from getting contaminated with the liquid aerosol-forming substrate adhering to the seal 152, thereby avoiding a negative impact on the user's experience with the atomizing module 1.

It should be added here that, in some optional embodiments, the seal 152 can achieve scaling of the liquid injection hole 1012 by partially plugging into the liquid injection hole 1012, where the seal 152 can have a plunger portion that can be plugged into the liquid injection hole 1012. In other optional embodiments, the seal 152 can also achieve sealing of the liquid injection hole 1012 by covering the orifice of the liquid injection hole 1012. With respect to the specific manner in which the seal 152 seals the liquid injection hole 1012, it may be based on the actual use needs, and this embodiment does not make any specific limitation in this regard. In some implementations, the seal 152 achieves sealing of the liquid injection hole 1012 by covering the orifice of the liquid injection hole 1012. Compared with the method of the sealing of the liquid injection hole 1012 by plugging the plunger portion of the seal 152 into the liquid injection hole 1012, since the seal 152 is not plugged into the liquid injection hole 1012, it is difficult for the seal 152 to press the air in the liquid injection hole 1012 into the storage cavity 1041 during the process of completing the replenishment of the liquid aerosol-forming substrate and remounting the mouthpiece body 151 back to the mouthpiece mounting port 110 of the first housing 11. This effectively reduces the risk of the air pressure in the storage cavity 1041 increasing due to the air in the liquid injection hole 1012 being pressed into the storage cavity 1041 by the seal 152, which in turn reduces the risk of the liquid aerosol-forming material in the storage cavity 1041 leaking from the location where the storage cavity 1041 communicates to the atomizing core 14 due to the compression by the air pressure.

Further, in some optional embodiments, a removable connection between the mouthpiece body 151 and the first housing 11 may be achieved as described with further details below.

Referring to FIGS. 1-8, the mouthpiece body 151 can be rotationally connected to the mouthpiece mounting port 110 and is capable of being rotated to a first position and a second position with respect to the first housing 11. The outer peripheral wall of the mouthpiece body 151 can be convexly provided with a limiting protrusion 1512. The inner peripheral wall of the mouthpiece mounting port 110 can be convexly provided with a step portion 112. The step portion 112 can be provided with a notch 1120 capable of being passed through by the limiting protrusion 1512.

Figure 6:
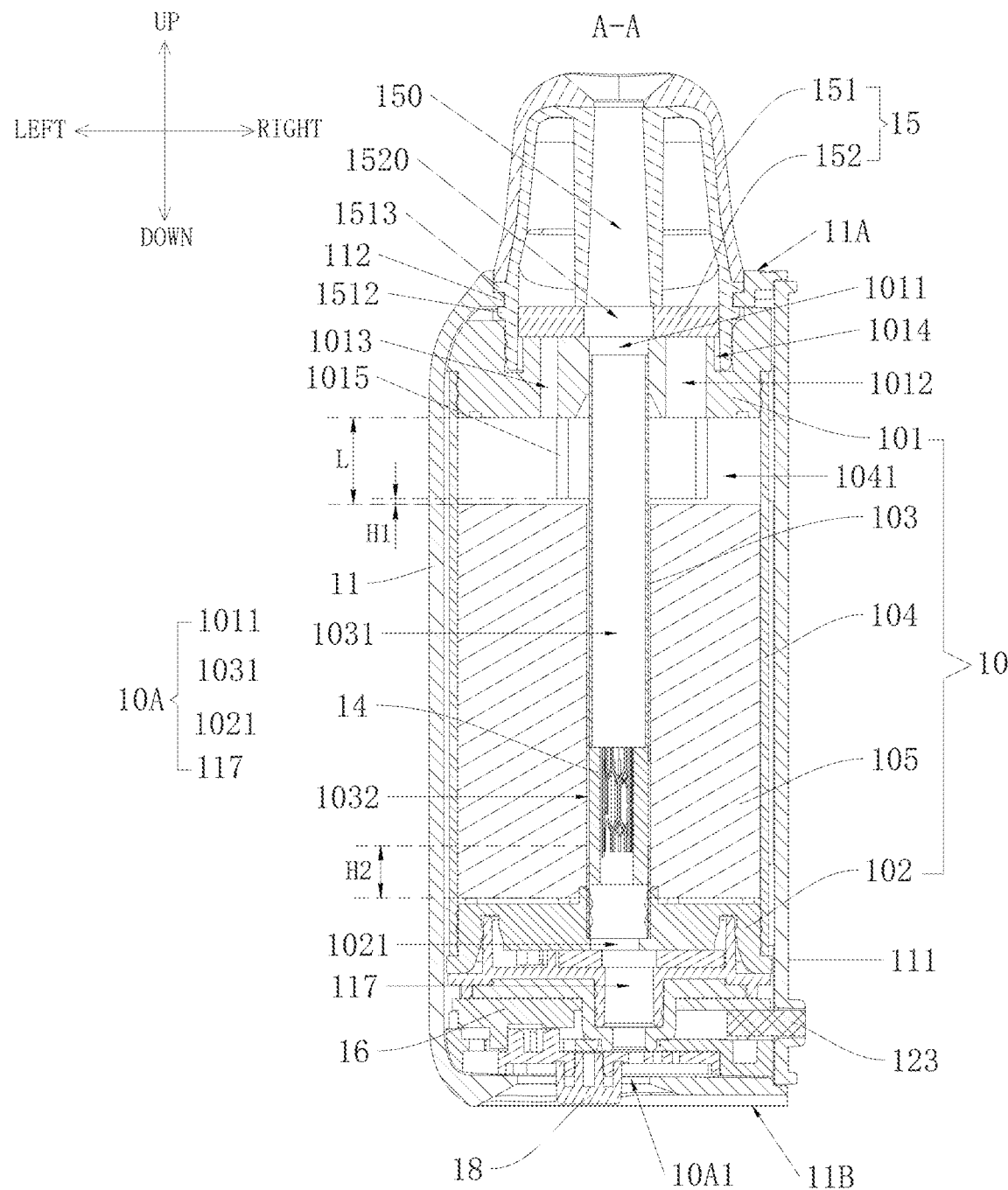
FIG. 6 is a sectional view of FIG. 5 along A-A direction.
Figure 7:
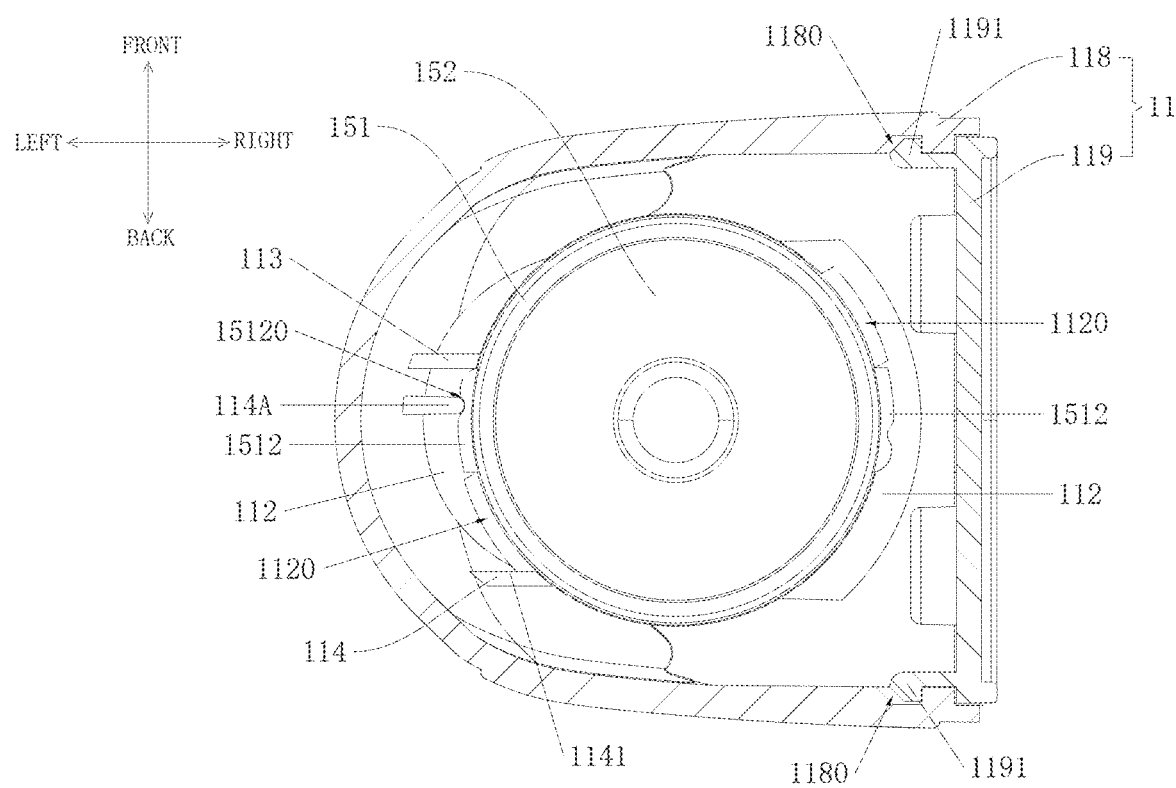
FIG. 7 is a schematic diagram of a relative positional state between a limiting protrusion and a notch when a mouthpiece body is in the first position of FIG. 1 in the first embodiment of the present disclosure.

As shown in FIGS. 6-7, when the mouthpiece body 151 is rotated to the first position, the seal 152 covers the orifice of the liquid injection hole 1012, and the limiting protrusion 1512 is misaligned with the notch 1120 so that the limiting protrusion 1512 is able to abut against the side surface of the step portion 112 facing the liquid storage cup 10. In this case, even if the user applies a force to the mouthpiece body 151 along the direction of departing from the liquid storage cup 10, the user can not be able to pull out the mouthpiece body 151 because the limiting protrusion 1512 of the mouthpiece body 151 is blocked by the step portion 112 of the first housing 11. Therefore, the mouthpiece body 151 can be enabled to be stably retained in the mouthpiece mounting port 110 of the first housing 11, so as to prevent the mouthpiece body 151 from being accidentally detached from the mouthpiece mounting port 110 of the first housing 11, which may affect the user's using experience.

Figure 3:
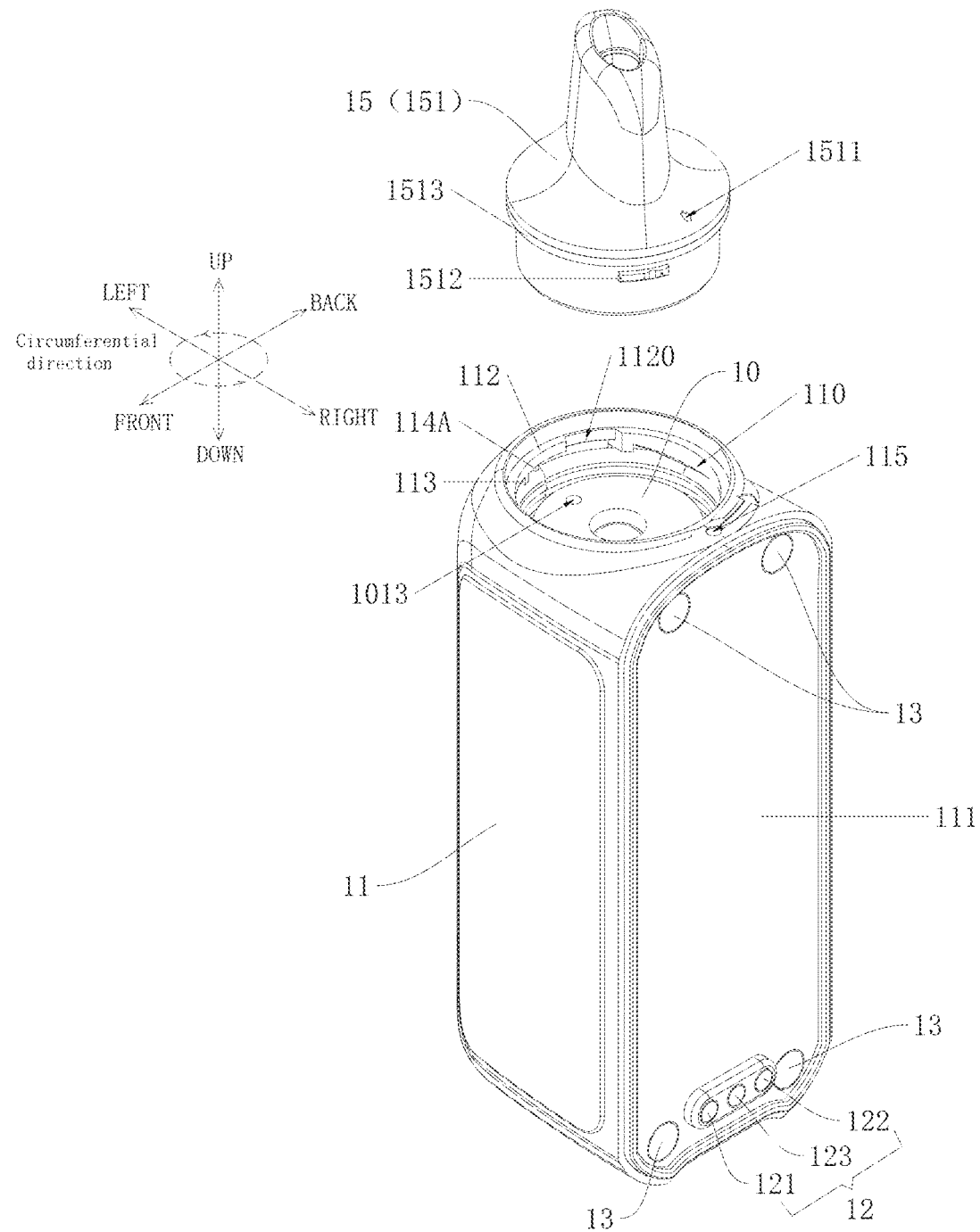
FIG. 3 is a schematic diagram of a state when the mouthpiece assembly of FIG. 1 is removed from a mouthpiece mounting port in the first embodiment of the present disclosure.
Figure 4:
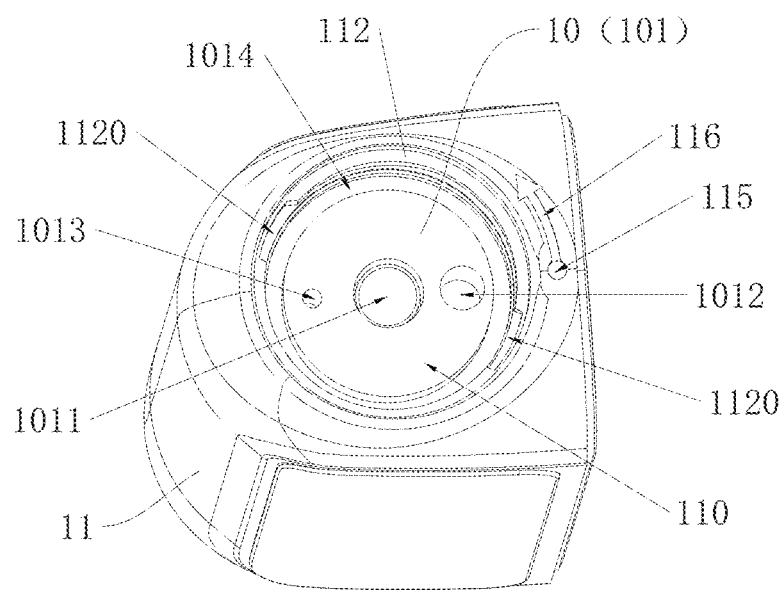
FIG. 4 is a schematic diagram of the three-dimensional structure of the atomizing module of FIG. 1 after the mouthpiece assembly is removed from the mouthpiece mounting port of FIG. 3 in the first embodiment of the present disclosure.
Figure 5:
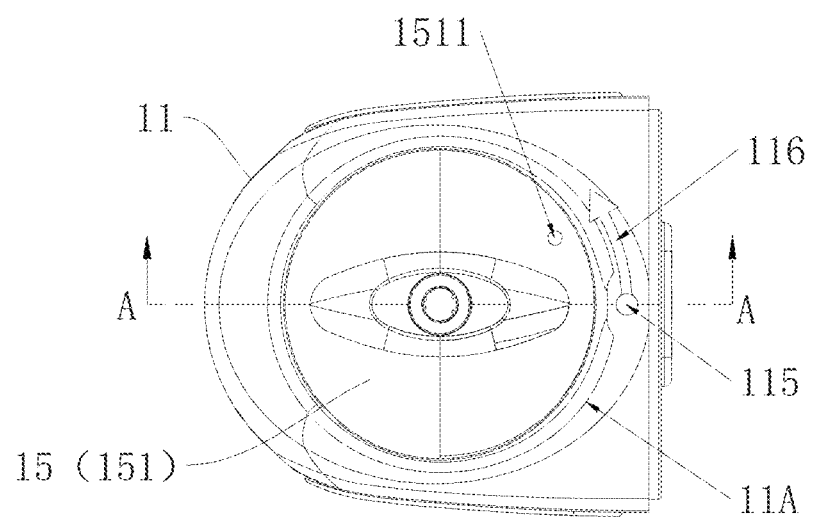
FIG. 5 is a top view of FIG. 1.
Figure 8:
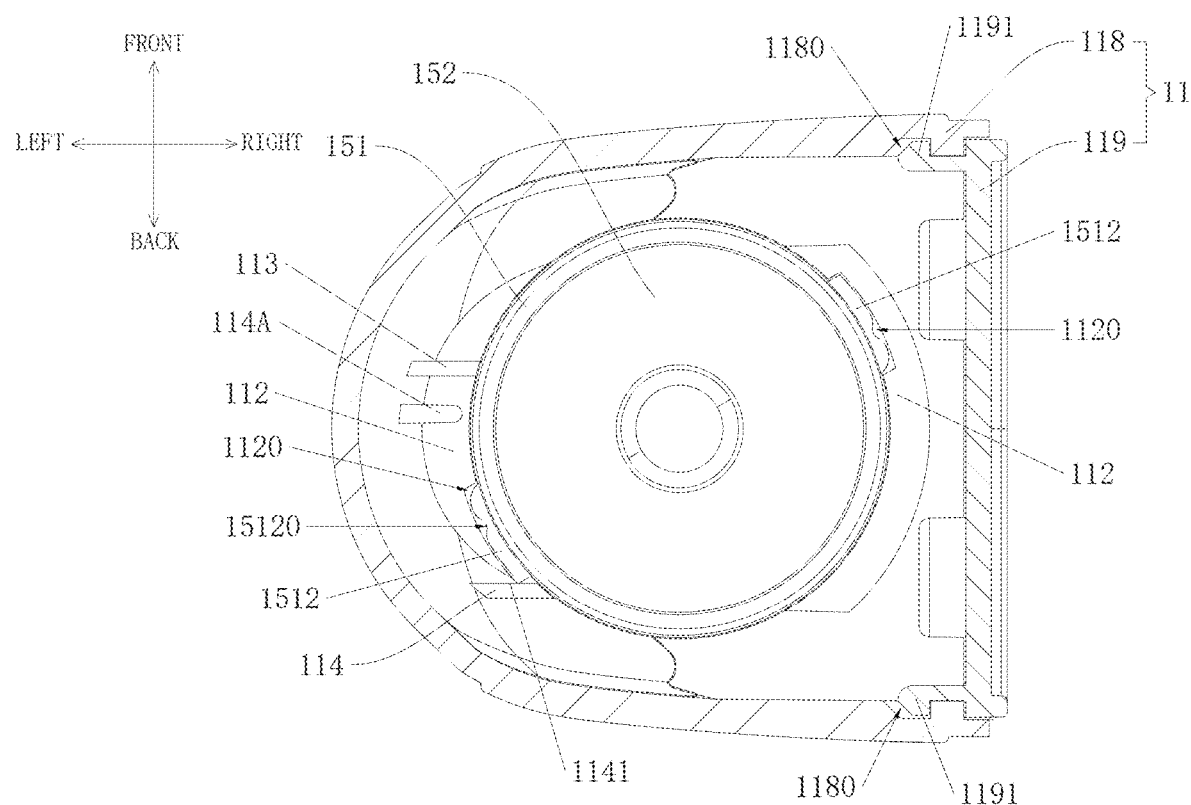
FIG. 8 is a schematic diagram of a relative positional state between the limiting protrusion and the notch when the mouthpiece body is in the second position of FIG. 2 in the first embodiment of the present disclosure.
Figure 9:
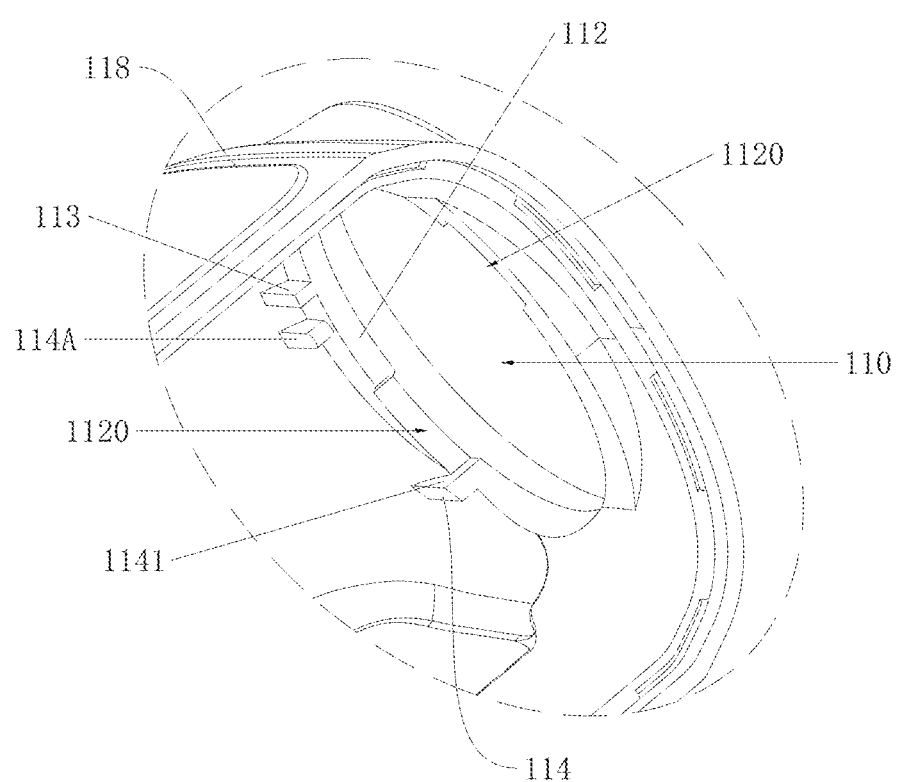
FIG. 9 is a schematic diagram of a partial structure of a first housing at the mouthpiece mounting port of FIG. 3 in the first embodiment of the present disclosure.

As shown in FIGS. 3-4 and FIG. 8, when the mouthpiece body 151 is rotated to the second position, the limiting protrusion 1512 is positioned opposite the notch 1120 so that the limiting protrusion 1512 is able to pass through the notch 1120 in the direction of the backing away from the liquid storage cup 10. In this case, if the user applies a force on the mouthpiece body 151 in the direction of departing from the liquid storage cup 10, because the limiting protrusion 1512 of the mouthpiece body 151 is positioned opposite the notch 1120 of the step portion 112 without being blocked by the step portion 112, the limiting protrusion 1512 can pass through the notch 1120 in the direction of departing liquid storage cup 10, thereby allowing the mouthpiece body 151 to be detached from the mouthpiece mounting port 110 of the first housing 11, thereby allowing the liquid injection hole 1012 to be exposed for subsequent injection of new liquid aerosol-forming substrate into the storage cavity 1041 through the liquid injection hole 1012.

In this embodiment, based on the structural design described above, when the liquid aerosol-forming substrate in the storage cavity 1041 has been consumed by the atomizing core 14 and it is necessary to replenish the liquid aerosol-forming substrate into the storage cavity 1041, the mouthpiece body 151 can be rotated from the first position to the second position, so that the limiting protrusion 1512 of the mouthpiece body 151 is in opposition to the notch 1120 of the step portion 112. Then the mouthpiece body 151 can be pulled out in the direction of departing from the liquid storage cup 10, so that the liquid injection hole 1012 at the top of the liquid storage cup 10 is revealed. And then new liquid aerosol-forming material can be replenished to the storage cavity 1041 through the liquid injection hole 1012. When the liquid aerosol-forming substrate is replenished and it is necessary to reinstall the mouthpiece body 151 back to the mouthpiece mounting port 110 of the first housing 11, the lower end of the mouthpiece body 151 can be first placed into the mouthpiece mounting port 110 and the limiting protrusion 1512 of the mouthpiece body 151 is aligned with the notch 1120 of the step portion 112. And then the mouthpiece body 151 is pushed in the direction close to the liquid storage cup 10, so that the limiting protrusion 1512 passes through the notch 1120 of the step portion 112. Then the mouthpiece body 151 can be rotated from the second position to the first position, so that the limiting protrusion 1512 is misaligned with the notch 1120 of the step portion 112 and the seal 152 seals the liquid injection hole 1012, thereby completing the installation of the mouthpiece body 151. In such a way, the atomizing module 1 can continue to be used. It can be seen that in the technical solution of the present embodiment, the entire disassembly and installation process of the mouthpiece assembly 15 is highly maneuverable and easy to operate.

In this embodiment, it should be noted that the number of the limiting protrusion 1512 and the notch 1120 may be one or more, which can be flexibly set according to the actual use needs, and this embodiment does not make any specific limitations in this regard. In some examples, e.g., as shown in FIGS. 7-8, the number of the limiting protrusion 1512 and the notch 1120 are both two. The two notches 1120 of the step portion 112 are provided in relative spaced apart manner, and the two limiting protrusions 1512 of the mouthpiece body 151 are back-to-back with each other.

Further, referring to FIGS. 1-6 and FIG. 8, in some optional embodiments of the present disclosure, the mouthpiece body 151 is provided with an exposed first marking groove 1511 on its outer surface. The first housing 11 is provided with a second marking groove 115 on its outer surface adjacent to the mouthpiece mounting port 110. The first marking groove 1511 can be aligned with the second marking groove 115 when the mouthpiece body 151 is rotated to the second position. As such, when the user needs to disassemble the mouthpiece assembly 15, e.g., due to the need to replenish the liquid aerosol-forming substrate into the storage cavity 1041, when the user observes that the first marking groove 1511 on the mouthpiece body 151 has been aligned with the second marking groove 115 in the process of rotating the mouthpiece body 151, it indicates that the limiting protrusion 1512 of the mouthpiece body 151 is in position opposite the notch 1120 of the step portion 112, which enables the user to clearly know that the entire mouthpiece assembly 15 can be pulled out from the mouthpiece mounting port 110 of the first housing 11 by applying a force at this time, thus enhancing the user's operation convenience from a visual perspective.

Further, referring to FIGS. 1-8, in some optional embodiments of the present disclosure, the outer surface of the first housing 11 is provided with an arrow indicating groove 116 for indicating a rotational direction of the mouthpiece body 151. The arrow indicating groove 116 is provided adjacent to the mouthpiece mounting port 110. In this embodiment, the arrow indicating groove 116 is provided to instruct the user to rotate the mouthpiece body 151 in accordance with the direction of the arrow of the arrow indicating groove 116, so that the user can rotate the entire mouthpiece assembly 15 to the first position or the second position, thereby improving the user's operational convenience from the visual perspective. In some implementations, the arrow indicating groove 116 can be a structural form of a unidirectional arrow structure, or a structural form of a bidirectional arrow structure, which may be determined according to the actual use of the needs, and this embodiment does not make any specific limitations in this regard.

In some examples, e.g., as shown in FIGS. 1-3, FIG. 5, and FIGS. 7-8, the arrow indicating groove 116 is an unidirectional arrow for indicating that the mouthpiece body 151 is rotated to a first position, and the end of the arrow indicating groove 116 away from the arrow end is connected to the second marking groove 115, which is set up in such a way as to enable the user to clearly know the locking direction and the unlocking direction of the mouthpiece body 151. Thus, when the user needs to disassemble the mouthpiece assembly 15, the user can rotate the mouthpiece body 151 in a direction opposite to the direction of the arrow of the arrow indicating groove 116 to the second position in which the limiting protrusion 1512 is opposite to the notch 1120. When the user completes the replenishment of the liquid aerosol-forming substrate and needs to reassemble the mouthpiece assembly 15, after the lower end of the mouthpiece body 151 is inserted into the mouthpiece mounting port 110 and the first marking groove 1511 is aligned with the second marking groove 115, the user may rotate the mouthpiece body 151 in the direction of the arrow of the arrow indicating groove 116 to the first position where the limiting protrusion 1512 is misaligned with the notch 1120.

Further, referring to FIGS. 3, 5, and 7-10, in some optional embodiments of the present disclosure, a first blocking bulge 113 is provided on the side of the step portion 112 facing the liquid storage cup 10. The limiting protrusion 1512 abuts against the first blocking bulge 113 when the mouthpiece body 151 is rotated to the first position. With this arrangement, as the user completes the replenishment of the liquid aerosol-forming substrate and needs to reload the mouthpiece assembly 15, when the mouthpiece body 151 rotates to the position in which the limiting protrusion 1512 and the first blocking bulge 113 are in contact, the user is able to clearly feel that the mouthpiece body 151 has been blocked and is unable to continue to rotate the mouthpiece body 151 in the locking direction. This allows the user to clearly understand that at this point, the mouthpiece body 151 has been rotated to the first position where the limiting protrusion 1512 is misaligned with the notch 1120, thereby enhancing the user's operational convenience from a tactile perspective.

Further, with continued reference to FIGS. 3, 5, and 7-10, in some optional embodiments of the present disclosure, a second blocking bulge 114 is provided on the side of the step portion 112 facing the liquid storage cup 10. The second blocking bulge 114 has a blocking surface 1141 that is flush with the inner wall of the notch 1120. When the mouthpiece body 151 is rotated to the second position, the limiting protrusion 1512 abuts against the blocking surface 1141 of the second blocking bulge 114. As such, when the user needs to replenish the liquid aerosol-forming substrate in the storage cavity 1041 and needs to disassemble the mouthpiece assembly 15 in the process of rotating the mouthpiece body 151, the mouthpiece body 151 can be rotated to the position where the limiting protrusion 1512 and the second blocking bulge 114 are in contact with each other. Accordingly, the user is able to obviously perceive that the mouthpiece body 151 has been blocked and cannot continue to rotate it in the unlocking direction. This allows the user to clearly understand that at this point, the mouthpiece body 151 has been rotated to the second position where the limiting protrusion 1512 is aligned with the notch 1120, thereby enhancing the user's operational convenience from the tactile perspective.

Further, with continued reference to FIGS. 3, 5, and 7-10, in some optional embodiments of the present disclosure, an anti-rotation protrusion 114A is convexly provided on the side of the step portion 112 facing the liquid storage cup 10. The side surface of the limiting protrusion 1512 facing away from the outer peripheral wall of the mouthpiece body 151 is concavely provided with an anti-rotation groove 15120 adapted to fit the anti-rotation protrusion 114A. The side surface of the anti-rotation protrusion 114A facing the mouthpiece body 151 and the groove wall surface of the anti-rotation groove 15120 are both circular arc surfaces. At least one of the anti-rotation protrusion 114A or the limiting protrusion 1512 is made of plastic. The anti-rotation protrusion 114A can be engaged with the anti-rotation groove 15120 when the mouthpiece body 151 is rotated to the first position. This arrangement, by utilizing the engagement function between the anti-rotation protrusion 114A and the anti-rotation groove 15120, ensures that the mouthpiece body 151 does not easily rotate relative to the first housing 11 after the mouthpiece body 151 is rotated to the first position, thereby improving the mounting stability between the mouthpiece body 151 and the first housing 11.

In this embodiment, it can be understood that in some specific application scenarios, at least one of the limiting protrusion 1512 or the anti-rotation protrusion 114A is made of plastic, and the side surface of the anti-rotation protrusion 114A facing the mouthpiece body 151 is a circular arc surface. Therefore, in the process of the user applying force to rotate the mouthpiece body 151 from the second position to the first position, when the limiting protrusion 1512 comes into contact with the anti-rotation protrusion 114A, the surface on which the limiting protrusion 1512 contacts the anti-rotation protrusion 114A (or the surface on which the anti-rotation protrusion 114A contacts the limiting protrusion 1512) can undergo a certain degree of elastic deformation. This allows for relative sliding between the positioning protrusion 1512 and the anti-rotation protrusion 114A until the limiting protrusion 1512 abuts against the first blocking bulge 113. In this case, the part of the anti-rotation protrusion 114A having a circular arc surface can snap into the anti-rotation groove 15120. In addition, since the side surface of the anti-rotation protrusion 114A facing the mouthpiece body 151 and the groove wall of the anti-rotation groove 15120 are both circular arc surfaces, when the user forcefully rotates the mouthpiece body 151 from the first position to the second position, the part of the anti-rotation protrusion 114A having an circular arc surface can slide out of the anti-rotation groove 15120 and slide relatively with the limiting protrusion 1512 until the limiting protrusion 1512 abuts against the second blocking bulge 114.

Further, referring to FIGS. 3-4 and 6, in some optional embodiments of the present disclosure, the outer peripheral wall of the mouthpiece body 151 is also provided with a shaft shoulder portion 1513 disposed above the limiting protrusion 1512. The shaft shoulder portion 1513 contacts the side surface of the step portion 112 that is dorsal to the liquid storage cup 10 and covers the step portion 112. When the mouthpiece body 151 is rotated to the first position, the side surface of the limiting protrusion 1512 being dorsal to the liquid storage cup 10 contacts the side surface of the step portion 112 facing the liquid storage cup 10, or when the mouthpiece body 151 is rotated to the first position, there is a first gap between the side surface of the limiting protrusion 1512 that is dorsal to the liquid storage cup 10 and the side surface of the step portion 112 facing the liquid storage cup 10. The size of the first gap along the height direction of the first housing 11 can be less than 0.1 mm (assuming that the first gap is D, there is 0<D<0.1 mm).

In this embodiment, based on the above structural design, when the mouthpiece body 151 is in the first position in which the limiting protrusion 1512 is misaligned with the notch 1120. On one hand, the shaft shoulder portion 1513 of the mouthpiece body 151 contacts the upper surface of the step portion 112; on the other hand, the upper surface of the limiting protrusion 1512 contacts the lower surface of the step portion 112 or there is a gap of less than 0.1 mm. Thus, when the mouthpiece body 151 is in the first position, it is difficult to move up and down obviously along the height direction of the first housing 11, so as to be able to effectively avoid the negative experience of obvious looseness to the user. Moreover, when the mouthpiece body 151 is in the first position, the shaft shoulder portion 1513 of the mouthpiece body 151 can cover the step portion 112 of the first housing 11, which is conducive to improving the appearance of the mouthpiece mounting port 110 of the first housing 11.

Further, referring to FIGS. 4 and 6, in some optional embodiments of the present disclosure, the top of the liquid storage cup 10 can be further provided with a vent hole 1013 that is in communication with the storage cavity 1041. The vent hole 1013 can be spaced apart from the liquid injection hole 1012. The seal 152 covers the orifice of the vent hole 1013 to avoid leakage of the liquid aerosol-forming substrate within the storage cavity 1041 from the vent hole 1013. In this embodiment, during the process of injecting the liquid aerosol-forming substrate into the storage cavity 1041 through the liquid injection hole 1012, the air in the storage cavity 1041 can be discharged to the outside world through the vent hole 1013, so as to effectively reduce the risk of the air pressure in the storage cavity 1041 increasing due to the air in the storage cavity 1041 not being able to be discharged to the outside world during the liquid injection process, which in turn leads to a leakage of the liquid aerosol-forming substrate in the storage cavity 1041 from the position where the storage cavity 1041 is communicated to the atomizing core 14 (e.g., at the liquid inlet hole 1032 shown in FIG. 6) due to extrusion by the air pressure.

Further, referring to FIGS. 6-8, in some optional embodiments of the present disclosure, the seal 152 is an annular structure with an air vent 1520. The air vent 1520 of the seal 152 is respectively in communication with the suction channel 150 of the mouthpiece body 151 and the atomizing channel 1031 of the liquid storage cup 10. This arrangement can ensure that when the mouthpiece body 151 is in the first position where the limiting protrusion 1512 is misaligned with the notch 1120, the seal 152 can cover the liquid injection hole 1012 and the vent hole 1013 at the same time, so as to avoid leakage of liquid aerosol-forming substrate in the storage cavity 1041 from the liquid injection hole 1012 and the vent hole 1013. In some implementations, the seal 152 can be an open-ring structure (such as an open-ring structure in the shape of a "C") or a closed-ring structure (such as a circular ring structure). As long as it can meet the use requirements, this embodiment does not make any specific restrictions on this.

Further, in some optional embodiments of the present disclosure, the specific structural composition of the liquid storage cup 10 may be described as follows.

Figure 10:
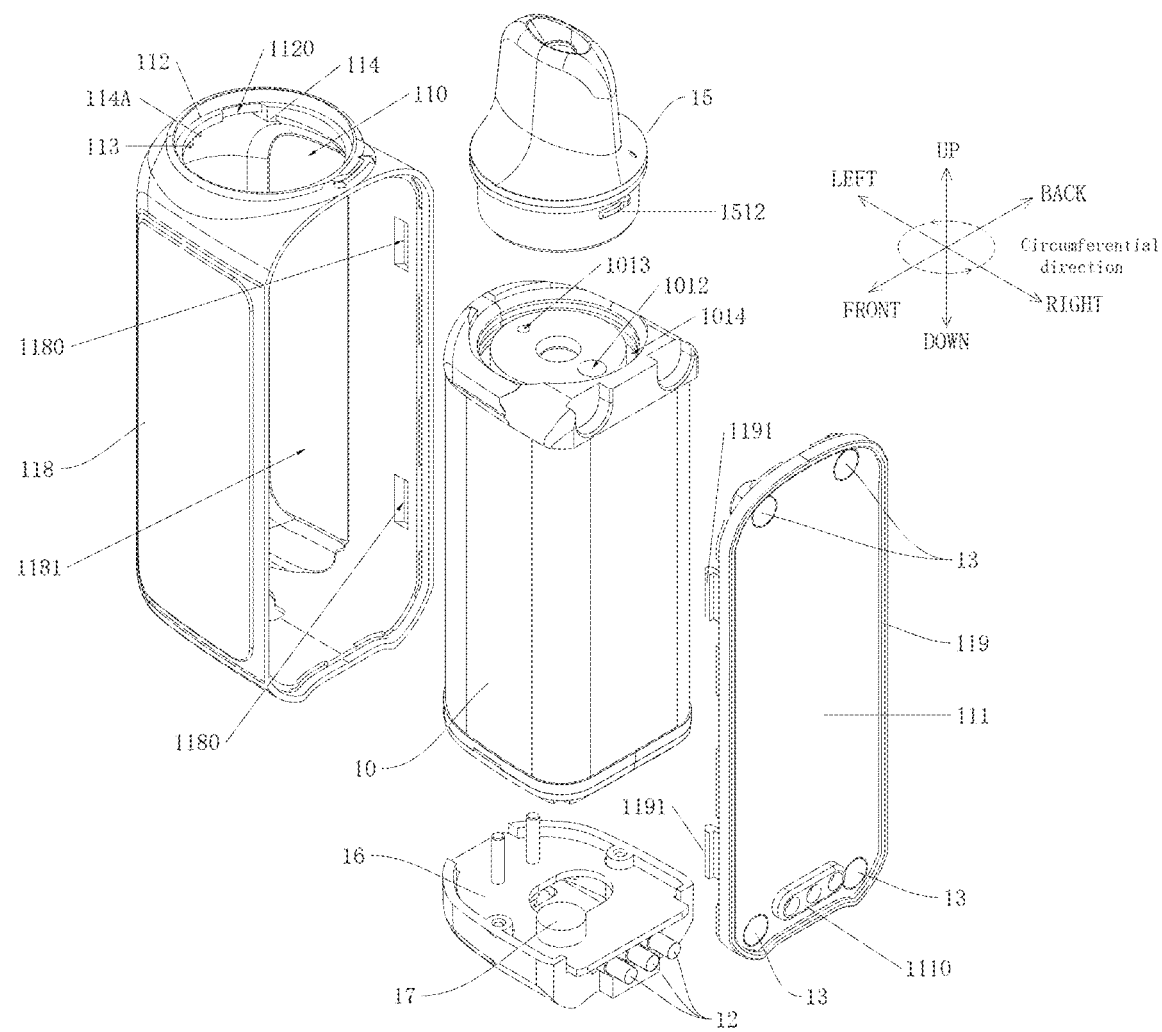
FIG. 10 is a schematic diagram of an example structural decomposition of the atomizing module of FIG. 1.
Figure 11:
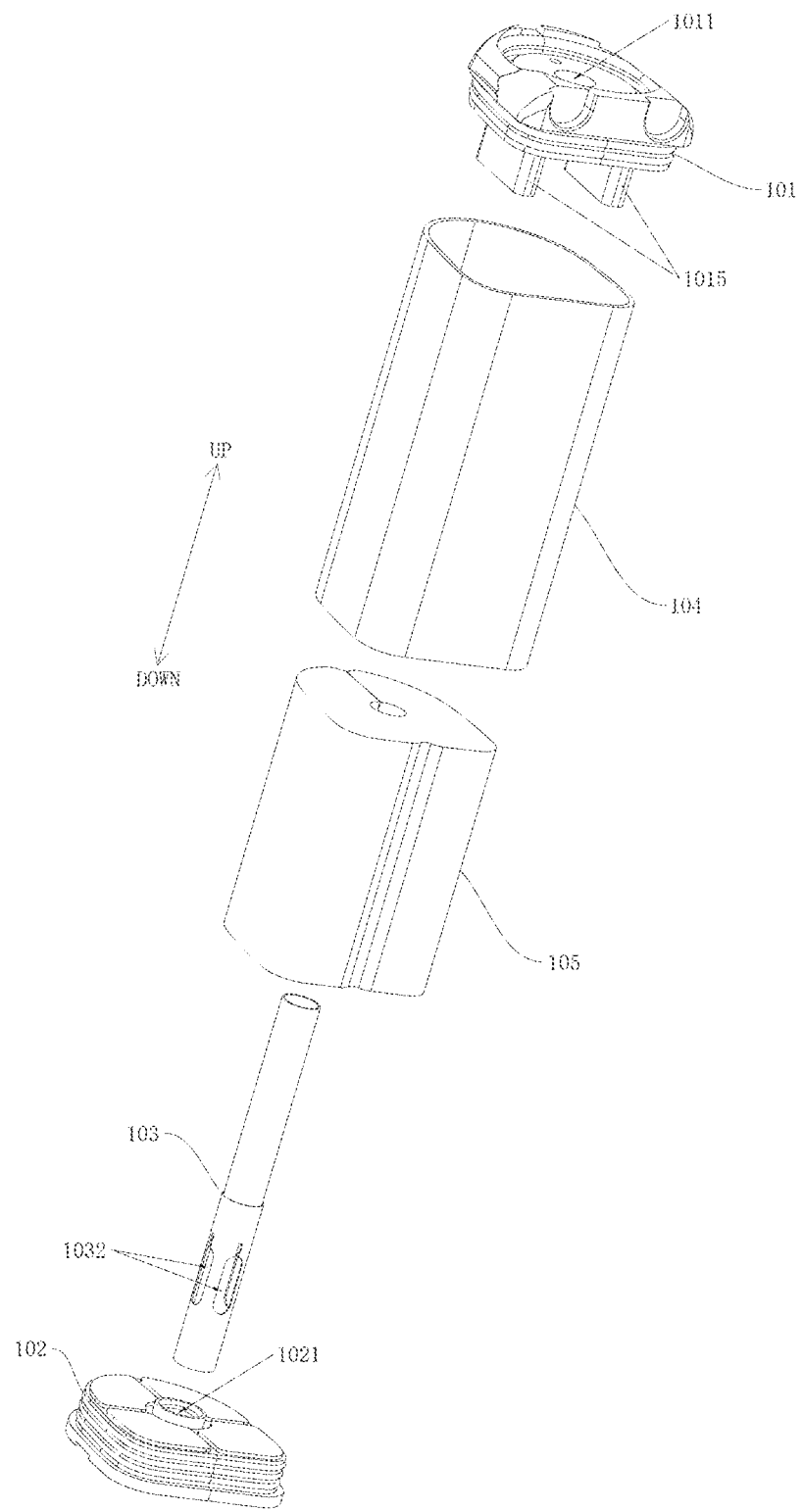
FIG. 11 is a schematic diagram of an example structural decomposition of a liquid storage cup in the first embodiment of the present disclosure.

In some implementations, e.g., with reference to FIG. 6 and FIGS. 10-11, the liquid storage cup 10 includes a top cover 101 that may be made of a sealing material (e.g., silicone, rubber, or silicone rubber), a bottom cover 102 that may be made of a sealing material (e.g., silicone, rubber, or silicone rubber), an air tube 103 having the atomizing channel 1031, and a cup body 104 that is hollow and through.

The top cover 101 can be fitted to the top end of the cup body 104, and the bottom cover 102 can be fitted to the bottom end of the cup body 104. The top cover 101 is provided with the liquid injection hole 1012 and a first mounting hole 1011 spaced apart from the liquid injection hole 1012, for example, as shown in FIGS. 4 and 6, the first mounting hole 1011 is located between the liquid injection hole 1012 and the vent hole 1013. The bottom cover 102 is provided with a second mounting hole 1021. One end of the air tube 103 is sealed and fitted within the first mounting hole 1011, and the other end of the air tube 103 is sealed and fitted into the second mounting hole 1021.

The top cover 101, the bottom cover 102, the air tube 103 and the cup body 104 together enclose a storage cavity 1041. The side wall of the air tube 103 is provided with a liquid inlet hole 1032 that is in communication with the storage cavity 1041. The atomizing core 14 is installed inside the air tube 103 and covered the liquid inlet hole 1032. The liquid aerosol-forming substrate in the storage cavity 1041 can be conducted to the atomizing core 14 through the liquid inlet hole 1032, e.g., the atomizing core 14 can be in communication with the storage cavity 1041 through the liquid inlet hole 1032. The side of the top cover 101 facing away from the bottom cover 102 is provided with an annular groove 1014. The lower end of the mouthpiece body 151 is rotationally fitted into the annular groove 1014. It is understood here that the cross-section of the part of the mouthpiece body 151 that is fitted into the annular groove 1014 may be round, and accordingly, the annular groove 1014 may be a circular groove. The inlet end of the suction channel 150 is in communication with the first mounting hole 1011, and the seal 152 is in contact with the top cover 101 and covers the orifices of the liquid injection hole 1012 and the orifices of the vent hole 1013 at the same time.

In this embodiment, the annular groove 1014 is provided to position the lower end of the mouthpiece body 151 so that the mouthpiece body 151 can be more stably maintained at the mouthpiece mounting port 110 of the first housing 11 without being easily shake. When the mouthpiece body 151 is rotated, it is helpful to improve the rotational stability of the mouthpiece body 151. In this embodiment, it should be noted that, after the lower end of the mouthpiece body 151 is rotationally fitted in the annular groove 1014, the circumferential wall surface of the lower end of the mouthpiece body 151 (e.g., the outer peripheral wall surface or the inner peripheral wall surface of the lower end of the mouthpiece body 151) can be contacted with the top cover 101, so that a certain friction can be generated between the mouthpiece body 151 and the top cover 101 to enhance the installation stability and rotational stability of the mouthpiece body 151, which can improve the mounting stability and rotational stability of the mouthpiece body 151.

Further, referring to FIGS. 6 and 11, in some optional embodiments of the present disclosure, the interior of storage cavity 1041 is provided with a liquid storage cotton 105. The liquid storage cotton 105 is capable of adsorbing the liquid aerosol-forming substrate in the storage cavity 1041, making the liquid aerosol-forming substrate in the storage cavity 1041 less susceptible to leakage from the liquid injection hole 1012 and the vent hole 1013. The liquid storage cotton 105 may be made of a sponge or fiber cotton.

Further, referring to FIG. 6, in some optional embodiments of the present disclosure, the liquid storage cotton 105 is arranged to cover the liquid inlet hole 1032, so that the liquid aerosol-forming substrate adsorbed by the liquid storage cotton 105 can be timely supplied to the atomizing core 14 for heating and atomizing, and to reduce the risk of dry burning of the atomizing core 14 due to lack of the liquid aerosol-forming substrate. Furthermore, there can be a spacing L between the side surface of the top cover 101 facing the bottom cover 102 (e.g., the lower side surface of the top cover 101) and the side surface of the liquid storage cotton 105 facing the top cover 101 (e.g., the upper side surface of the liquid storage cotton 105). In this way, compared with setting the upper side surface of the liquid storage cotton 105 in contact with the lower side surface of the top cover 101, the risk of the liquid aerosol-forming substrate overflowing from the liquid injection hole 1012 or the vent hole 1013 due to the suction rate of the liquid storage cotton 105 being slower than the injection rate of the liquid aerosol-forming substrate can be reduced during injection of the liquid aerosol-forming substrate into the storage cavity 1041 through the liquid injection hole 1012. To better ensure that the liquid aerosol-forming substrate does not overflow from the liquid injection hole 1012 or the vent hole 1013 in the process of injecting the liquid aerosol-forming substrate into the storage cavity 1041, the size of the spacing L can be in a range from 4 mm to 12 mm, that is, 4 mm≤L≤12 mm.

Further, in some application scenarios, in the process of transporting the atomizing module 1, the liquid storage cotton 105 may move along the height direction of the cup body 104 due to the factors such as road bumps, which may lead to the liquid storage cotton 105 being unable to completely cover the liquid inlet hole 1032 or even not being able to cover the liquid inlet hole 1032. This may lead to the problem that the atomizing core 14 suffers from the dry burning due to the difficulty of drawing the liquid aerosol-forming substrate from the liquid storage cotton 105 during subsequent vaping use by the user with the atomizing module 1. When the atomizing core 14 suffers from the dry burning, not only can it affect the taste of the user's vaping, but it may also lead to the damage of the atomizing core 14.

In some implementations, e.g., as illustrated in FIGS. 6 to 11, to avoid the problem of dry burning of the atomizing core 14 due to lack of the liquid aerosol-forming substrate in the atomizing core 14 during the subsequent use of suction, the side of the top cover 101 facing the bottom cover 102 is convexly provided with a protruding block 1015, which is located in the storage cavity 1041. Along the height direction of the cup body 104 (e.g., the up and down direction in FIG. 6), there is a first minimum distance H1 between the end face of the protruding block 1015 backing away from the top cover 101 and the side surface of the liquid storage cotton 105 facing the protruding block 1015, and a second minimum distance H2 between the hole wall of the liquid inlet hole 1032 and the side surface of the liquid storage cotton 105 facing the bottom cover 102. The first minimum distance H1 is smaller than or identical to the second minimum distance H2, that is, H1≤ H2. In this way, even if the liquid storage cotton 105 is moved upwardly along the height direction of the cup body 104 during the transportation of the atomizing module 1, the liquid storage cotton 105 may not move excessively and can completely cover the liquid inlet hole 1032 under the blocking effect of the protruding block 1015, which can effectively avoid the problem of dry burning of the atomizing core 14 due to lack of the liquid aerosol-forming substrate in the subsequent use of suction.

Further, referring to FIG. 6, in some optional embodiments of the present disclosure, the vertical height of the protruding block 1015 is 4 mm~ 12 mm along the height direction of the cup body 104, and the end surface of the protruding block 1015 departing from the top cover 101 is offset against the side surface of the liquid storage cotton 105 facing the protruding block 1015. This arrangement can not only keep enough space between the upper side surface of the liquid storage cotton 105 and the lower side surface of the top cover 101, but also can prevent the liquid storage cotton 105 from shifting along the height direction of the cup body 104, which ensures that the liquid aerosol-forming substrate may not overflow from the liquid injection hole 1012 or the vent hole 1013 during the liquid injection process. Moreover, it can effectively avoid the problem of dry burning of the atomizing core 14 due to lack of the liquid aerosol-forming substrate in the subsequent use of the suction.

Figure 31:
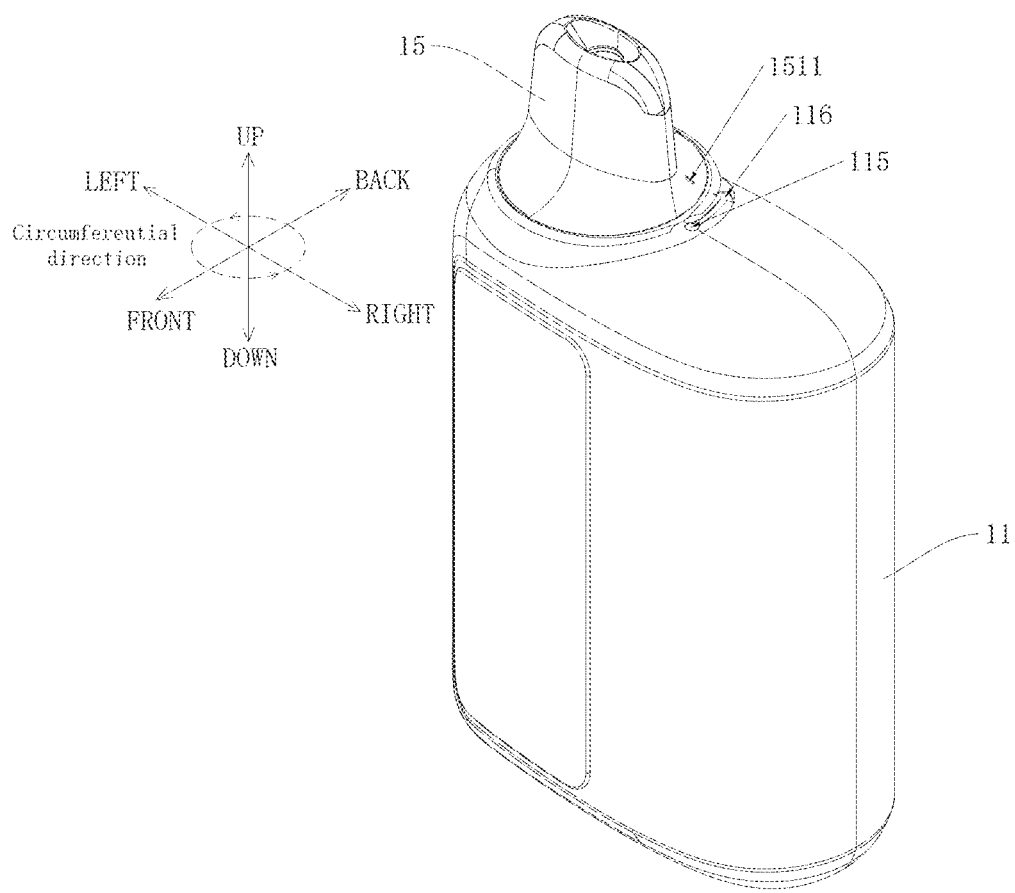
FIG. 31 is a schematic diagram of a three-dimensional structure of an example aerosol generating device in a second embodiment of the present disclosure.
Figure 32:
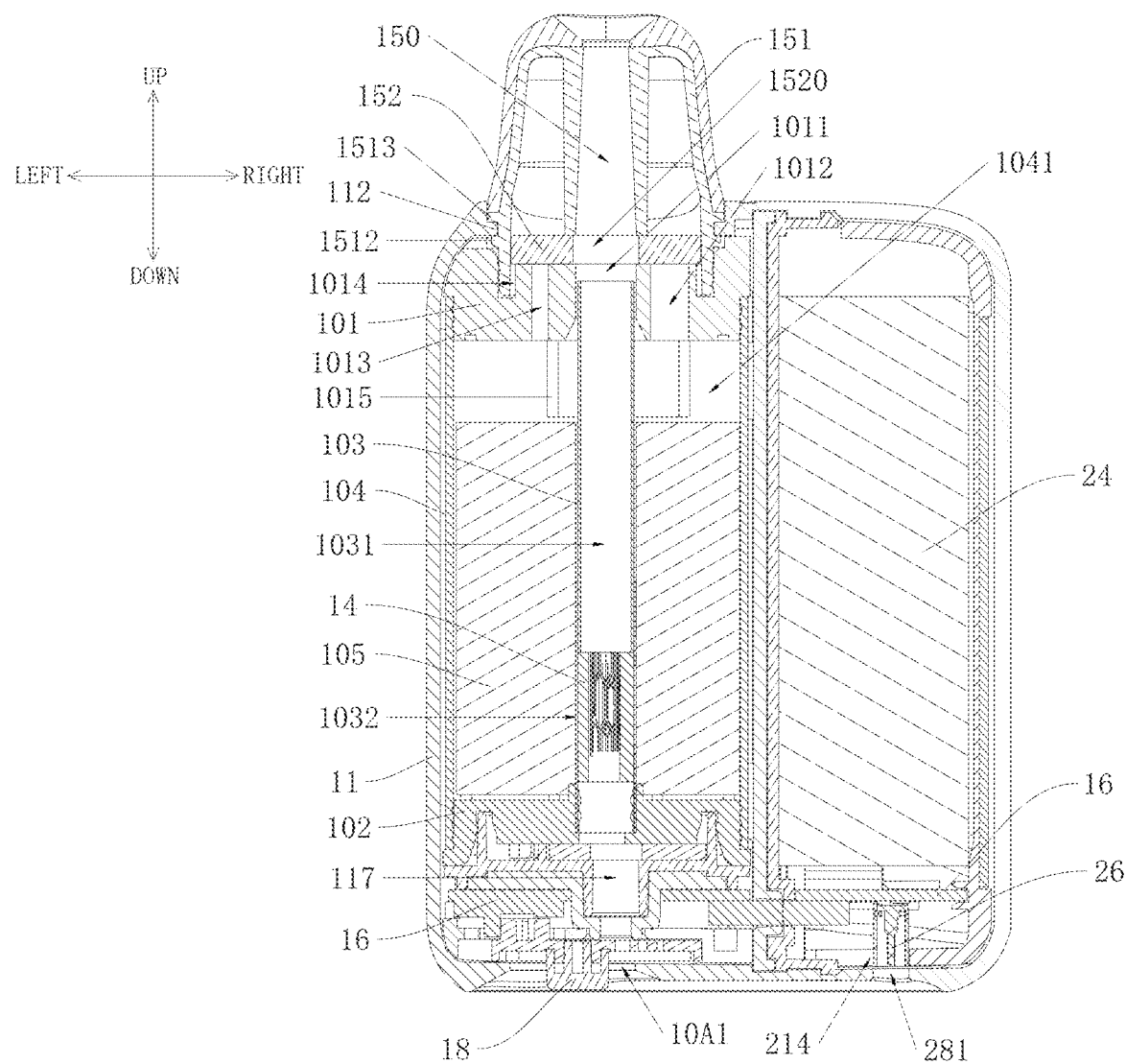
FIG. 32 is a cross-sectional view of the aerosol generating device of FIG. 31 in the second embodiment of the present disclosure.
Figure 33:
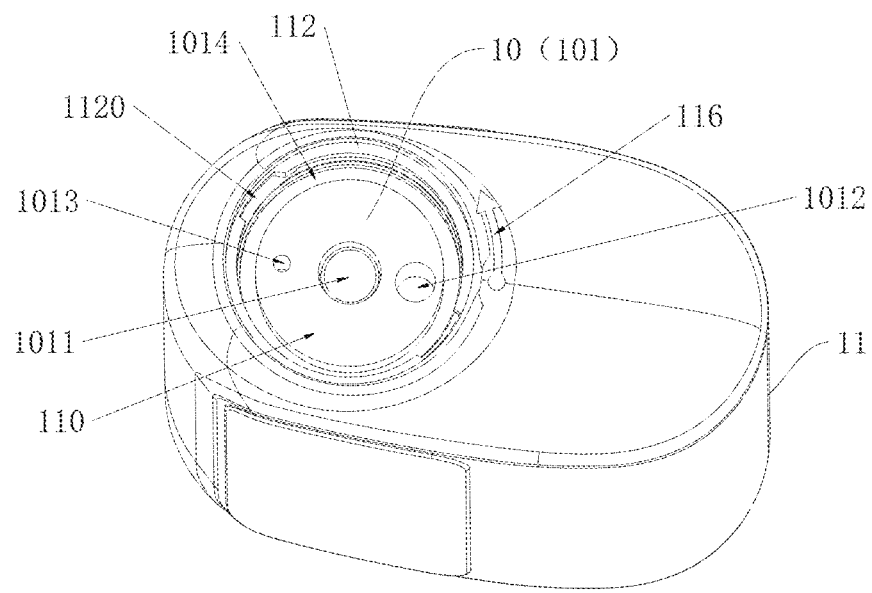
FIG. 33 is a schematic diagram of a three-dimensional structure of the aerosol generating device of FIG. 31 with a mouthpiece assembly removed.
Figure 34:
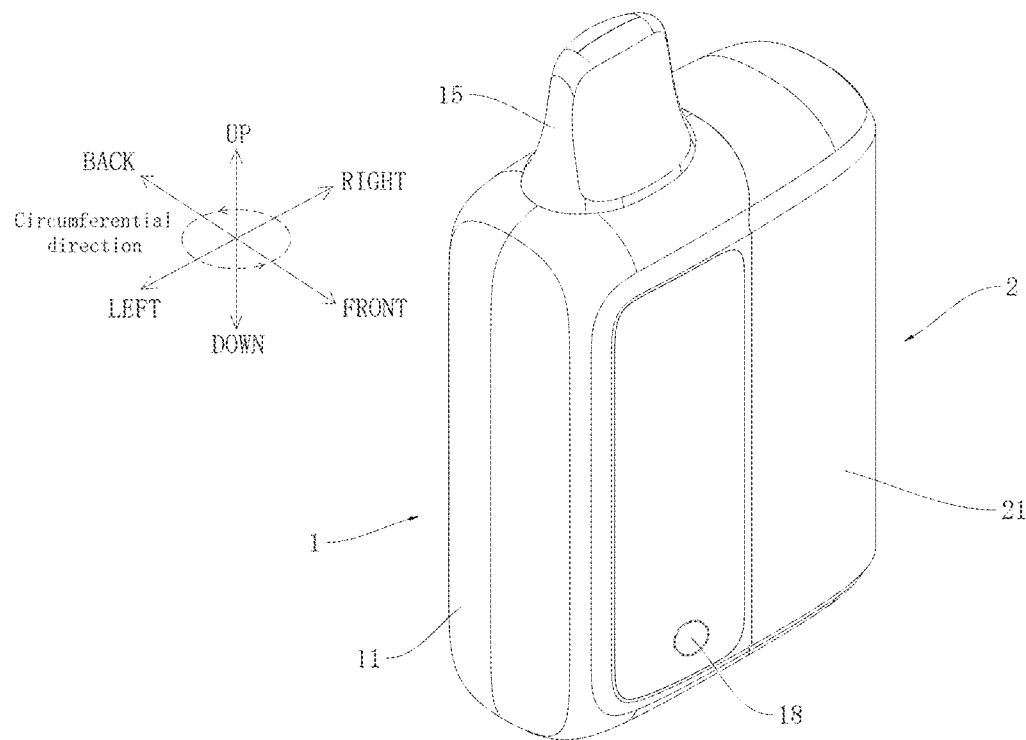
FIG. 34 is a schematic diagram of a three-dimensional structure of an example aerosol generating device in a third embodiment of the present disclosure.
Figure 35:
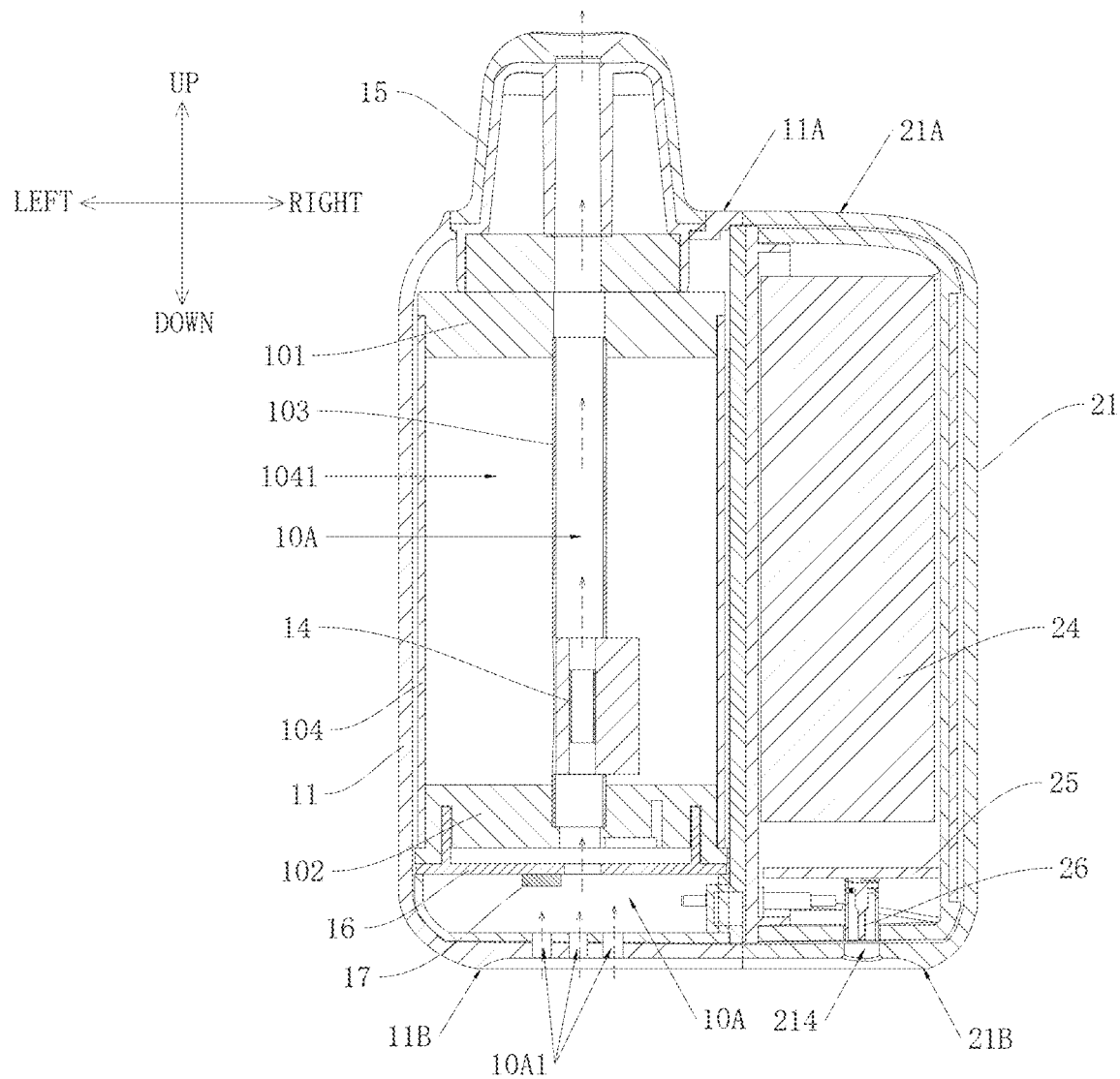
FIG. 35 is a cross-sectional view of the aerosol generating device of FIG. 34 in the third embodiment of the present disclosure.
Figure 36:
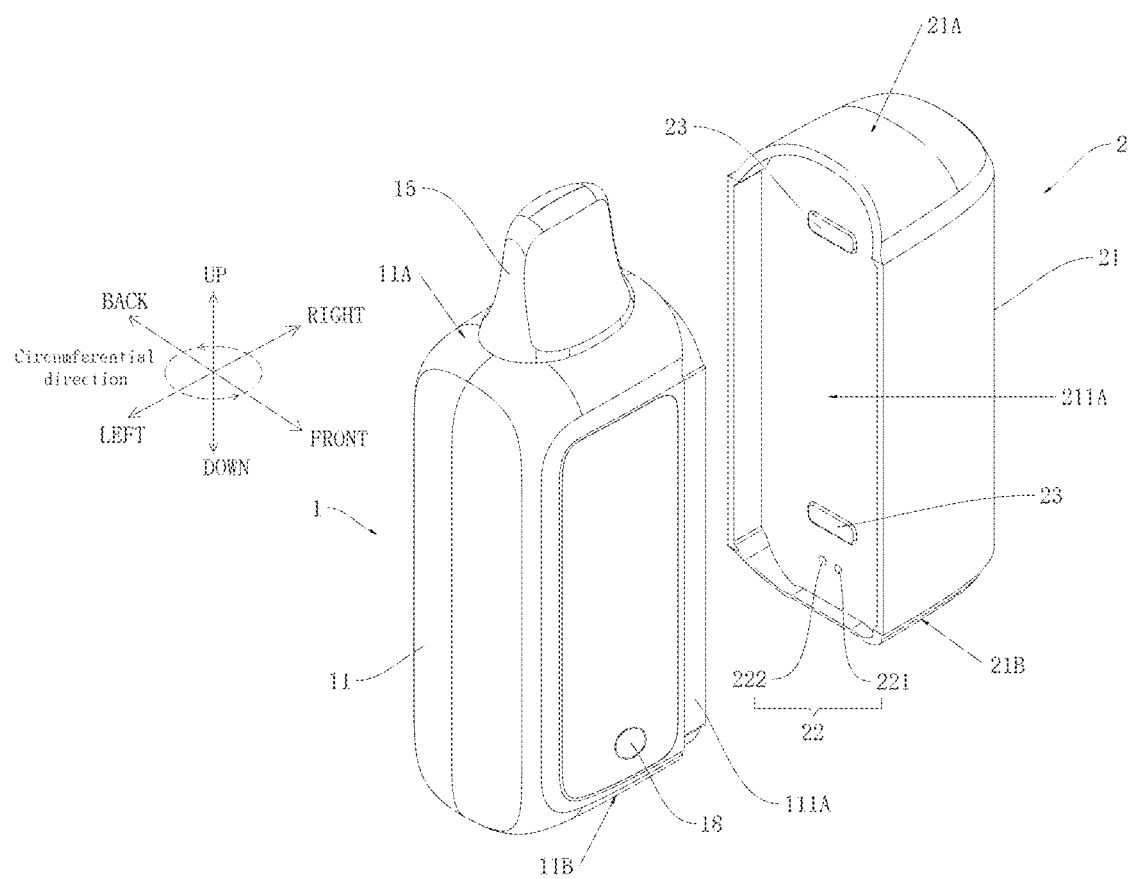
FIG. 36 is a schematic diagram of a structural decomposition of the aerosol generating device of FIG. 34 in a first view.

FIGS. 31-33 illustrate a structural composition of an aerosol generating device provided in a second embodiment of the present disclosure. The aerosol generating device includes a battery 24, a first control circuit board 16, and the atomizing module 1 (e.g., as shown in FIGS. 1-11) in any one of the above embodiments. The battery 24 and the first control circuit board 16 are both mounted in the first housing 11. The first control circuit board 16 is electrically connected to the battery 24 and the atomizing core 14 respectively, and the first control circuit board 16 can control the battery 24 to supply power to the atomizing core 14 or to stop supplying power to the atomizing core 14, so as to realize the intelligent work of the aerosol generating device.

In this embodiment, the aerosol generating device provided in the second embodiment of the present disclosure can have the same technical effect as that of the atomizing module 1 mentioned in any of the above embodiments due to the improvement of the atomizing module 1 mentioned above, which will not be repeated herein. It should be noted that other contents of the aerosol generating device provided in the second embodiment of the present disclosure can be referred to the relevant contents of the above atomizing module 1 embodiment, and will not be repeated herein.

FIGS. 12-18 illustrate a relevant structural composition of an aerosol generating device provided in the first embodiment of the present disclosure. The aerosol generating device can include a power supply module 2 and the atomizing module 1 in any of the above embodiments (e.g., as shown in FIGS. 1-11).

In some implementations, the atomizing module 1 further includes a first electrode assembly 12. The first electrode assembly 12 is electrically connectable to the atomizing core 14 by a wire or the like. The first electrode assembly 12 can be exposedly disposed on the bottom wall or the circumferential side wall of the first housing 11. It is to be understood that the circumferential side wall of the first housing 11 can include a front side wall, a rear side wall, a left side wall, and a right side wall of the first housing 11.

In some implementations, the power supply module 2 includes a second housing 21, a battery 24, a second control circuit board 25, and a second electrode assembly 22. The battery 24 and the second control circuit board 25 are both mounted in the second housing 21, and the second electrode assembly 22 is exposedly disposed on the second housing 21. The second control circuit board 25 can be electrically connected to the battery 24 and the second electrode assembly 22, respectively. The second housing 21 can be removably connected to the first housing 11, and the second electrode assembly 22 can be electrically contacted with the first electrode assembly 12, thereby realizing an electrical connection between the atomizing module 1 and the power supply module 2. Thus the battery 24 in the power supply module 2 can provide electrical energy for the atomizing core 14 in the atomizing module 1. The second control circuit board 25 and the battery 24 can be electrically connected by means of wires, and the second control circuit board 25 and the second electrode assembly 22 can be electrically connected by means of wires or welding. The battery 24 can be controlled to supply power to the atomizing core 14 or to stop supplying power to the atomizing core 14 through the second control circuit board 25 to achieve intelligence in the work of the aerosol generating device.

In this embodiment, it can be understood that when the first electrode assembly 12 is exposed to the bottom wall of the first housing 11, the second electrode assembly 22 is exposed to the top of the second housing 21. In this case, the aerosol generating device belongs to an up-and-down structure in which "the atomizing module 1 is located above the power supply module 2". When the first electrode assembly 12 is exposed on the circumferential side wall of the second housing 11, the second electrode assembly 22 is exposed on the circumferential side wall of the second housing 21, and the aerosol generating device belongs to the left-right structure of "the atomizing module 1 is located on the side of the power supply module 2".

In this embodiment, it should be noted that the second housing 21 may be a one-piece structure, or a split structure assembled from different shell structures, the specific structural form of which may be determined according to the actual use needs, and this embodiment does not make any specific limitation in this regard.

Figure 16:
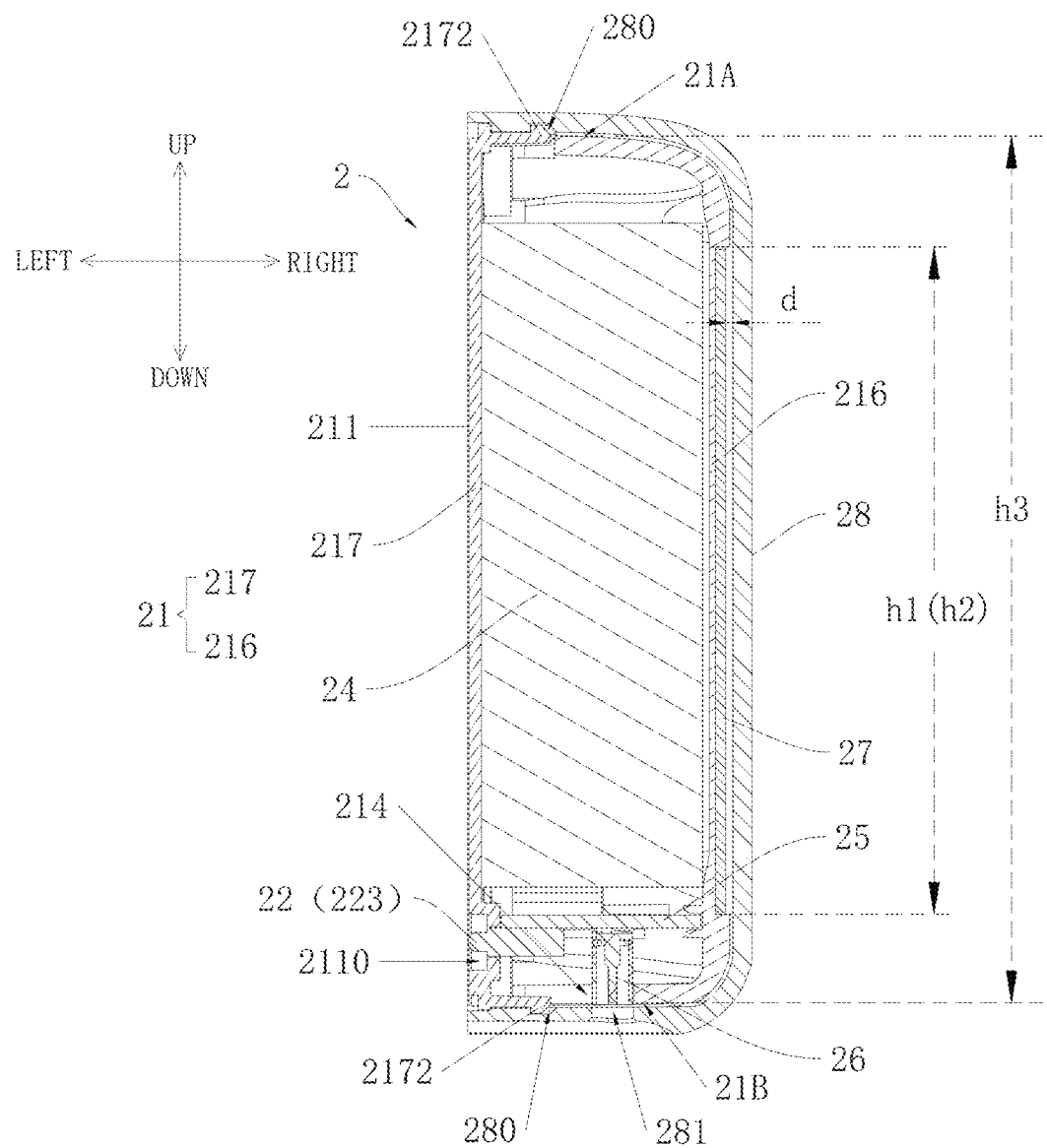
FIG. 16 is a cross-sectional view of the power supply module of FIG. 15 in the first embodiment of the present disclosure.
Figure 17:
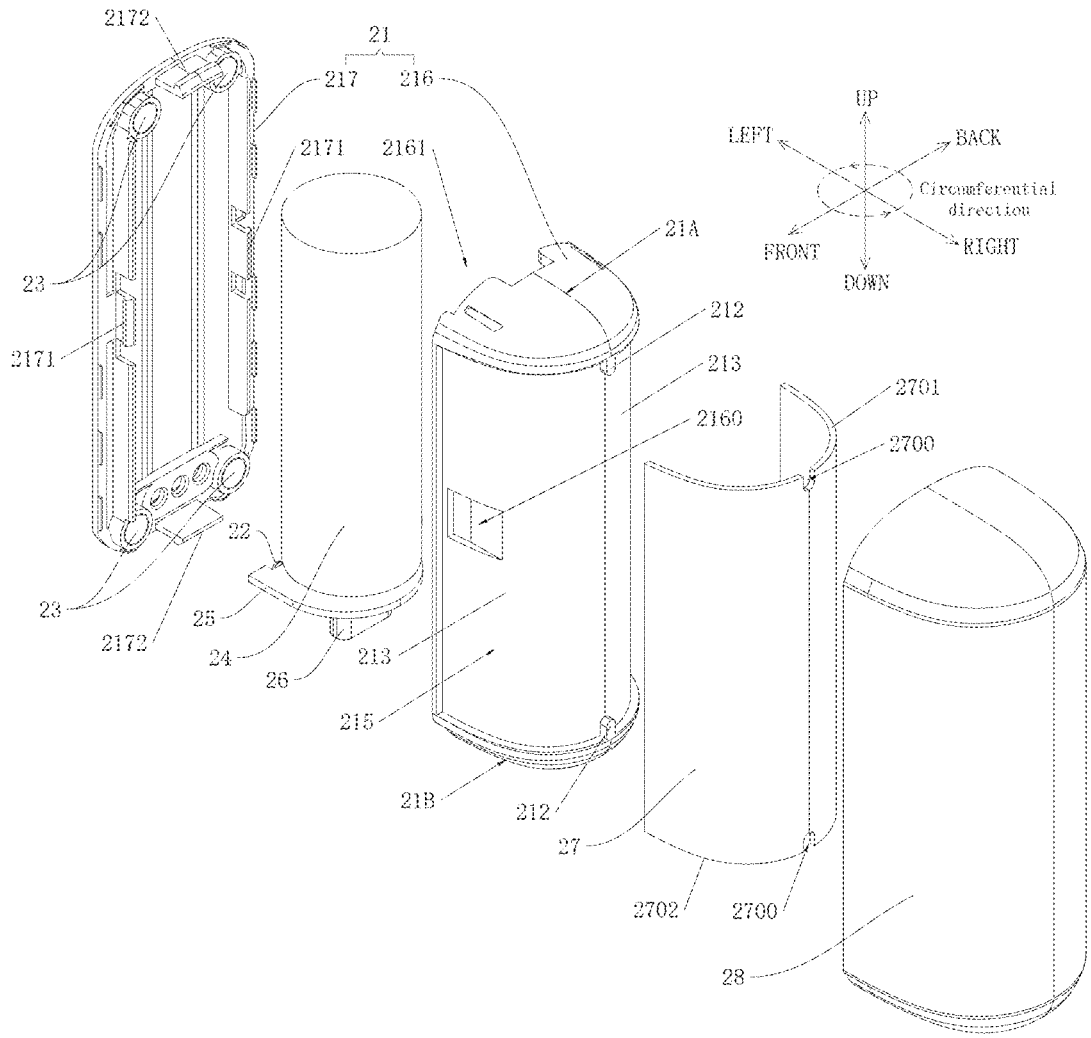
FIG. 17 is a schematic diagram of a structural decomposition of the power supply module of FIG. 15 in the first embodiment of the present disclosure.
Figure 18:
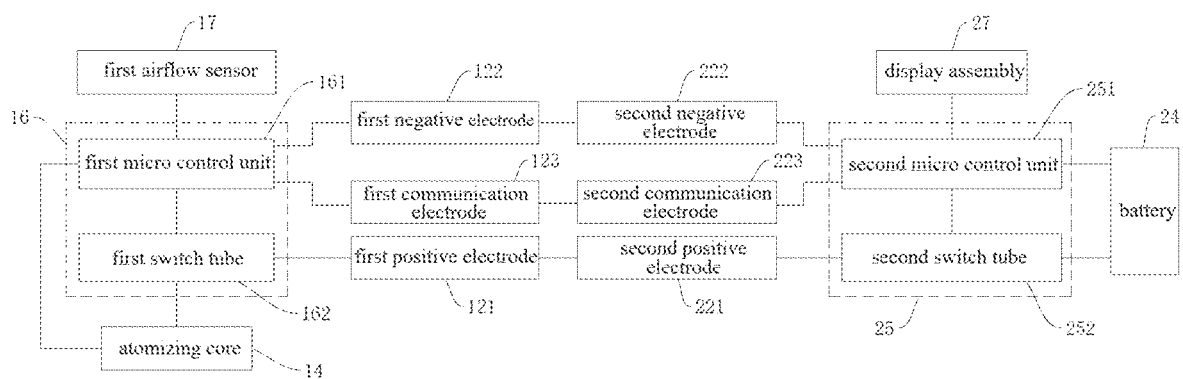
FIG. 18 is a schematic diagram of a circuit principle of the aerosol generating device of FIG. 12 in the first embodiment of the present disclosure.

In some implementations, e.g., as shown in FIGS. 16-17, the second housing 21 includes a second body portion 216 and a second side panel portion 217 having a second side wall 211. The second body portion 216 has a third end face 21A, a fourth end face 21B, and a second opening 2161 for mounting of the second side panel portion 217. The battery 24 and the second control circuit board 25 are both mounted in the second body portion 216. The second side panel portion 217 is provided with at least two second snap portions 2171 on the side of the second side panel portion 217 back to the second side wall 211. The at least two second snap portions 2171 is spaced apart along a width direction (e.g., the front-to-back direction in FIG. 17) of the second side panel portion 217. The second body portion 216 is provided with at least two second snap holes 2160, and the at least two second snap portions 2171 are snap-fitted with the at least two second snap holes 2160 in one-to-one correspondence. That is, the second snap portion 2171 located on the front side of the second side panel portion 217 snaps into the second snap hole 2160 located on the front side of the second body portion 216, and the second snap portion 2171 located on the rear side of the second side panel portion 217 snaps into the second snap hole 2160 located on the rear side of the second body portion 216, thereby securing the second side panel portion 217 to the second opening 2161 of the second body portion 216 by means of a snap connection. In addition, in some implementations, the removability between the second housing 21 and the first housing 11 may be a snap connection, a plug-in connection, a magnetic connection, a threaded connection, or the like, as long as the connection can satisfy the needs of use, and this embodiment does not impose any specific limitations thereon.

In this embodiment, the aerosol generating device provided in the first embodiment of the present disclosure has the same technical effect as that of the atomizing module 1 mentioned in any of the above embodiments, thanks to the improvement of the atomizing module 1 mentioned above, which will not be repeated herein. It should be noted that other contents of the aerosol generating device provided in the first embodiment of the present application can be referred to the relevant contents of the above described atomizing module 1 embodiment, and will not be repeated herein.

Figure 12:
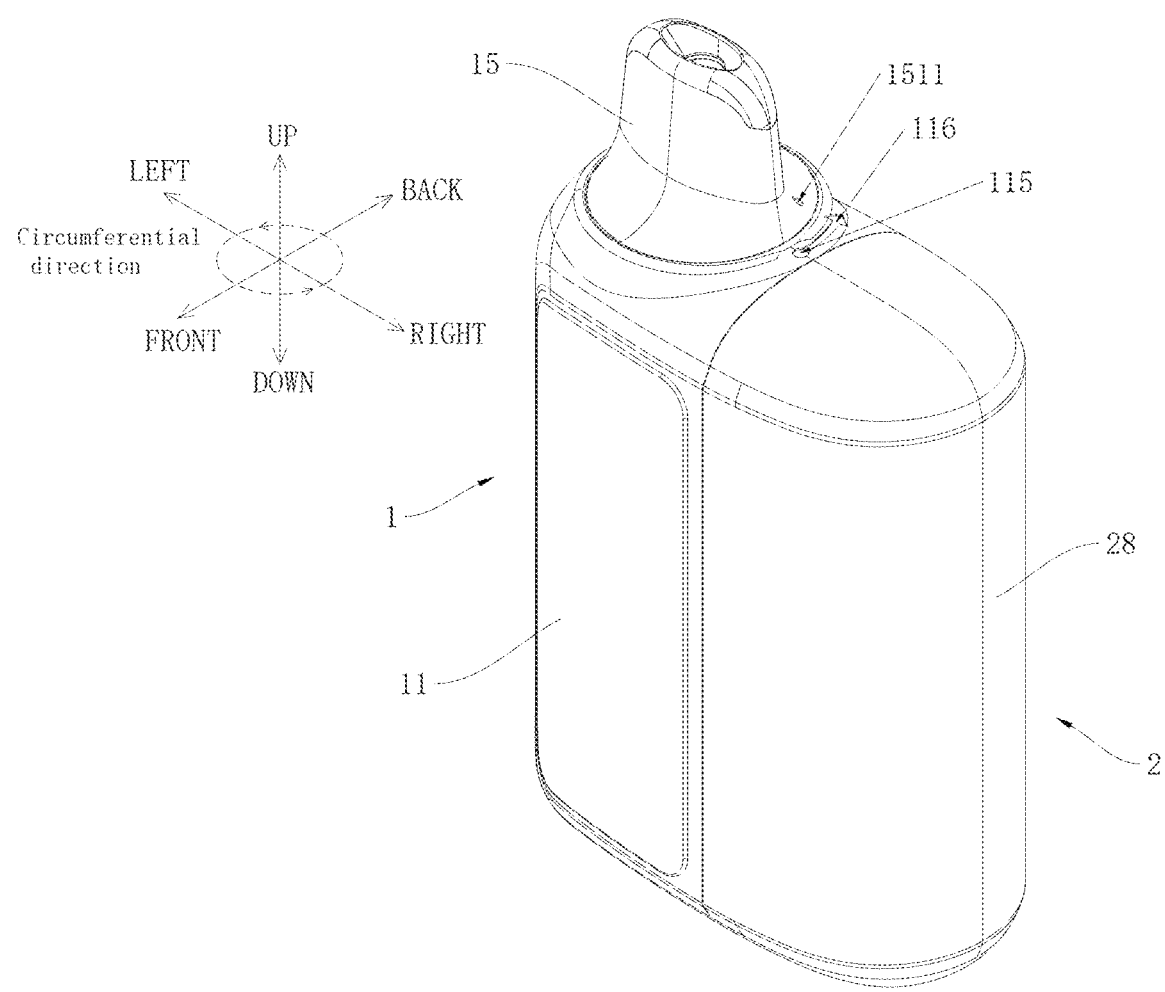
FIG. 12 is a schematic diagram of a three-dimensional structure of an example aerosol generating device in the first embodiment of the present disclosure.
Figure 13:
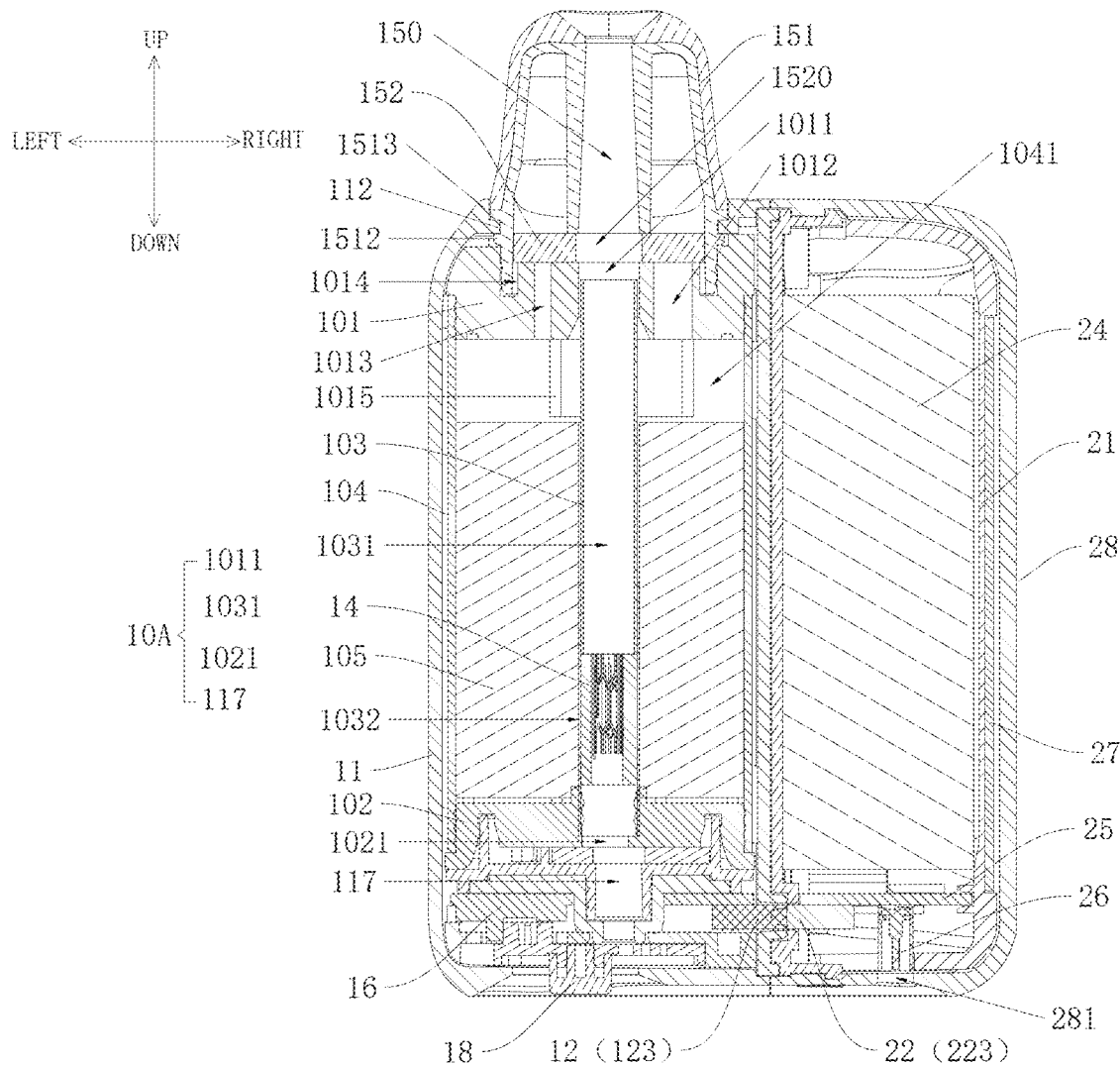
FIG. 13 is a cross-sectional view of the aerosol generating device of FIG. 12 in the first embodiment of the present disclosure.
Figure 14:
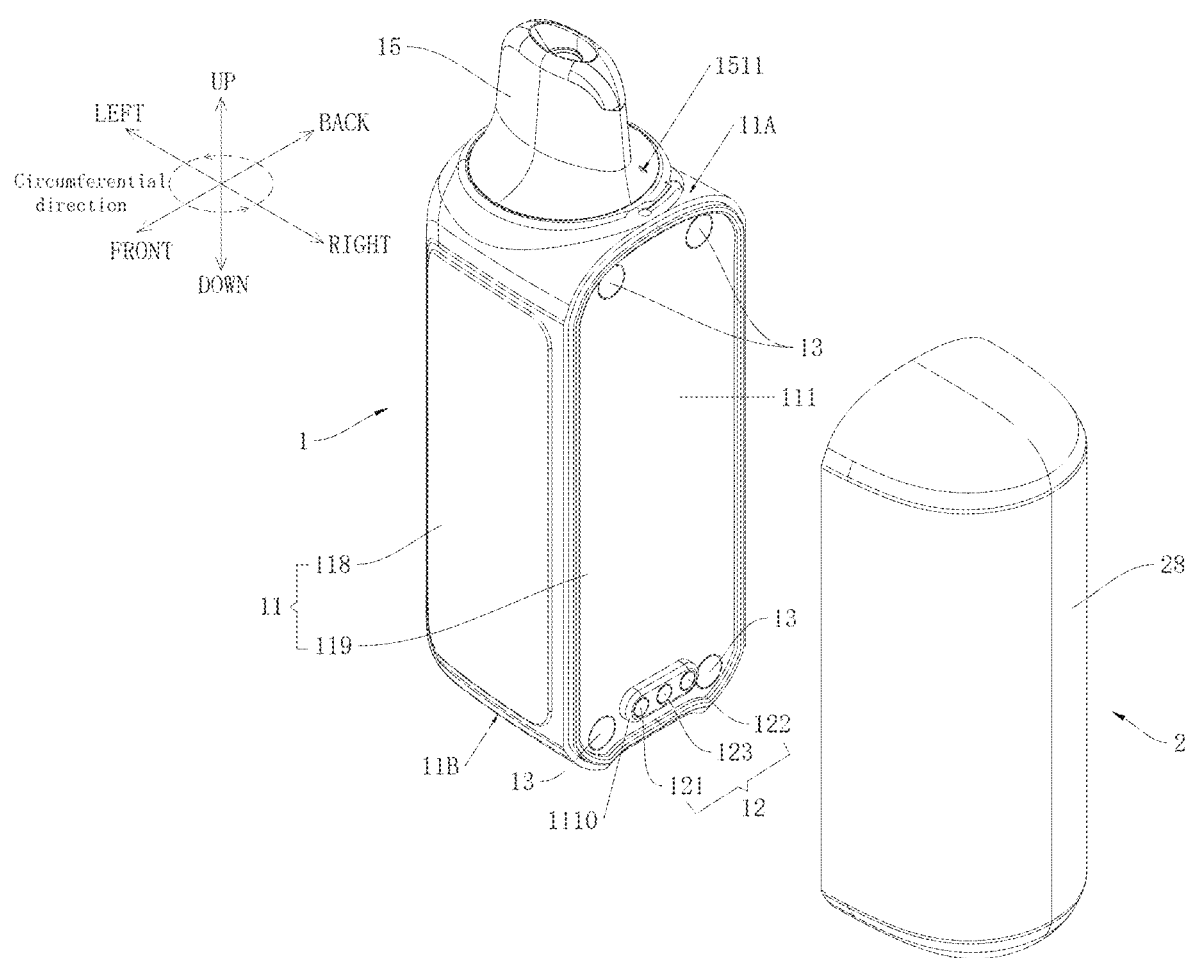
FIG. 14 is a schematic diagram of a structural decomposition of the aerosol generating device of FIG. 12 in the first embodiment of the present disclosure.

In this embodiment, it should be added that in the aerosol generating device provided in the first embodiment of the present disclosure, due to the detachable connection between the first housing 11 of the atomizing module 1 and the second housing 21 of the power supply module 2, this makes it possible to assemble and disassemble the atomizing module 1 and the power supply module 2 including the battery 24 from each other. In comparison with the technical solution of the second embodiment in which the battery 24 is not detachable from the atomizing module 1 (e.g., the aerosol generating device of the embodiment shown in FIGS. 31-33), the first embodiment of the present application provides an aerosol generating device (as shown in FIGS. 12-14) that has the advantage that, on the one hand, when the battery 24 is damaged, it is only necessary to dismantle the power supply module 2 from the atomizing module 1, and then assemble the new power supply module 2 on the atomizing module 1, so that the aerosol generating device can continue to be used without having to replace the entire aerosol generating device, which is more effective in reducing the user's cost of use and is also more conducive to environmental protection. In this case, it is equivalent to the atomizing module 1 being able to be used repeatedly. On the other hand, similarly, when the atomizing module 1 is damaged (such as the atomizing core 14 is damaged), it is only necessary to disassemble the atomizing module 1 from the power supply module 2, and then assemble the new atomizing module 1 on the power supply module 2, so that the aerosol generating device can be continued to be used without having to replace the entire aerosol generating device, which is able to reduce the user's cost of use more efficiently, and also is more beneficial to the environment. In this case, it is equivalent to the power supply module 2 can be reused.

It should be added herein that the main differences between the aerosol generating device provided in the second embodiment and the aerosol generating device provided in the first embodiment are described as follows.

First, the first housing 11 in the second embodiment corresponds to fixing the first housing 11 and the second housing 21 in the first embodiment together in a non-detachable manner, so that the battery 24 in the second embodiment is not replaceable. Once the battery 24 in the second embodiment is damaged, the entire aerosol generating device in the second embodiment can only be discarded.

Second, the aerosol generating device in the second embodiment is not provided with a first electrode assembly 12 and a second electrode assembly 22 because it does not have the function of replacing the atomizing module 1 or replacing the power supply module 2.

Third, the aerosol generating device in the second embodiment is provided with only a control circuit board because it does not have the anti-counterfeiting function mentioned in the following related embodiment.

Further, referring to FIGS. 12-16, in some optional embodiments of the first embodiment of the present disclosure, the first housing 11 has a first end face 11A (e.g., the top end face of the first housing 11) and a second end face 11B (e.g., the bottom end face of the first housing 11) along its height direction. The first housing 11 has a first side wall 111 along its circumferential direction. For example, the first side wall 111 can be the right side wall of the first housing 11. The first side wall 111 is located between the first end face 11A and the second end face 11B. The first electrode assembly 12 can be exposedly arranged on the first side wall 111, and the first electrode assembly 12 can include a first positive electrode 121 and a first negative electrode 122 arranged at intervals.

The second housing 21 can have a third end face 21A (e.g., the top end face of the second housing 21) and a fourth end face 21B (e.g., the bottom end face of the second housing 21) along its height direction. The second housing 21 has a second side wall 211 (e.g., the left side wall of the second housing 21) along its circumferential direction. The second side wall 211 can be located between the third end face 21A and the fourth end face 21B. The second electrode assembly 22 can be exposedly arranged on the second side wall 211. The second electrode assembly can include a second positive electrode 221 and the second negative electrode 222 arranged at intervals. The second side wall 211 can be detachably connected with the first side wall 111, and the second positive electrode 221 can be electrically in contact with the first positive electrode 121, and the second negative electrode 222 can be electrically in contact with the first negative electrode 122.

In this embodiment, it should be noted that, the detachable connection between the first side wall 111 of the first housing 11 and the second side wall 211 of the second housing 21 can be a snap connection, a plug-in connection, a magnetic connection, or the like, as long as it can satisfy the needs of the use, and this embodiment does not make any specific limitations in this regard.

In some implementations, when the detachable connection between the first side wall 111 and the second side wall 211 is a snap connection, the first side wall 111 is provided with a snap, and accordingly, the second side wall 211 is provided with a slot capable of snapping into place with the snap. In some implementations, when the detachable connection between the first side wall 111 and the second side wall 211 is a plug-in connection, the first side wall 111 is provided with a plug, and accordingly, the second side wall 211 is provided with a receptacle capable of being plugged into the plug.

Figure 15:
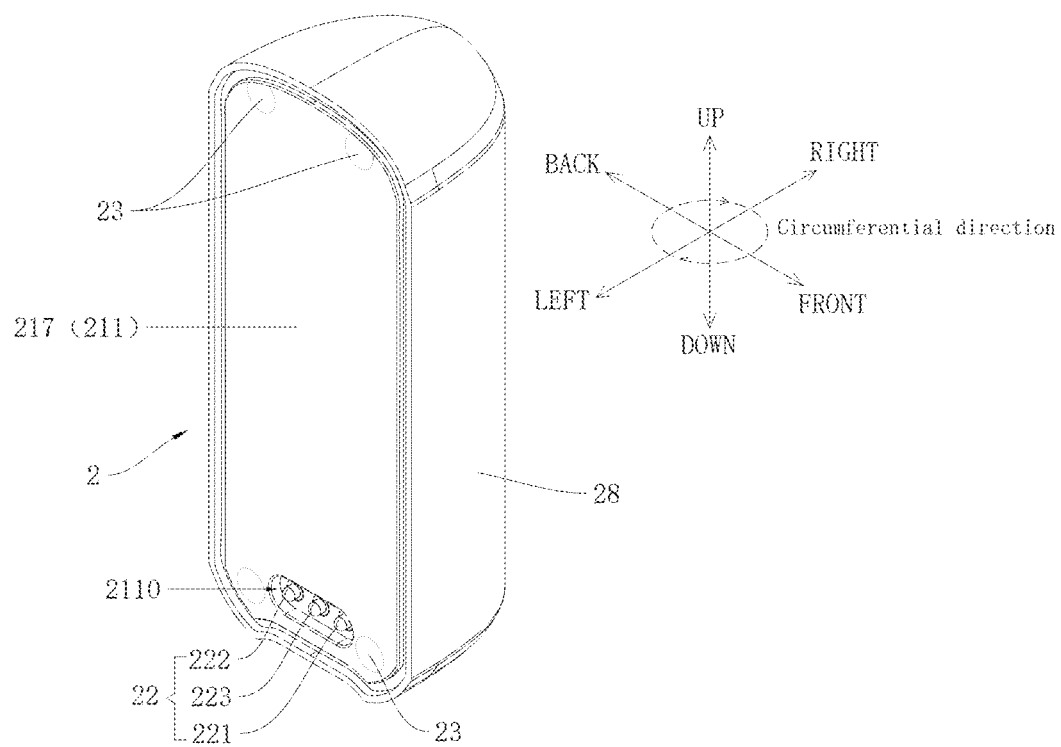
FIG. 15 is a schematic diagram of a three-dimensional structure of an example power supply module in the first embodiment of the present disclosure.

In some implementations, e.g., as shown in FIGS. 14-15 as well as FIG. 17, when the detachable connection between the first side wall 111 of the first housing 11 and the second side wall 211 of the second housing 21 is a magnetic connection, there is at least one first magnetic member 13 fixed on the first side wall 111, and there is at least one second magnetic member 23 fixed on the second side wall 211. The at least one the first magnetic member 13 and the at least one second magnetic member 23 are attracted to each other. In some examples, at least one of the first magnetic member 13 or the second magnetic member 23 is a magnet. For example, both of the first magnetic member 13 and the second magnetic member 23 are magnets, or, one of the first magnetic member 13 and the second magnetic member 23 is a magnet, and the other is a magnetic conductor made of a magnetically conductive material (which may be a magnetically conductive material of the type of iron, nickel-chromium-iron alloy, silicon steel, and the like), as long as it can satisfy the needs of the use, and this embodiment does not impose any specific limitations on the specific structural forms of the first magnetic member 13 and the second magnetic member 23.

In this embodiment, it should be noted that the first end face 11A, the second end face 11B, the third end face 21A, the fourth end face 21B, the first side wall 111, and the second side wall 211 may be planar, curved surfaces, or formed by connecting a plane and a curved surface, which can be determined according to the actual use needs. This embodiment does not make any specific restrictions on this.

In this embodiment, compared to designing the aerosol generating device as an up-down structure in which "the atomizing module 1 is located above the power supply module 2", the first embodiment of the present disclosure shortens the overall height of the aerosol generating device by designing the aerosol generating device as a left-right structure in which "the atomizing module 1 is located on the side of the power supply module 2". In some application scenarios, when the user carries the aerosol generating device provided in the first embodiment of the present disclosure in a pocket of a piece of clothing, it is conducive to rendering the mouthpiece body 151 of the atomizing module 1 less susceptible to being exposed from a pocket to the outside air, thereby reducing the risk of The mouthpiece body 151 is exposed to the outside air for a long time and is contaminated by dust and other impurities in the outside air.

Figure 37:
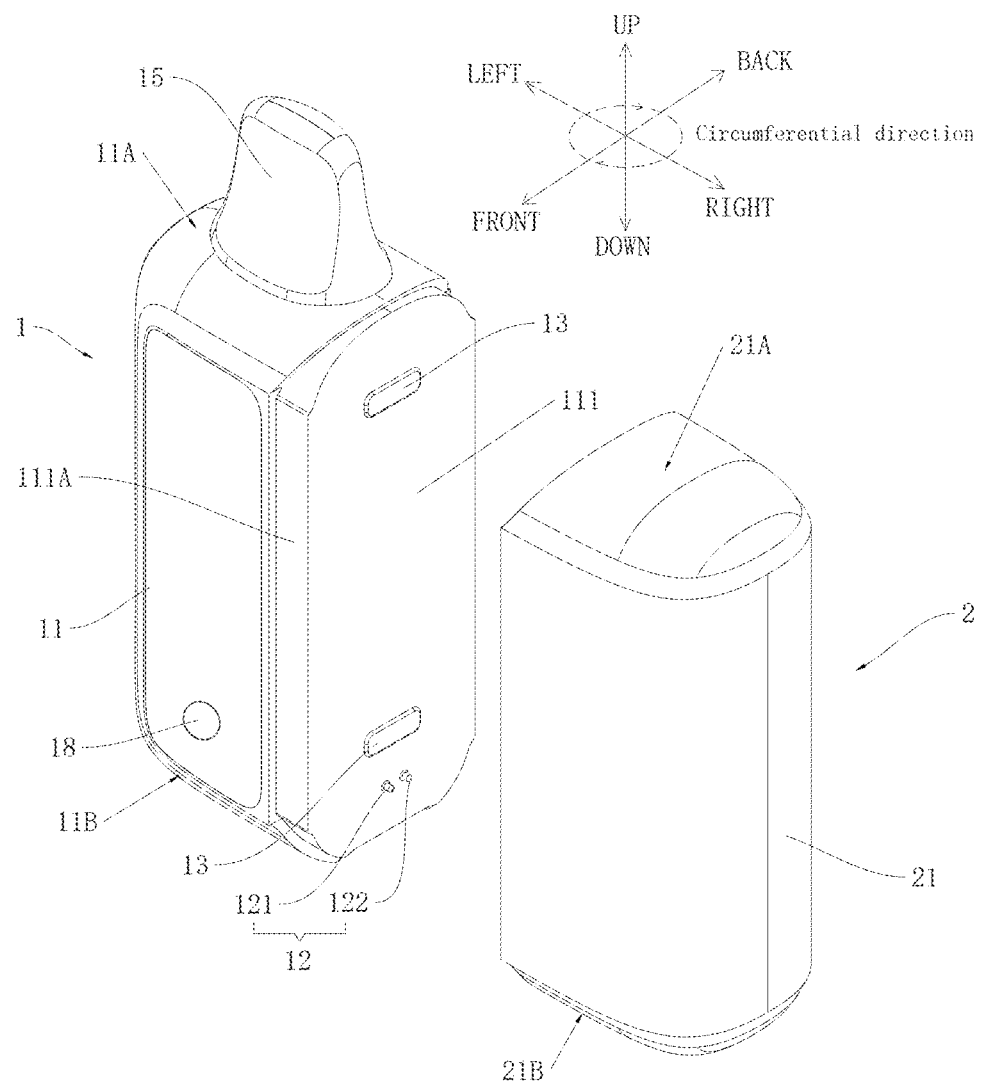
FIG. 37 is a schematic diagram of the structural decomposition of the aerosol generating device of FIG. 34 in a second view.
Figure 38:
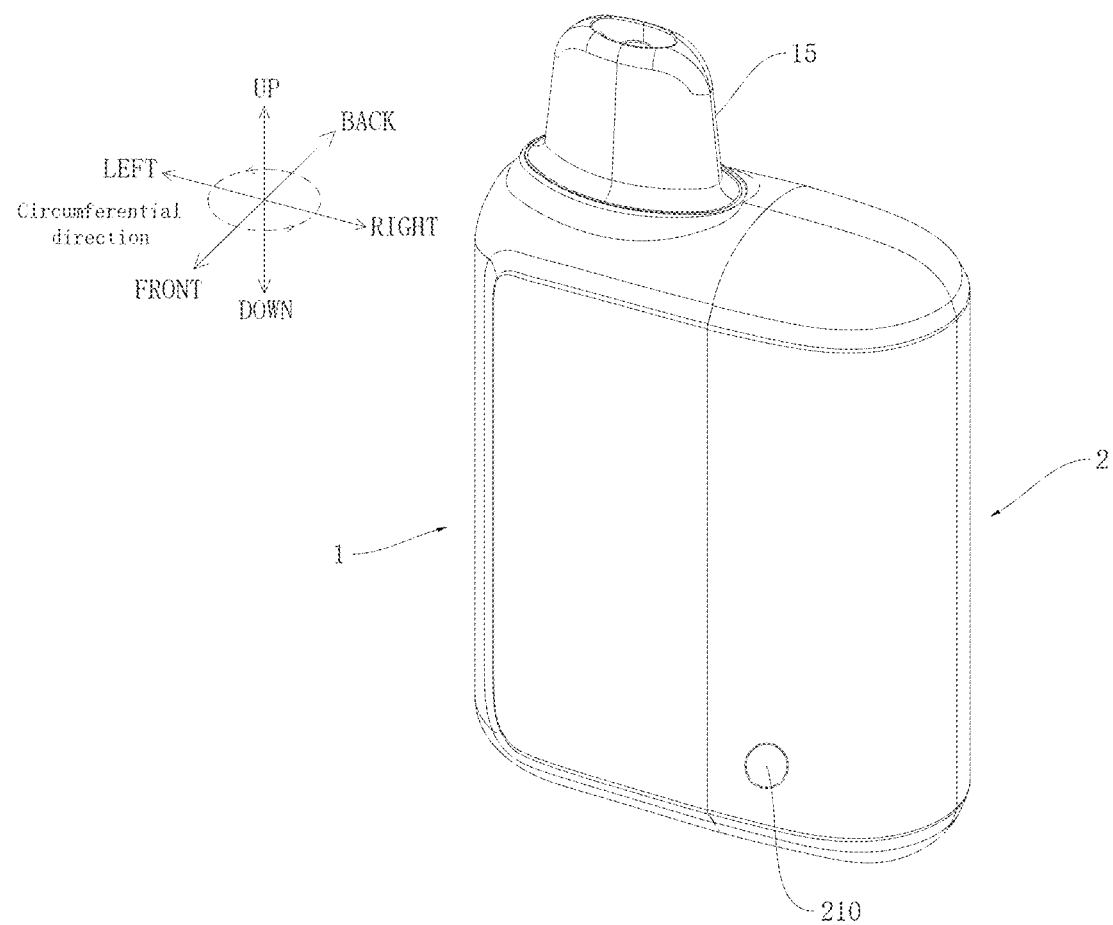
FIG. 38 is a schematic diagram of a three-dimensional structure of an example aerosol generating device in a fourth embodiment of the present disclosure.
Figure 39:
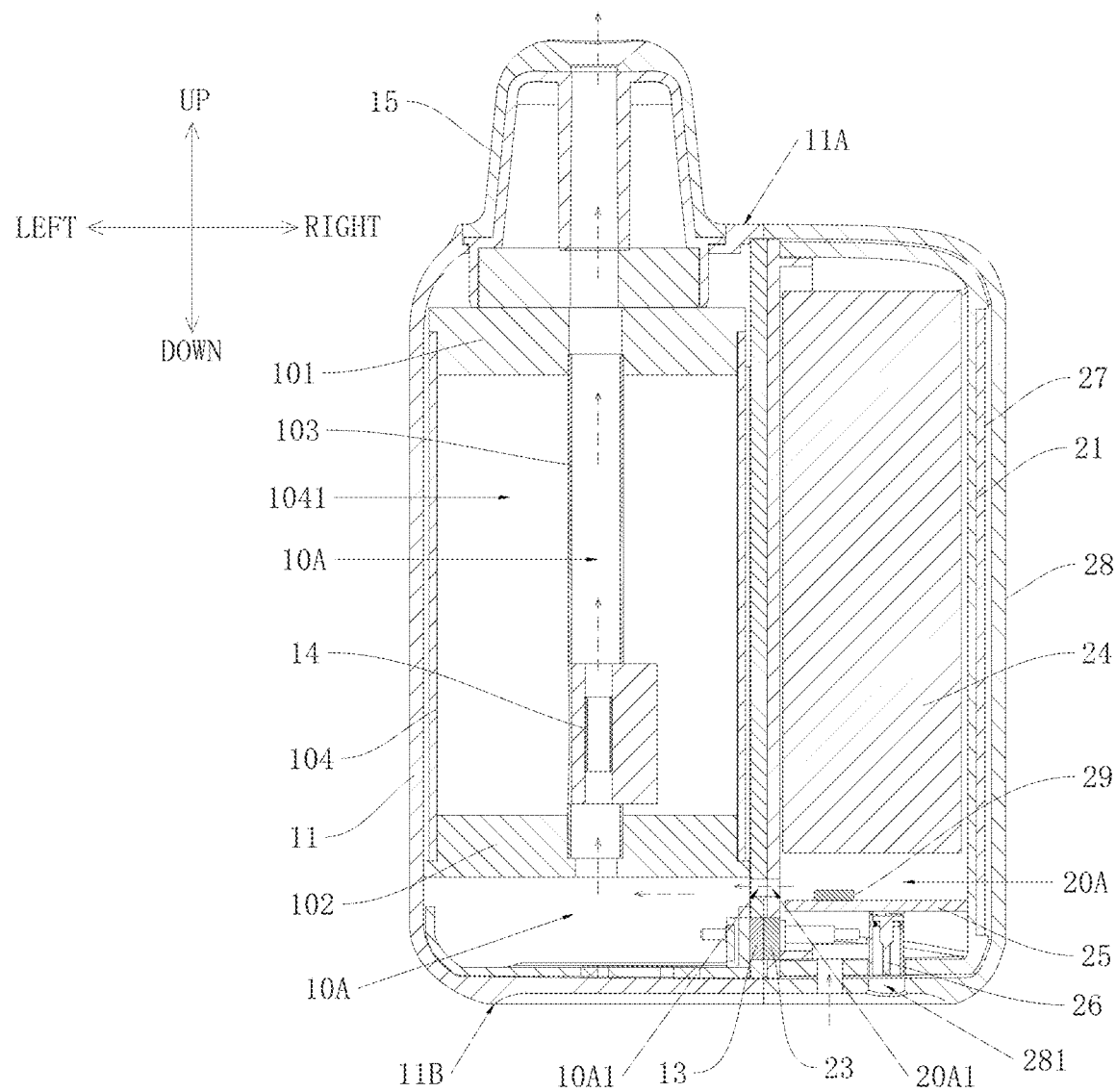
FIG. 39 is a cross-sectional view of the aerosol generating device of FIG. 38 in the fourth embodiment of the present disclosure.
Figure 40:
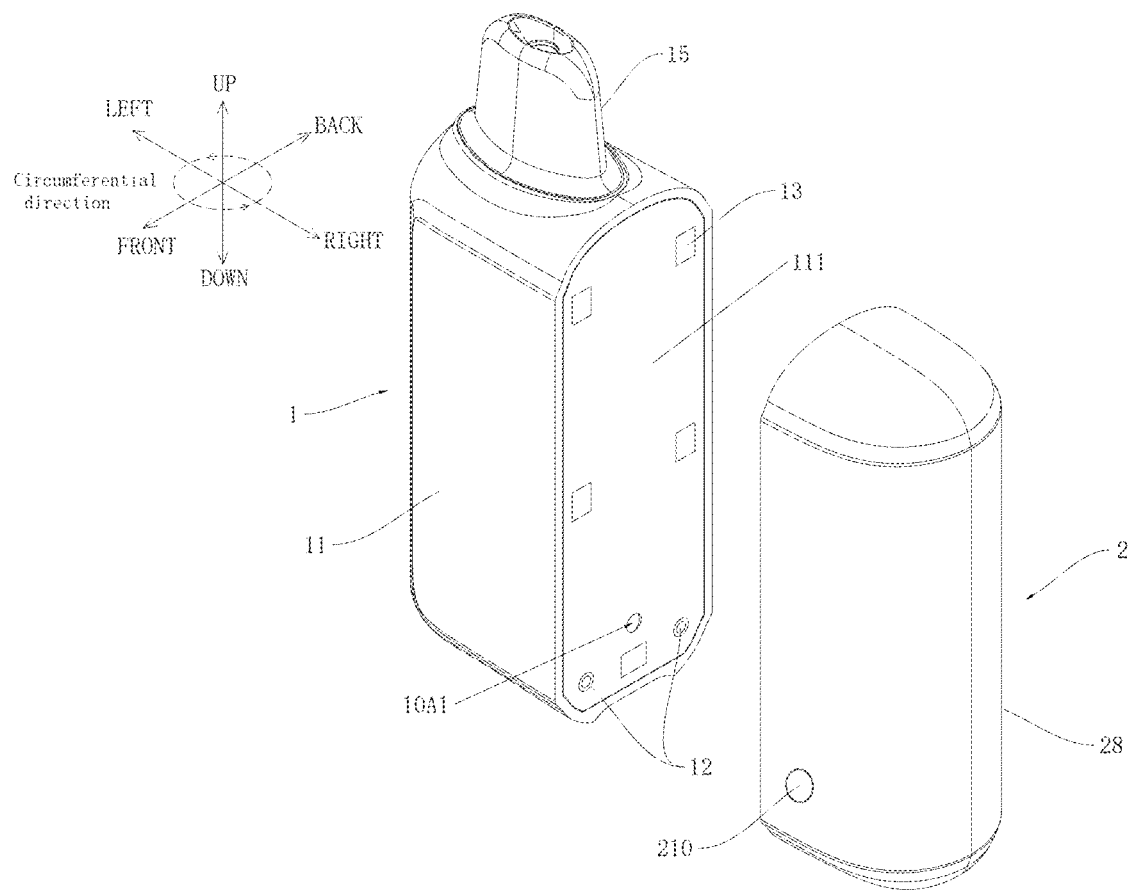
FIG. 40 is a schematic diagram of a structural decomposition of the aerosol generating device of FIG. 38.
Figure 41:
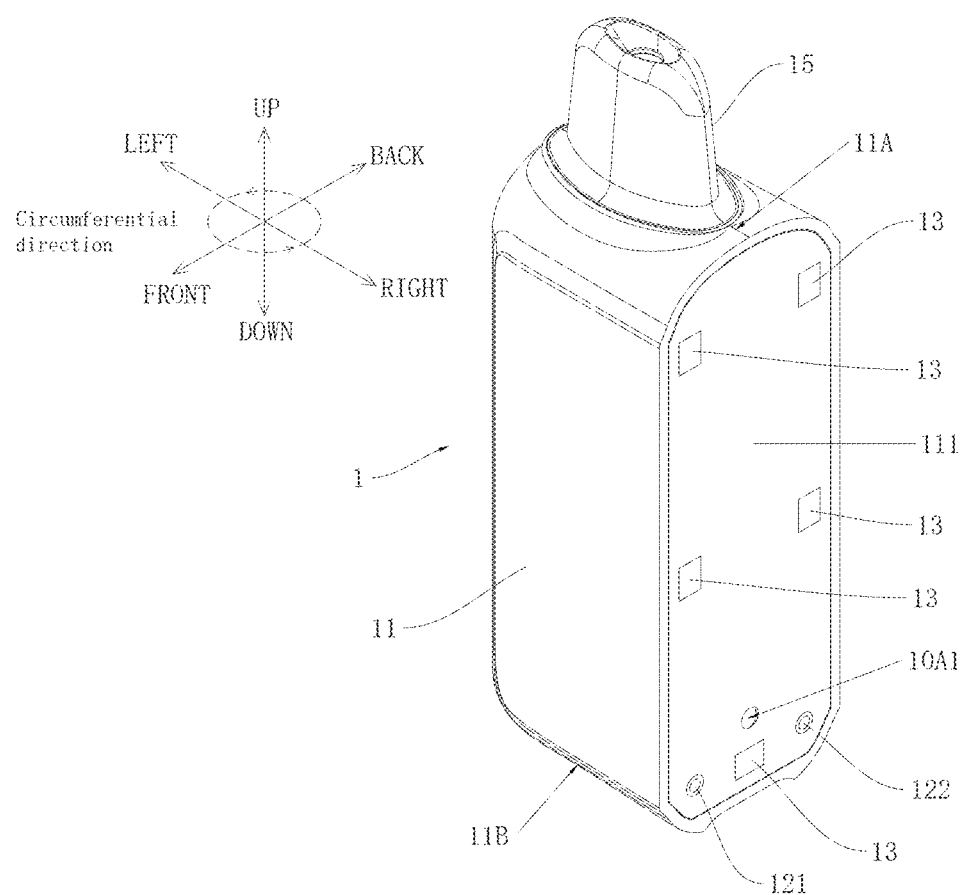
FIG. 41 is a schematic diagram of a three-dimensional structure of an example atomizing module in the fourth embodiment of the present disclosure.
Figure 42:
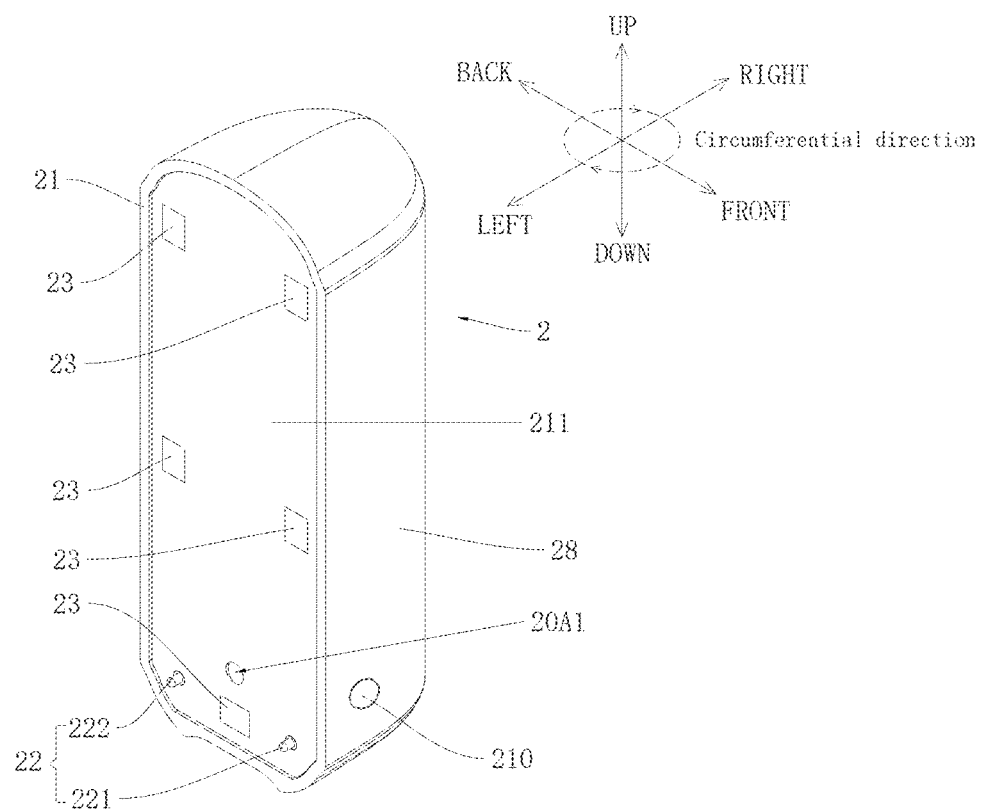
FIG. 42 is a schematic diagram of a three-dimensional structure of an example power supply module in the fourth embodiment of the present disclosure.
Figure 43:
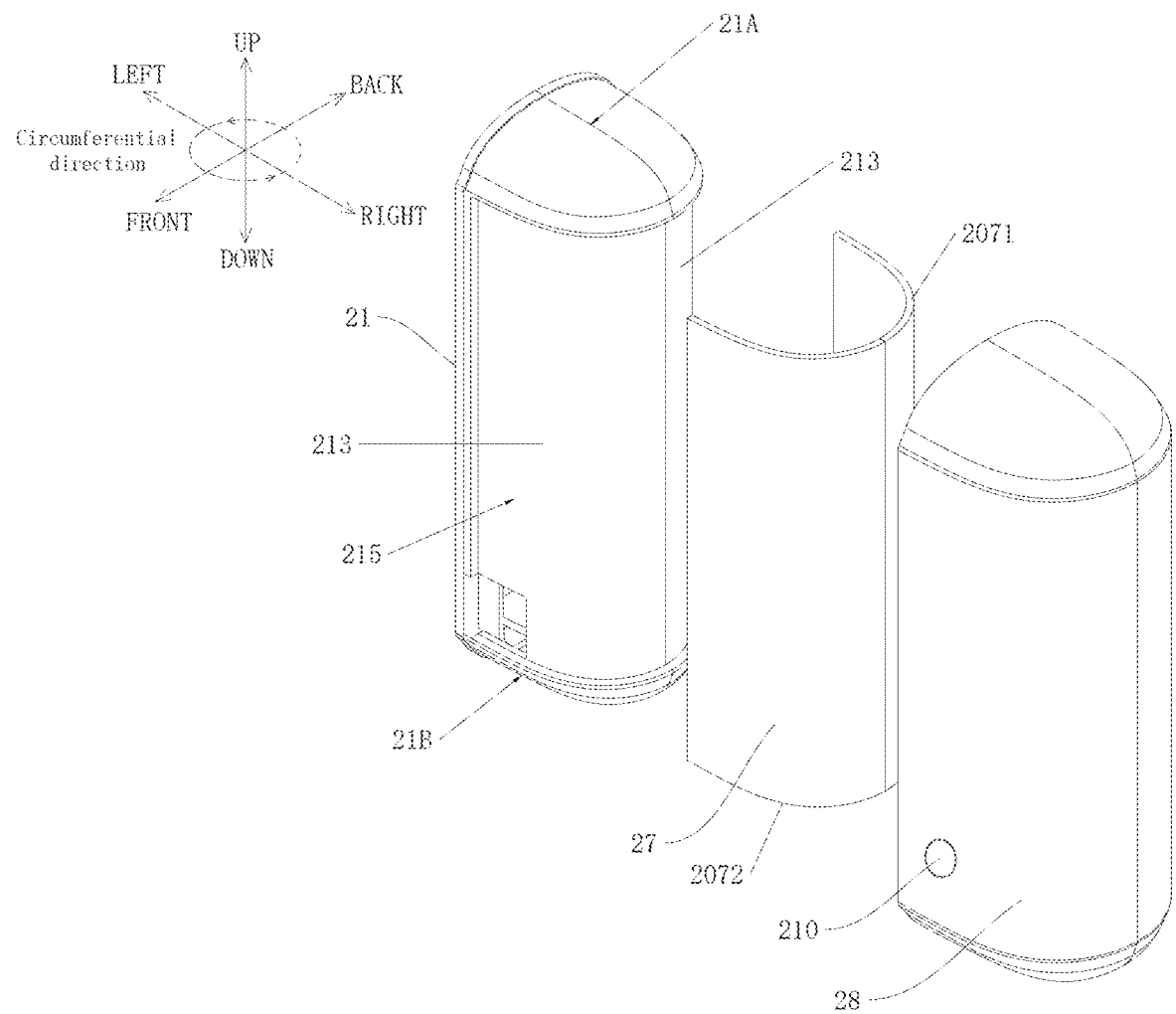
FIG. 43 is a schematic diagram of a structural decomposition of the power supply module of FIG. 42 in the fourth embodiment of the present disclosure.
Figure 44:
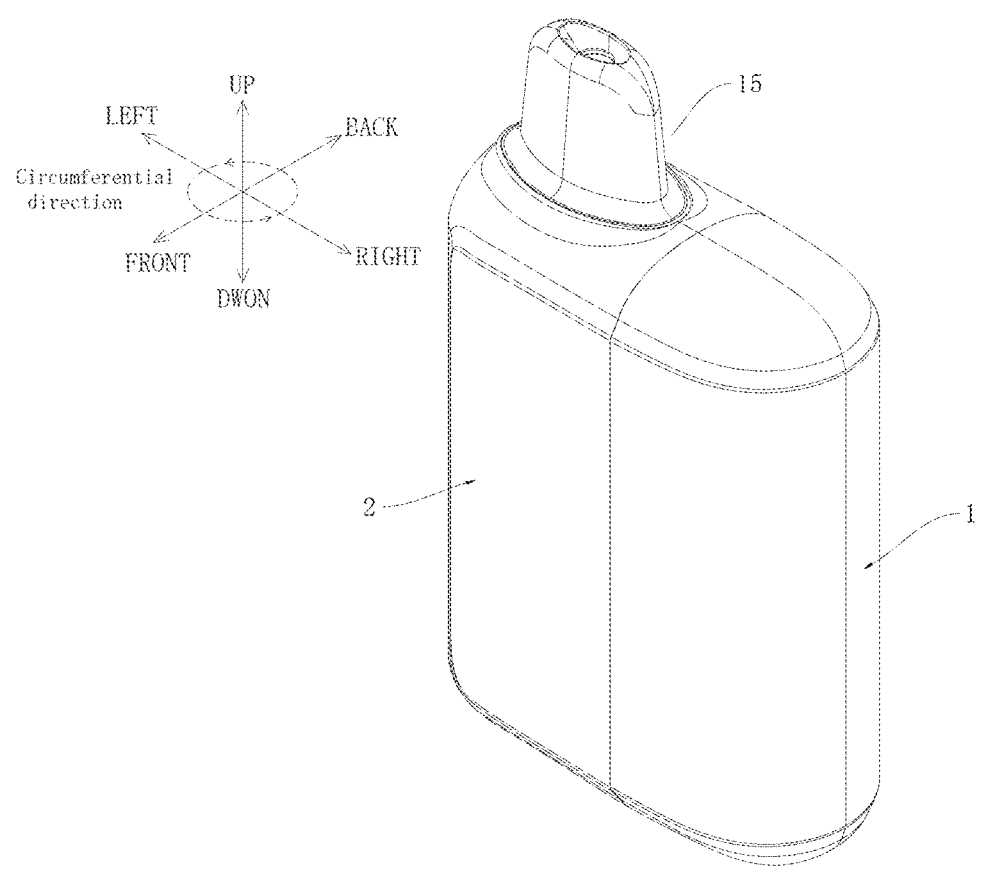
FIG. 44 is a schematic diagram of a three-dimensional structure of an example aerosol generating device in a fifth embodiment of the present disclosure.
Figure 45:
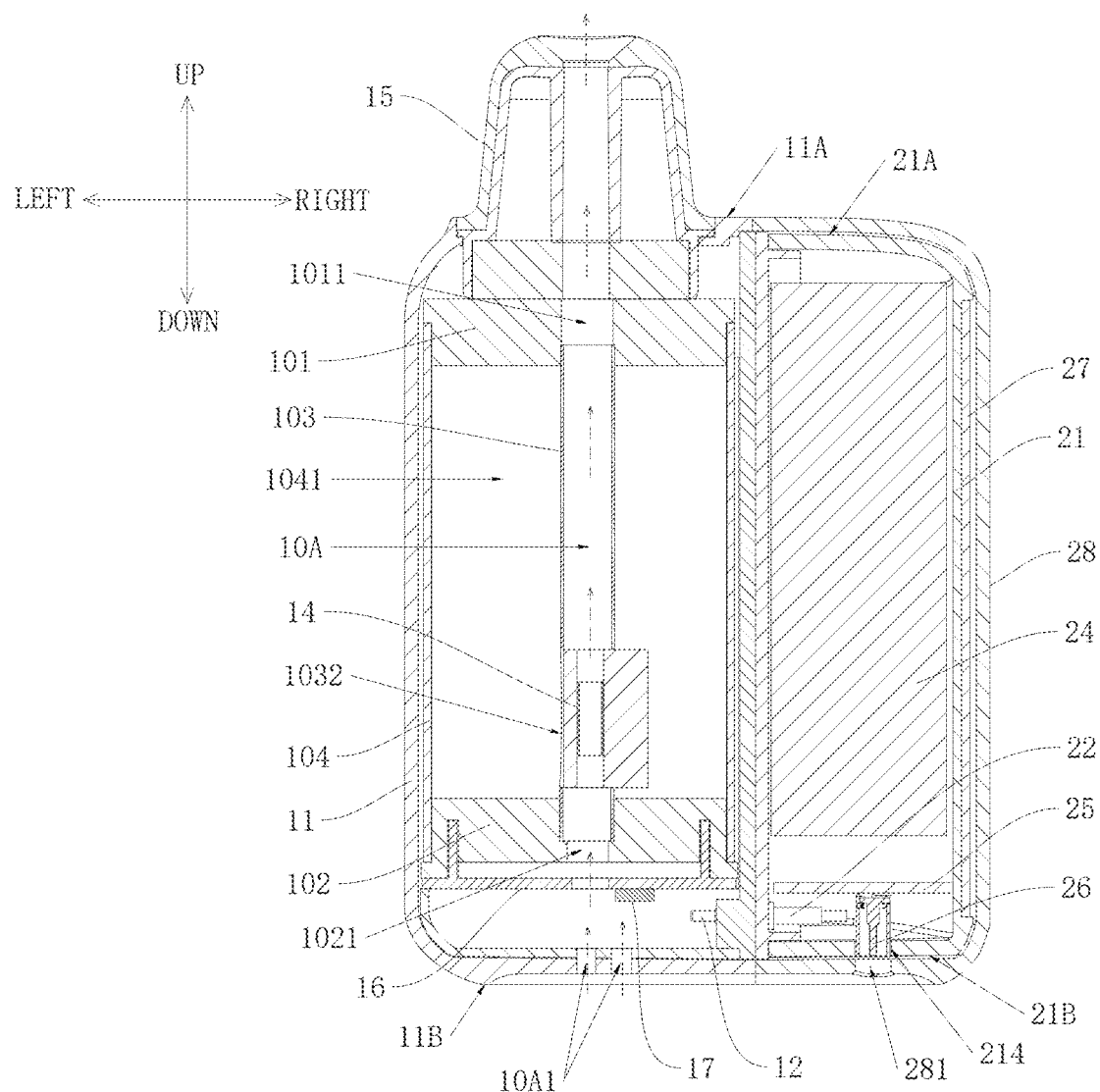
FIG. 45 is a cross-sectional view of the aerosol generating device of FIG. 44 in the fifth embodiment of the present disclosure.
Figure 46:
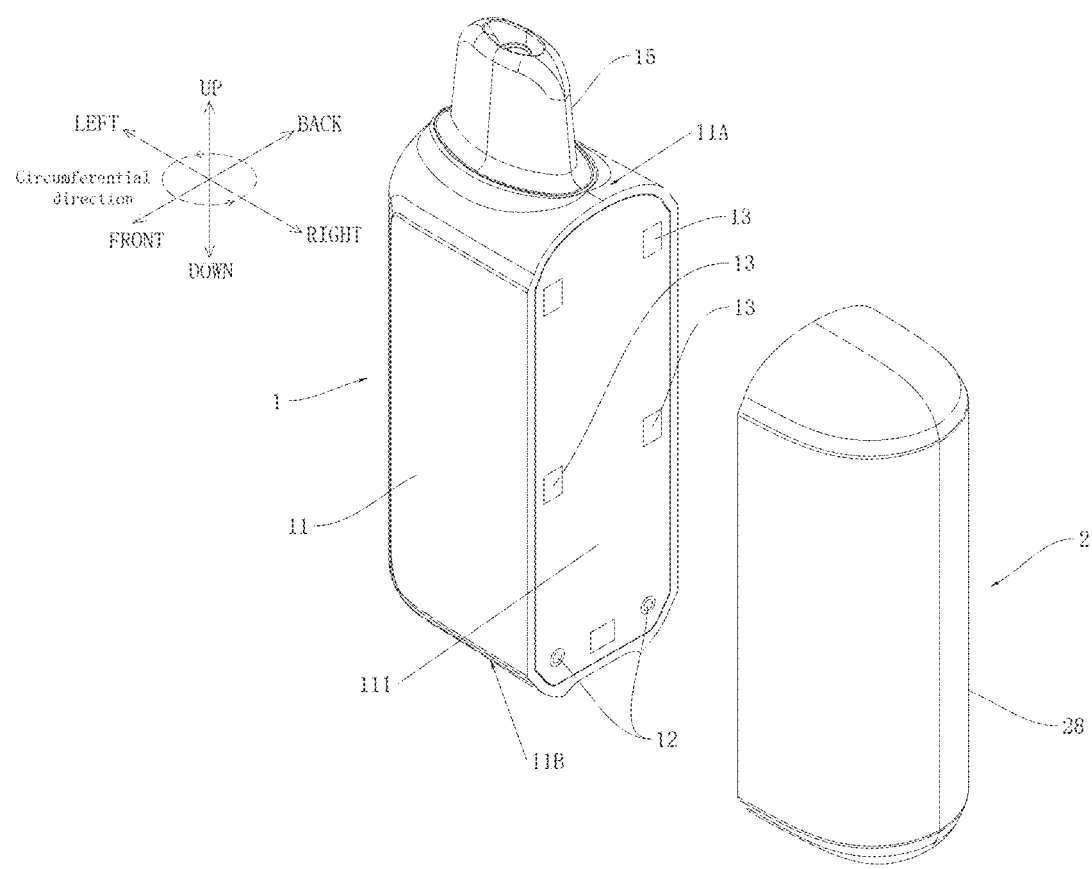
FIG. 46 is a schematic diagram of a structural decomposition of the aerosol generating device of FIG. 44.
Figure 47:
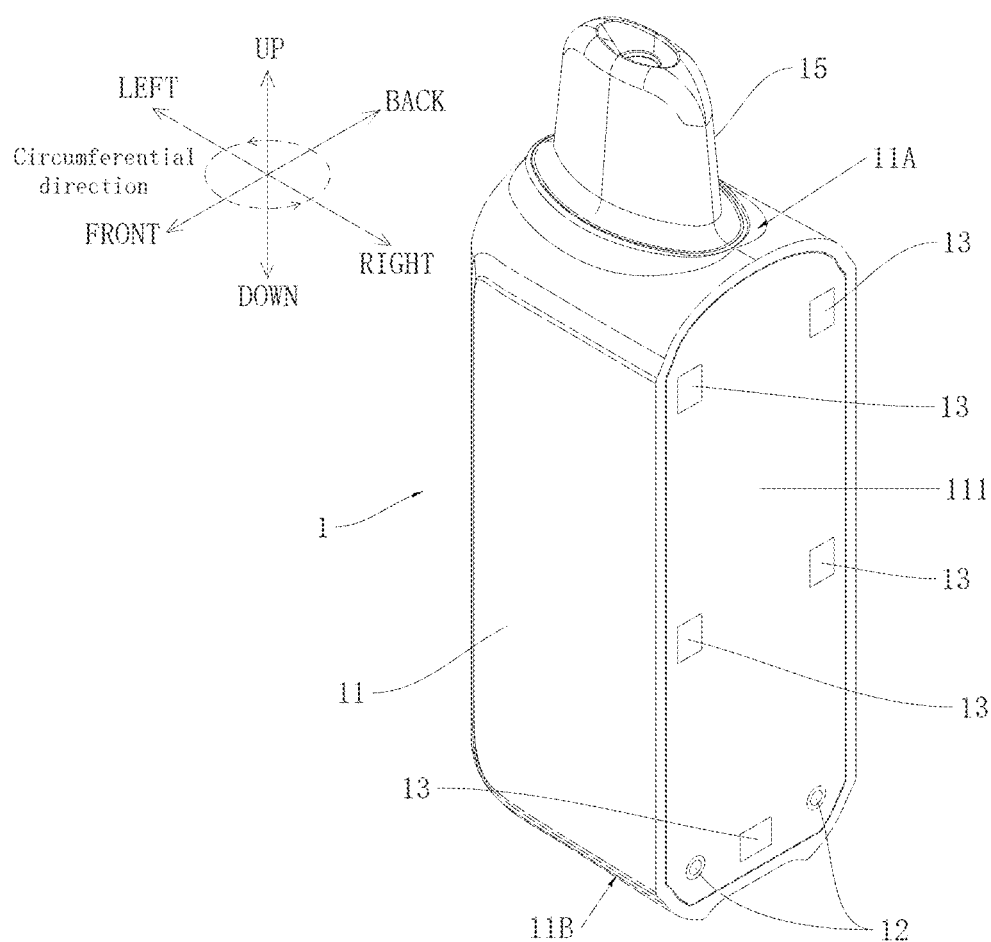
FIG. 47 is a schematic diagram of a three-dimensional structure of an example atomizing module of FIG. 44 in the fifth embodiment of the present disclosure.
Figure 48:
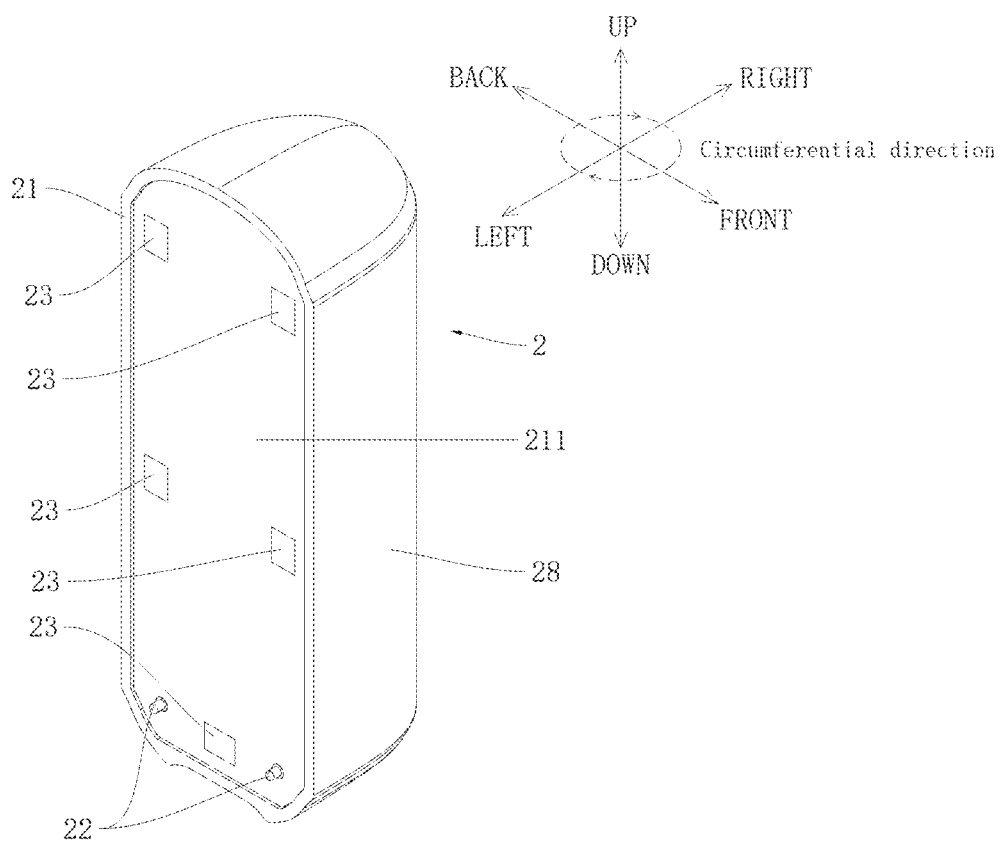
FIG. 48 is a schematic diagram of a three-dimensional structure of an example power supply module in the fifth embodiment of the present disclosure.
Figure 49:
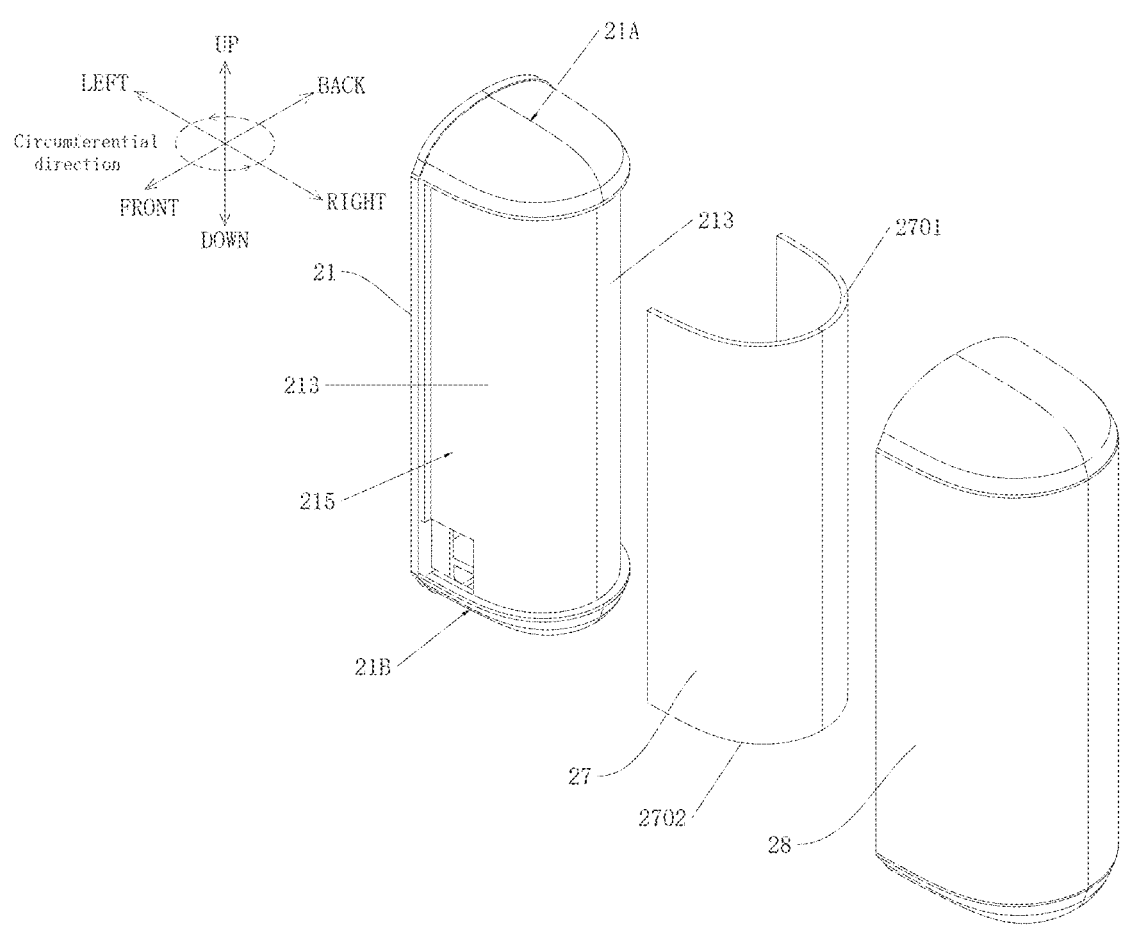
FIG. 49 is a schematic diagram of a structural decomposition of the power supply module of FIG. 48 in the fifth embodiment of the present disclosure.
Figure 50:
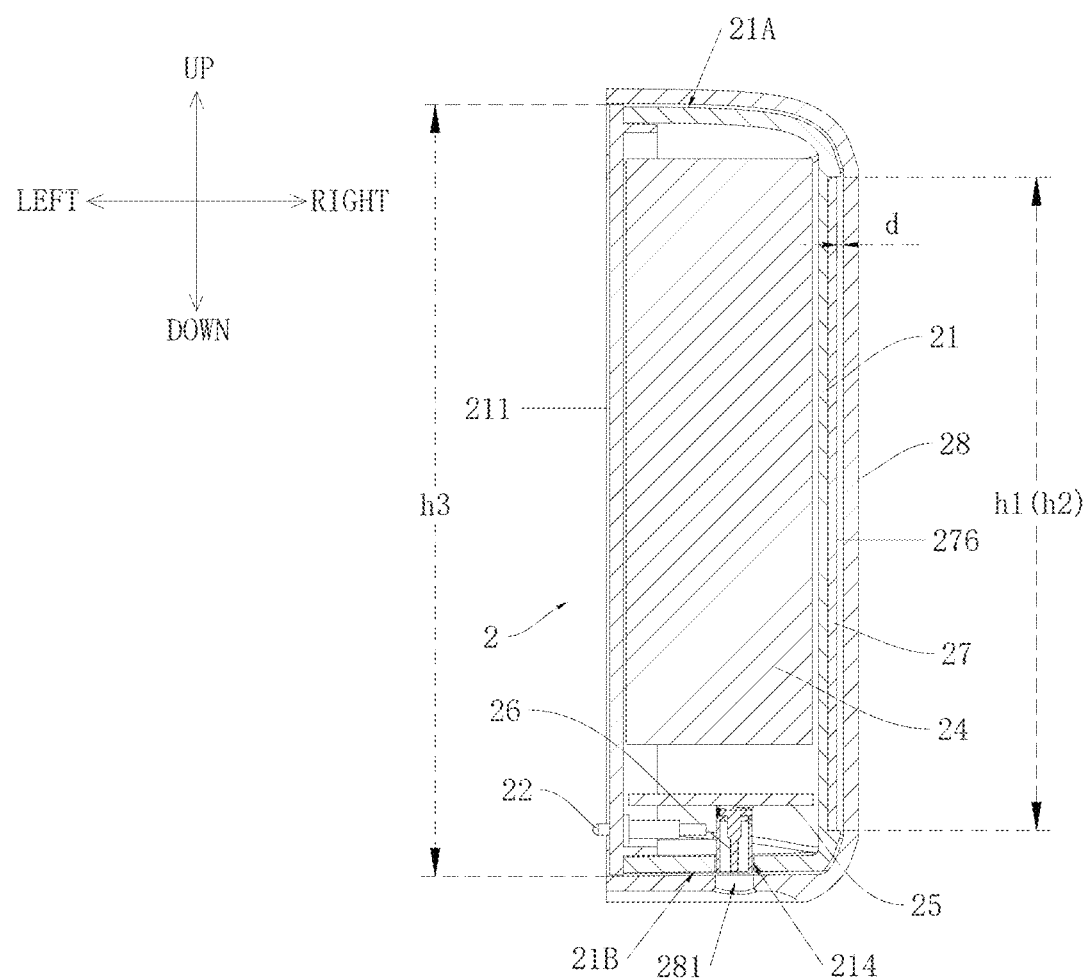
FIG. 50 is a cross-sectional view of the power supply module of FIG. 48 in the fifth embodiment of the present disclosure.

Furthermore, referring to FIGS. 13-16, in some optional implementation of the first embodiment of the present disclosure, the first side wall 111 of the first housing 11 is provided with a first protruding portion 1110. An end surface of the first electrode assembly 12 is exposedly disposed on the first protruding portion 1110. The second side wall of the second housing 21 is concavely disposed with a first limiting groove 2110 adapted to the first protruding portion 1110. A portion of the second electrode assembly 22 is exposedly disposed inside the first limiting groove 2110, and the first protruding portion 1110 fits in the first limiting groove 2110. Thus, in the first aspect, using the mutual cooperation between the first protruding portion 1110 and the first limiting groove 2110 is possible to better limit the relative movement between the power supply module 2 and the atomizing module 1 along the up and down direction or the front and back direction of the aerosol generating device, thereby conducive to improving the stability of the connection between the atomizing module 1 and the power supply module 2. In the second aspect, by utilizing the alignment function between the first protruding portion 1110 and the first limiting groove 2110, the atomizing module 1 and the power supply module 2 can be assembled together more quickly and accurately. In the third aspect, the first electrode assembly 12 is wrapped by the first protruding portion 1110, and the second electrode assembly 22 is hidden inside the first limiting groove 2110. Therefore, compared to having the first electrode assembly 12 exposedly projected on the first side wall 111 of the first housing 11 (as shown in FIG. 37) and the second electrode assembly 22 exposedly projected on the second side wall 211 of the second housing 21 (as shown in FIG. 48), it is advantageous for reducing the risk of the first electrode assembly 12 and the second electrode assembly 22 being damaged by impacts from external objects when the atomizing module 1 and the power supply module 2 are transported or carried separately.

Further, taking into account that in some application scenarios, when the atomizing module 1 is damaged and needs to be replaced, the user may purchase a counterfeit atomizing module 1. The quality of the counterfeit atomizing module 1 is usually relatively poor. When the counterfeit atomizing module 1 is combined with the genuine power supply module 2 for use, it is easy to have problems such as the atomizing core 14 being burned out, the battery 24 burn out, liquid leakage, poor atomizing taste and other problems, which can not only seriously affect the user experience, but also seriously affect the commercial reputation of the genuine enterprise. Based on this consideration, to avoid the user combining the counterfeit atomizing module 1 with the genuine power supply module 2 for use and bringing the user a bad use experience, the aerosol generating device may be designed to prevent counterfeiting, as follows.

Referring to FIGS. 13-16 and FIG. 18, in some optional implementations of the first embodiment of the present disclosure, the atomizing module 1 further includes a first control circuit board 16 mounted in the first housing 11. The first control circuit board 16 can be electrically connected to the atomizing core 14 and the first electrode assembly 12, respectively. For example, the first control circuit board 16 may be electrically connected to the atomizing core 14 by wires, and the first control circuit board 16 and the first electrode assembly 12 can be electrically connected by wires or welding. The first electrode assembly 12 further includes a first communication electrode 123. The first communication electrode 123 and the first positive electrode 121, the first negative electrode 122 are spaced apart from each other. The second electrode assembly 22 further includes a second communication electrode 223. The second communication electrode 223, the second positive electrode 221, and the second negative electrode 222 are spaced apart from each other, and the second communication electrode 223 is in electrical contact with the first communication electrode 123.

The first control circuit board 16 can be configured to send pre-stored first inspection information to the second control circuit board 25 after the first negative electrode 122 is in contact with the second negative electrode 222 and the first communication electrode 123 is in contact with the second communication electrode 223. The first inspection information can be pre-stored in the first control circuit board 16.

The second control circuit board 25 can be configured to compare the first inspection information that has been received with pre-stored second inspection information to determine whether the first inspection information matches the second inspection information (e.g., whether they are the same). The second inspection information can be pre-stored in the second control circuit board 25. If the first inspection information matches the second inspection information, it indicates that the current atomizing module 1 is a genuine product matching the power supply module 2. In response to determining that the first inspection information matches the second inspection information and/or the current atomizing module 1 is a genuine product matching the power supply module 2, the second control circuit board 25 conducts the electrical connection between the second positive electrode 221 and the battery 24. Then the atomizing core 14 can normally obtain electrical energy from the battery 24 and carry out atomizing work. If the first inspection information does not match (or fails to match) the second inspection information, it indicates that the current atomizing module 1 is an imitation counterfeit product. In response to determining that the first inspection information does not match the second inspection information and/or the current atomizing module 1 is an imitation counterfeit product, the second control circuit board 25 disconnect the electrical connection between the second positive electrode 221 and the battery 24, to prevent the atomizing core 14 from powering up and working to bring the user a bad experience.

In this embodiment, it should be noted that, the form of the first inspection information can be at least one of the coded information or the first circuit parameter information, as long as the anti-counterfeiting function of the aerosol generating device can be realized, and this embodiment does not impose any specific limitation on the specific form of the first inspection information. In some examples, the coded information includes at least one of numbers, letters, or special symbols. The coded information can be used to represent the model number of the product, the date of manufacture of the product, the name of the manufacturing company, or any suitable information. The first circuit parameter information can include at least one of an impedance value of the atomizing core 14, or an impedance value between the first negative electrode 122 and the first communication electrode 123.

To improve the anti-counterfeiting performance of the aerosol generating device, the first inspection information can include the coded information and the first circuit parameter information. The second control circuit board 25 can perform multi-step (e.g., two-step) vertication or authorization. When the second control circuit board 25 receives the coded information and the first circuit parameter information sent by the first control circuit board 16, the second control circuit board 25 can first compare the first circuit parameter information with its pre-stored second circuit parameter information to determine whether the first circuit parameter information matches the second circuit parameter information. If the first circuit parameter information does not match the second circuit parameter information, it means that the current atomizing module 1 is an imitation product, and in response, the second control circuit board 25 disconnects the electrical connection between the second positive electrode 221 and the battery 24. If the first circuit parameter information matches the second circuit parameter information, the second control circuit board 25 decodes the coded information that has been received and compares the first decoded information obtained by decoding with its pre-stored second decoded information to determine whether the first decoded information matches the second decoded information. If the first decoded information does not match the second decoded information, it means that the current atomizing module 1 is an imitation product, and in response, the second control circuit board 25 disconnects the electrical connection between the second positive electrode 221 and the battery 24. If the first decoding information and the second decoding information match, it means that the current atomizing module 1 is a genuine product, and in response, the second control circuit board 25 conductive the electrical connection between the second positive electrode 221 and the battery 24.

In this embodiment, it is also to be noted that, to realize reliable electrical contact between the respective electrodes in the first electrode assembly 12 and the respective electrodes in the second electrode assembly 22, the structural form of the respective electrodes in the first electrode assembly 12 can be conductive nails, and the structural form of the respective electrodes in the second electrode assembly 22 can be conductive clastic needles. Of course, as an alternative, the structural form of the respective electrodes in the first electrode assembly 12 may be conductive clastic needles, and the structural form of the respective electrodes in the second electrode assembly 22 may be conductive nails. It can be understood here is that the conductive nail is a class of electrodes that does not have a retractable function, and the conductive clastic needle is a class of electrodes that can be retracted by itself. The specific structural composition of the conductive elastic needle can be any suitable type known to those skilled in the field, which will not be repeated here.

Further, referring to FIGS. 6, 10, 13 and 18, in some optional implementations of the first embodiment of the present disclosure, the interior of first housing 11 can be also provided with an air inlet channel 117. The air inlet end of the air inlet channel 117 can be in communication with an external environment or the outside world, and the air outlet end of the air inlet channel 117 can be in communication with the atomizing channel 1031 of the liquid storage cup 10. In some implementations, the bottom of the first housing 11 is provided with an air intake hole 10A1 which is in communication with the outside world. The air inlet channel 117 is in communication with the outside world through the air intake hole 10A1, where the air intake hole 10A1 can be regarded as the air inlet end of the air inlet channel 117. The air inlet channel 117, the second mounting hole 1021, the atomizing channel 1031, and the first mounting hole 1011 can be sequentially communicated to form the first airway 10A.

In some implementations, the atomizing module 1 further includes a first airflow sensor 17 for detecting the user's suction action at the mouthpiece body 151. For example, the first airflow sensor 17 is capable of detecting changes in the airflow in the first airway 10A. The first airflow sensor 17 can be mounted in the first housing 11 and be electrically connected with the first control circuit board 16. The first control circuit board 16 can include a first control unit 161 and a first switch tube 162. The first control unit 161 can be a controller such as a microcontroller, or a control circuit. The first control unit 161 may be called as a first micro control unit. The first control unit 161 can be electrically connected with the first switch tube 162, the first airflow sensor 17, the atomizing core 14, the first negative electrode 122, and the first communication electrode 123, respectively. The first switch tube 162 can be electrically connected with the atomizing core 14, and the first positive electrode 121, respectively. The second control circuit board 25 can include a second control unit 251 and a second switch tube 252. The second control unit 251 can be a controller such as a microcontroller, or a control circuit. The second control unit 251 may be called as a second micro control unit. The second control unit 251 can be electrically connected with the battery 24, the second switch tube 252, the second negative electrode 222 and the second communication electrode 223, respectively. The second switch tube 252 can be electrically connected with the battery 24 and the second positive electrode 221 respectively.

The first control unit 161 can be configured to send (or transmit) the first inspection information that is pre-stored in the first control unit 161 to the second control unit 251 after the first negative electrode 122 is in contact with the second negative electrode 222 and the first communication electrode 123 is in contact with the second communication electrode 223. Furthermore, it is also configured to control the first switch tube to be turned on when the second positive electrode 221 is in a conductive state with the battery 24 and upon receiving a suction signal sent by the first airflow sensor, so as to enable the atomizing core 14 to be energized for work.

The second control unit 251 can be configured to compare the first inspection information that has been received with the second inspection information that is pre-stored in the second control unit 251 to determine whether the first inspection information matches the second inspection information. If the first inspection information and the second inspection information do not match, it means that the current atomizing module 1 is an imitation product, and in response, the second control unit 251 controls the second switch tube 252 to be turned off, thereby making the second positive electrode 221 and the battery 24 to be in a disconnected state, so as to avoid the atomizing core 14 to be energized for work. If the first inspection information and the second inspection information match, it means that the current atomizing module 1 is a genuine product, and in response, the second control unit 251 controls the second switch tube 252 to be turned on, thereby making the second positive electrode 221 and the battery 24 to be in the conductive state, so as to enable the subsequent atomizing core 14 can be normally energized for work.

In this embodiment, when the first negative electrode 122 contacts the second negative electrode 222 and the first communication electrode 123 contacts the second communication electrode 223, the first control unit 161 is activated by turning on the battery 24. The first control unit 161 can send the first inspection information to the second control unit 251 after being activated, so that the second control unit 251 can determine whether the current atomizing module 1 is genuine according to the first inspection information. When the second control unit 251 determines that the current atomizing module 1 is genuine, the second control unit 251 controls the second switch tube 252 to be turned on, so that the atomizing core 14 can be in standby state. In this case, if the user bites the mouthpiece body 151 to suction at this time, a suction airflow can be formed in the path where the air intake hole 10A1, the air inlet channel 117, the atomizing channel 1031 and the suction channel 150 are communicated in sequence. The suction airflow can trigger the first airflow sensor 17 to send a suction signal to the first control unit 161 to indicate that the user is suctioning. When the first control unit 161 receives the suction signal, the first control unit 161 controls the first switch tube 162 to be turned on, thereby causing the atomizing core 14 to be energized and to atomize the liquid aerosol-forming substrate adsorbed by the atomizing core 14 into the aerosol. When the suction airflow flows through the atomizing core 14, the aerosol generated by the atomizing core 14 can be carried away by the suction airflow and eventually discharged to the mouthpiece body 151 to be inhaled by the user. When the user stops suction, the suction air flow disappears and triggers the first airflow sensor 17 to send a stop signal to the first control unit 161 to indicate that the user has stopped suction. When the first control unit 161 receives the stop signal, the first control unit 161 controls the first switch tube 162 to be turned off, so that the atomizing core 14 is powered off and stops working. In this way, the intelligence of the aerosol generation device is improved, which is conducive to improving the user experience.

In this embodiment, in some application scenarios, if the second control unit 251 of the second control circuit board 25 does not receive the first inspection information sent by the first control unit 161 of the first control circuit board 16 within a predetermined length of time (which predetermined length of time may be 2 seconds, 3 seconds, 4 seconds, or the like) after the first negative electrode 122 contacts the second negative electrode 222 and the first communication electrode 123 contacts the second communication electrode 223, the second control unit 251 may accordingly determine that the current atomizing module 1 is an imitation product. In some cases, the second control unit 251 of the second control circuit board 25 does not receive the first inspection information sent by the first control unit 161 of the first control circuit board 16, then the second control unit 251 may determine that the current atomizing module 1 is an imitation product. It can be understood here that after the first negative electrode 122 contacts the second negative electrode 222 and the first communication electrode 123 contacts the second communication electrode 223, the impedance value between the second negative electrode 222 and the second communication electrode 223 may change (e.g., become larger), and the second control unit 251 accordingly can be informed that the atomizing module 1 and the power supply module 2 have been assembled together, and then begin to enter the countdown.

In this embodiment, it is also to be noted that, in some implementations, the types of the first switch tube 162 and the second switch tube 252 can be a diode, a transistor, a metal-oxide-semiconductor field-effect tube, or the like, as long as the types of the first switch tube 162 and the second switch tube 252 are able to satisfy the demand for use, and this embodiment does not impose any specific limitation on the types of the first switch tube 162 and the second switch tube 252.

Further, referring to FIG. 13 and FIGS. 16-18, in some optional implementations of the first embodiment of the present disclosure, the power supply module 2 further includes a display assembly 27 for displaying visual information. The display assembly 27 can be mounted on any circumferential side wall (e.g., a front side wall, a rear side wall, or a right side wall of the second housing 21) in the second housing 21 other than the second side wall 211. The display assembly 27 can be electrically connected to the second control circuit board 25. It is understood herein that after the display assembly 27 is mounted on the second housing 21, the light-emitting surface of the display assembly 27 is arranged facing away from the second housing 21 to enable a user to observe the visual information displayed by the display assembly 27.

In this embodiment, by adding a display assembly 27 for displaying visual information on the second housing 21, it is possible for the user to intuitively observe the visual information. The visual information can include at least one of the operating parameters of the aerosol generating device, for example, the remaining power of the battery 24, the operating temperature of the battery 24, the output power of the battery 24, the remaining amount of liquid aerosol-forming material inside the storage cavity 1041, the preset animation pattern, or any other visual information, which can be conducive to improving the user's experience. In addition, in some application scenarios, when the second control unit 251 of the second control circuit board 25 determines that the current atomizing module 1 is an imitation product, the second control unit 251 may also control the display assembly 27 to display a preset prompt message to prompt the user that the current atomizing module 1 does not match the power supply module 2, and that the user may not be able to use it for inhalation.

In this embodiment, it should be noted that, in some implementations, the structure of the display assembly 27 may be a flexible display that is bendable (such as flexible Organic Light-Emitting Diode (OLED) screen, a flexible Active-Matrix Organic Light-Emitting Diode (AMOLED) screen, a flexible Liquid Crystal Display (LCD) screen, etc.), or a rigid display that is unbendable (such as light-emitting diode (LED) plane display screen), which may be determined according to the actual use needs, and this embodiment does not make any specific restrictions on this.

In some implementations of the first embodiment of the present disclosure, the display assembly 27 is a bendable flexible display. The display assembly 27 can be installed on the second housing 21 along the circumferential direction of the second housing 21 and covers at least two circumferential side walls of the second housing 21 except the second side wall 211. In some examples, e.g., as shown in FIG. 13 and FIGS. 16-17, the second housing 21 also has three third side walls 213 located between the third end face 21A and the fourth end face 21B along its circumferential direction. It can be understood here that the three third side walls 213 are respectively a front side wall, a right side wall and a rear side wall of the second housing 21. One of the three third side wall 213 and the second side wall 211 can be disposed back-to-back with each other along the first direction of the second housing 21, and the remaining two of the three third side walls 213 can be disposed back-to-back with each other along the second direction of the second housing 21. The display assembly 27 can be installed on the second housing 21 along the circumferential direction of the second housing 21 and can cover at least two third side walls 213.

The first direction of the second housing 21, the second direction of the second housing 21, and the height direction of the second housing 21 can be mutually perpendicular to each other. Schematically, the first direction of the second housing 21 can be the left and right directions in FIGS. 15-17. The second direction of the second housing 21 can be the front and back directions in FIGS. 15-17, and the height direction of the second housing 21 can be the up and down directions in FIGS. 15-17. In this way, compared with using a rigid display that can only cover one of the outer walls of the second housing 21, the technical solution of this embodiment enables the display area of the display assembly 27 to be distributed along the circumferential direction of the second housing 21 on a plurality of differently oriented outer sidewalls of the second housing 21, thus improving the information display range of the power supply module 2. This enables power supply module 2 to display information in multiple directions and display more visual information for users.

Figure 19:
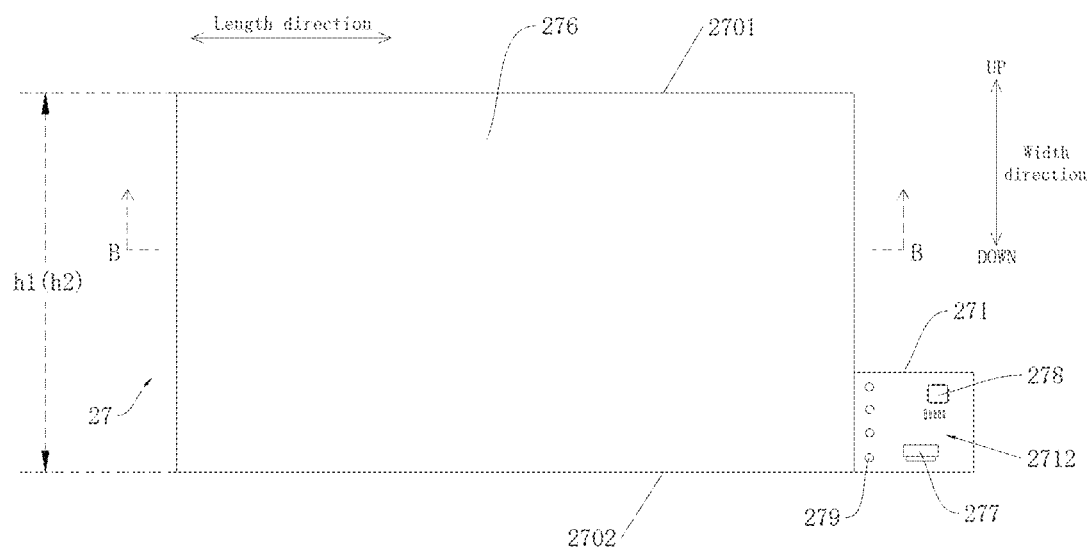
FIG. 19 is a plan view of an example display assembly when the display assembly is in an unfolded state in a first implementation approach of the present disclosure.
Figure 20:
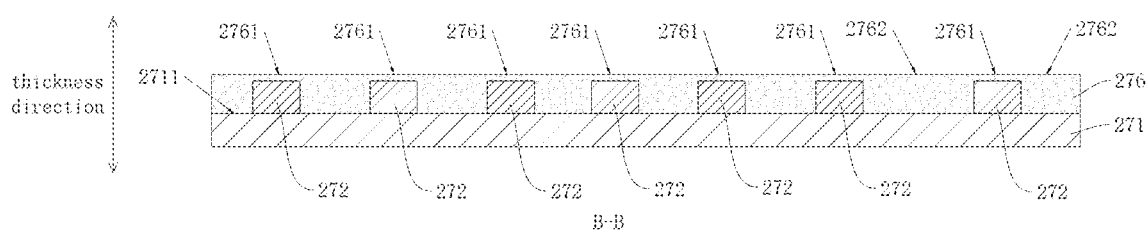
FIG. 20 is a sectional view of FIG. 19 along B-B direction.
Figure 21:
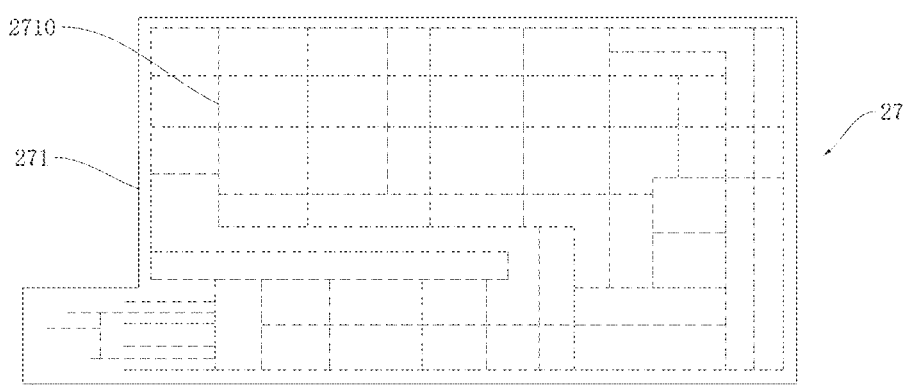
FIG. 21 is a schematic view of a backside of the display assembly of FIG. 19.
Figure 22:
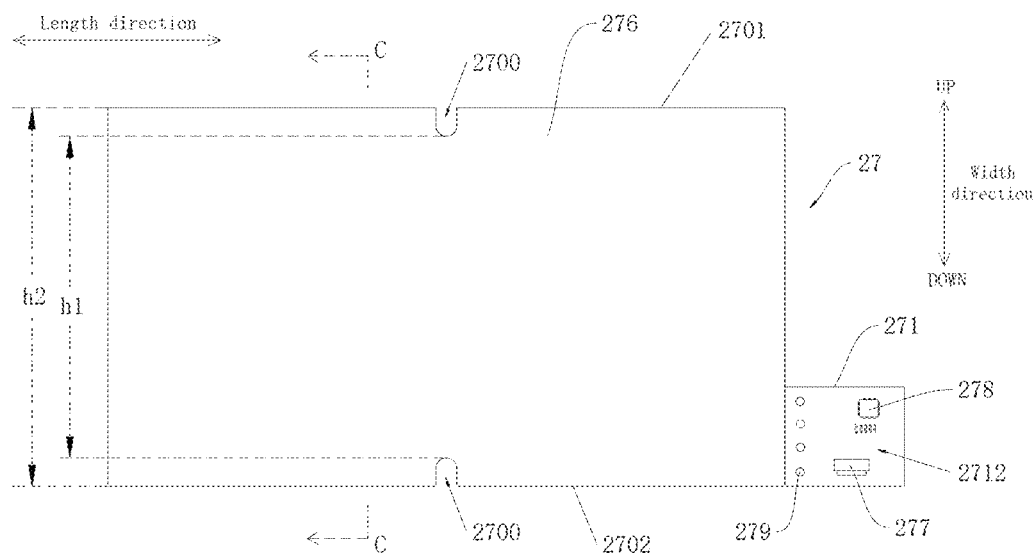
FIG. 22 is a plan view of the display assembly of FIG. 19 when the display assembly is in the unfolded state in a second implementation approach of the present disclosure.
Figure 30:
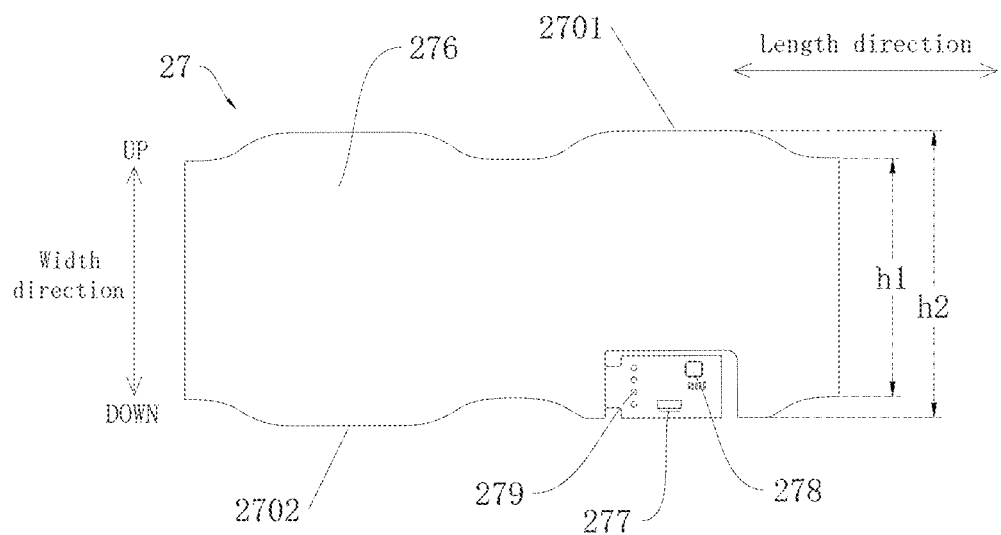
FIG. 30 is a plan view of the display assembly when the display assembly is in the unfolded state in a fourth implementation approach of the present disclosure.

Further, referring to FIG. 16, FIG. 19, FIG. 22, FIG. 25 and FIG. 30, in some optional embodiments of the present disclosure, the display assembly 27 can have a first edge 2701 and a second edge 2702 opposite to each other along the height direction of the second housing 21. In some cases, the minimum vertical height between the first edge 2701 and the second edge 2702 is h1. The maximum vertical height between the first edge 2701 and the second edge 2702 is h2. The vertical height between the third end face 21A of the second housing 21 and the fourth end face 21B of the second housing 21 is h3. The relationships between h1, h2 and h3 can be as follows: $0.5h3 \leq h1 \leq 0.9h3$, $0.5h3 \leq h2 \leq 0.9h3$. For example, assuming that h3 is 70 mm, h1 may be 35 mm, 42 mm, 49 mm, 56 mm, 63 mm, etc., and h2 may be 35 mm, 42 mm, 49 mm, 56 mm, 63 mm, etc. It should be noted here that when the bendable display assembly 27 is in a non-enclosed and unfolded state, the extension tracks of the first edge 2701 and the second edge 2702 may be a horizontal straight line, a high and low undulating plurality of circular arc lines, or a high and low undulating plurality of folding lines (the folding lines may be a horizontal line, a circular arc line, an inclined line, etc.), or the like. This embodiment does not make any specific limitations on this. In this embodiment, it can be understood that when the bendable display assembly 27 is in a non-enclosed and unfolded state, if the display area of the display assembly 27 is a rectangle (e.g., as shown in FIG. 19), then h1=h2. When the bendable display assembly 27 is in a non-enclosed and unfolded state, if the display area of the display assembly 27 is an irregular shape (e.g., as shown in FIGS. 22 and 30), there is h1<h2.

In this embodiment, based on the above structural design, on one hand, by setting the minimum vertical height between the first edge 2701 and the second edge 2702 of the display assembly 27 to 0.5~0.9 times the vertical height between the third end face 21A and the fourth end face 21B of the second housing 21, it can ensure that the power supply module 2 can have a large display area along its height direction for displaying visual information. On the other hand, by setting the maximum vertical height between the first edge 2701 and the second edge 2702 of the display assembly 27 to 0.5~0.9 times the vertical height between the third end face 21A and the third end face 21A of the second housing 21, the risk may be reduced, where, when the display assembly 27 is covered over a plurality of the third side walls 213 of the second housing 21, some edges of the display assembly 27 along its width direction cannot cover the third side walls 213 of the second housing 21 and protrude out of the third end face 21A or the fourth end face 21B due to the irregular installation of the display assembly 27, thereby affecting the overall aesthetics of the exterior appearance of the power supply module 2.

In some optional embodiments of the present disclosure, when the display assembly 27 is a bendable flexible display, its structural form may be the following structural forms in addition to a flexible OLED screen, a flexible AMOLED screen, and a flexible LCD screen. The display assembly 27 may have the following structural forms.

In some implementations, e.g., with reference to FIGS. 13 and 16 and FIGS. 19-30, the display assembly 27 includes a display diaphragm 276 made of a flexible material and a flexible printed circuit board 271 having a circuit traces 2710. One side surface of the flexible printed circuit board 271 along its own thickness direction is provided with a plurality of the light-emitting elements 272, which are electrically connected to the circuit traces 2710. The side surface of the flexible printed circuit board 271 facing away from the plurality of light-emitting elements 272 may be connected to the second housing 21 by glue (the glue may be double-sided adhesive) or the like and covers at least two of the three third side walls 213 of the second housing 21. The circuit traces 2710 of the flexible printed circuit board 271 is electrically connected to the second control circuit board 25. The display diaphragm 276 can be fixedly connected to one side of the flexible printed circuit board 271 with multiple light-emitting elements 272 by adhesive (the adhesive may be double-sided adhesive, structural adhesive, optically transparent adhesive, etc.) bonding or other methods, and the display diaphragm 276 covers each of the light-emitting elements 272. The display diaphragm 276 has a plurality of light transmission regions 2761 for the light emitted by the light-emitting elements 272 to pass through, and the region of the display diaphragm 276 other than the light transmission region 2761 can be a light shielding region 2762.

In this embodiment, the flexible printed circuit board 271 also known as an FPC (Flexible Printed Circuit, FPC) can be a bendable circuit board printed with circuit traces 2710, which has the advantages of good flexibility, light weight, and/or thin thickness, etc. In an example manufacturing process, the required flexible printed circuit board 271 can be obtained by printing circuit traces 2710 on a polyimide film or a polyester film. In addition, the flexible printed circuit board 271 can be used as the mounting carrier of the plurality of light-emitting elements 272. The circuit traces 2710 on the flexible printed circuit board 271 can be used as the medium for the electrical connection between the plurality of light-emitting elements 272 and the second control circuit board 25.

In this embodiment, the light-emitting element 272 can be a LED lamp bead and other components that can be energized to emit light. In addition, the light-emitting element 272 may be fixed on the surface of the flexible printed circuit board 271 by welding, bonding (such as bonding by insulating glue or conductive glue), and electrically connected with the circuit traces 2710 of the flexible printed circuit board 271.

In this embodiment, the material of the display diaphragm 276 may be a flexible materials such as polyimide (PI for short), polyethylene terephthalate (PET for short), polyethylene phthalate (PEN for short), liquid crystal polymer (LCP for short), polyvinyl alcohol (PVA for short), or polydimethylsiloxane (PDMS for short), as long as the material of the display diaphragm 276 can meet the use needs, and this embodiment has no specific restrictions on the specific material of the display diaphragm 276.

In some implementations, when the display diaphragm 276 is made of a transparent flexible material, the light transmission region 2761 and the light shielding region 2762 can be formed on the display diaphragm 276 by coating light-shielding ink or the like. For example, when the display diaphragm 276 is a transparent polyimide thin film, the light shielding ink can be coated on the surface of the polyimide film in a predetermined manner. The area of the polyimide film coated with the light blocking ink may be regarded as the light shielding region 2762 of the display diaphragm 276, and the area that is not coated with light blocking ink in the polyimide film can be regarded as the light transmission region 2761 of the display diaphragm 276.

In some implementations, when the display diaphragm 276 is made of opaque flexible material, the light transmission region 2761 and the light shielding region 2762 can be formed on the display diaphragm 276 by laser engraving or other methods. For example, when the display diaphragm 276 is an opaque PET film, the required light transmission region 2761 can be carved on the surface of the PET film by laser engraving (at this time, the light transmission region 2761 is essentially a through hole), and the non carved area in the PET film becomes the light shielding region 2762. Of course, the display diaphragm 276 can also be another mature diaphragm structure with a light transmission region 2761 and a light shielding region 2762. For example, in some implementations, the display diaphragm 276 can also be a mature PET color film with a light transmission region 2761 and a light shielding region 2762. As long as the use requirements can be met, this embodiment does not make specific restrictions on this.

Figure 28:
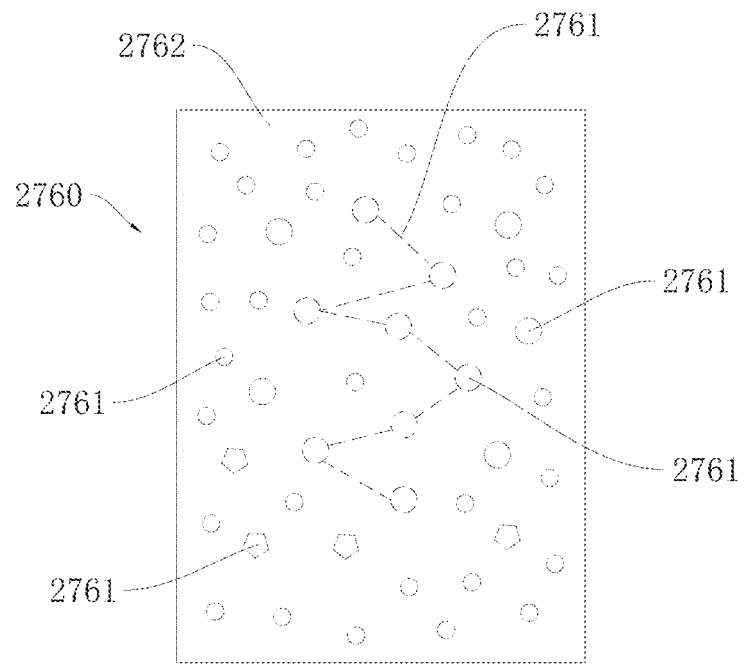
FIG. 28 is a plan view of an example flexible display film having light-transmitting regions in the shape of dots and lines in the third implementation approach of the present disclosure.
Figure 29:
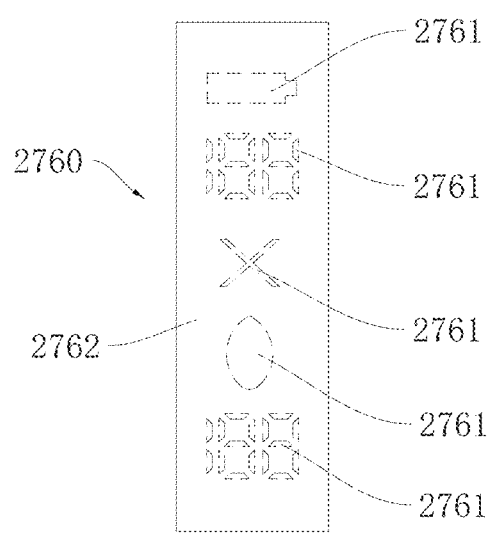
FIG. 29 is a plan view of a flexible display film having light-transmitting regions in the shape of numbers and letters in the third implementation approach of the present disclosure.

In addition, in some implementations, the number of light transmission regions 2761 on the display diaphragm 276 and the shape and size of each light transmission region 2761 can be determined according to the actual use needs. This embodiment does not make specific restrictions on this. Optionally, e.g., as shown in FIGS. 28-29, the shape of light transmission region 2761 can be text shape, number shape, letter shape, or graphic shape (such as dot shape, line shape), etc. When the light emitted by the light-emitting element 272 reaches the corresponding light transmission region 2761, the light display information of the corresponding shape can be displayed. For example, when the light emitted by the light-emitting element 272 reaches the light transmission region 2761 of the letter shape, the user can observe the light-emitting letters on the surface of the display diaphragm 276. In this way, the combination of multiple light transmission regions 2761 of different shapes can be carried out. A variety of different shapes of light display information can be obtained, so that different types of visual information can be displayed by combining different shapes of light display information, such as the remaining power of battery 24, the operating temperature of battery 24, the output power of battery 24, the remaining amount of liquid aerosol forming substances in storage cavity 1041, and/or preset animation patterns, etc. In addition, the number of light-emitting elements 272 corresponding to each light transmission region 2761 can be one or multiple, which can be determined according to the actual use needs, and this embodiment does not make specific restrictions on this.

In this embodiment, based on the above structural design, the second control circuit board 25 can control the plurality of light-emitting elements 272 to emit light when powered or to stop emitting light when power is disconnected. The light emitted by the plurality of light-emitting elements 272 when powered may be displayed in the light transmission region 2761 of the display diaphragm 276, which means that the display diaphragm 276 may be used as a light-emitting surface of the display assembly 27. The light transmission region 2761 of the display diaphragm 276 may be used as a light display area of the display assembly 27, thereby realizing the display function of the display assembly 27. In addition, both the display diaphragm 276 and the flexible printed circuit board 271 are flexible structures, the display assembly 27 formed by laminating the display diaphragm 276 with the flexible printed circuit board 271 can be also made to be a flexible structure, thereby making the display assembly 27 have a bendable characteristic. Moreover, compared to a flexible OLED screen, a flexible AMOLED screen, a flexible LCD screen, or an LED flat panel display, the display assembly 27 provided in this embodiment has the advantages of simple structure and low cost.

Figure 26:
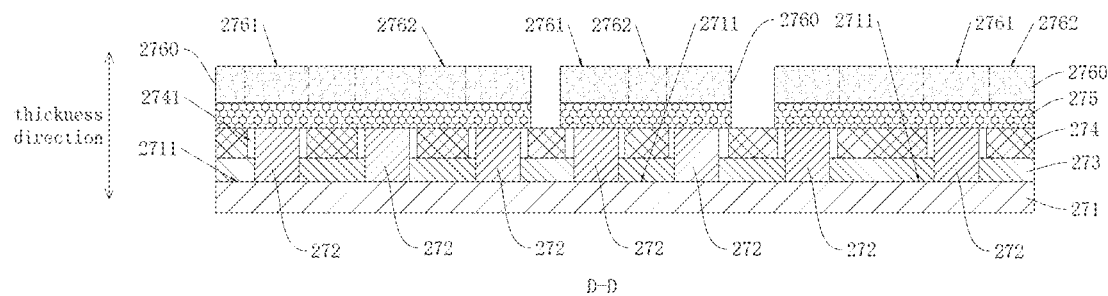
FIG. 26 is a sectional view of FIG. 25 along D-D direction.
Figure 27:
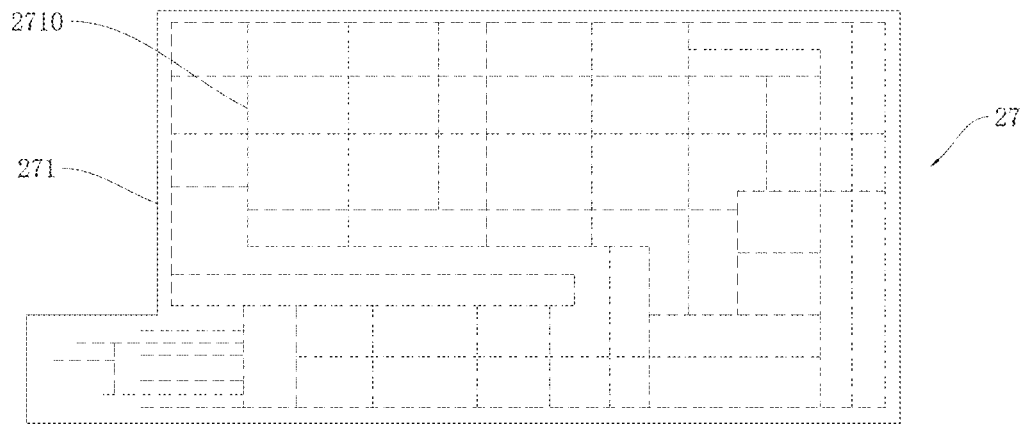
FIG. 27 is a schematic view of the backside of the display assembly of FIG. 25.

Further, referring to FIG. 22 or FIG. 26, in some optional embodiments of the present disclosure, the display assembly 27 can further include a flexible diffusion film 275 sandwiched between the flexible printed circuit board 271 and the display diaphragm 276. The flexible diffusion film 275 can cover each of the plurality of the light transmission regions 2761 of the display diaphragm 276.

In this embodiment, the flexible diffusion film 275 can be provided to ensure that the light emitted by the light-emitting element 272 is uniformly diffused under the premise that the display assembly 27 can be bent, so that the light emitted by the light-emitting element 272 can be more uniformly diffused onto the light transmission region 2761 of the display diaphragm 276, and thus the uniformity of the light display of the display assembly 27 can be improved. Among them, in some examples, the flexible diffusion film 275 can be a transparent flexible film coated with fluorescent ink (for example, the fluorescent ink can be coated on a transparent PET film), or any other flexible film with the light diffusion function, as long as it can satisfy the use requirements, and this embodiment does not make any specific limitations thereon. Optionally, in some implementations, the flexible diffusion film 275 can be a fluorescent ink film sheet with a yellow color. In this embodiment, the flexible diffusion film 275 and the display diaphragm 276 can be laminated together by glue, and the flexible diffusion film 275 and the flexible printed circuit board 271 can be laminated together by glue.

Further, with continued reference to FIG. 22 or FIG. 26, in some optional embodiments of the present disclosure, the display assembly 27 can further includes a flexible light-shielding sheet 274 sandwiched between the flexible printed circuit board 271 and the display diaphragm 276. The flexible light-shielding sheet 274 is provided with a plurality of light transmission holes 2741, with at least one the light-emitting element 272 disposed within each light-transmitting hole 2741. Each the light transmission region 2761 is correspondingly arranged with at least one the light transmission hole 2741. It should be noted herein that, the number of light transmission holes 2741 on the flexible light-shielding sheet 274 and the number of light transmission regions 2761 on the display diaphragm 276 can be the same or different, as long as they are able to satisfy the needs of use, and this embodiment does not impose any specific limitations in this regard. In addition, the shape and the size of the light transmission hole 2741 on the flexible light-shielding sheet 274 and the shape and the size of the corresponding light transmission region 2761 on the display diaphragm 276 can be the same or different, as long as they can meet the use requirements, and this embodiment does not impose any specific limitations in this regard.

In this embodiment, the flexible light-shielding sheet 274 can reduce the risk of light leakage occurring in the display assembly 27 under the premise of ensuring that the display assembly 27 can still be bent, so that the light emitted by the light-emitting element 272 can be more fully and centrally transmitted to the light transmission region 2761 of the display diaphragm 276, thereby contributing to the improvement of the light display effect of the display assembly 27. Among them, the flexible light-shielding sheet 274 may be made of a flexible material such as non-transparent silicone rubber, silicone rubber sponge, or the like, as long as it can satisfy the use requirements, and this embodiment does not make any specific limitations in this regard. In this embodiment, it is to be noted that in some embodiments, the flexible light-shielding sheet 274 and the display diaphragm 276 can be laminated together by glue, and the flexible light-shielding sheet 274 and the flexible printed circuit board 271 can be laminated together by glue.

Further, with continued reference to FIG. 22 or FIG. 26, in some optional embodiments of the present disclosure, the display assembly 27 further includes a flexible reflective layer 273 sandwiched between the display diaphragm 276 and the flexible printed circuit board 271. Each of the plurality of light-emitting elements 272 can be disposed revealingly from the flexible reflective layer 273.

In this embodiment, the flexible reflective layer 273 can improve the light display effect of the display assembly 27 under the premise of ensuring that the display assembly 27 can still be bent. In some use scenarios, a part of the light emitted by the light-emitting element 272 can be reflected after irradiating the light transmission region 2761 (or the flexible diffusion film 275) of the display diaphragm 276. The presence of the flexible reflective layer 273 can, to a certain extent, reflect the partially reflected light back to the light transmission region 2761 of the display diaphragm 276 again, thereby being able to improve the utilization rate of the light, so that the display assembly 27 can obtain a better light display effect. In some implementations, the flexible reflective layer 273 may be a flexible reflective film (such as a transparent polyimide film), a paint layer (optionally, to achieve a better reflective effect, a white paint layer may be used as the flexible reflective layer 273), or a reflective ink layer, as long as it is able to satisfy the requirements for use, and the present embodiment does not make any specific limitations thereon. In this embodiment, it is to be noted that in some embodiments, the flexible reflective layer 273 and the display diaphragm 276 may be laminated together by glue adhesion, and the flexible reflective layer 273 and the flexible printed circuit board 271 may be laminated together by glue adhesion.

Figure 23:
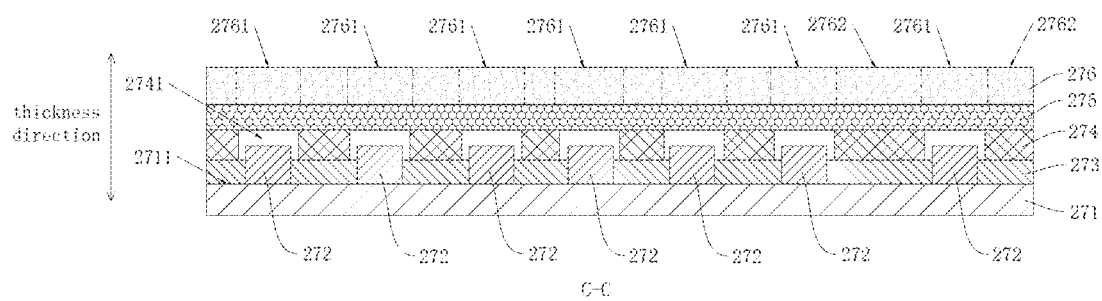
FIG. 23 is a sectional view of FIG. 22 along C-C direction.

It should be added herein that, in the above structural design of the display assembly 27 including the display diaphragm 276, the flexible diffusion film 275, the flexible light-shielding sheet 274, and the flexible reflective layer 273 may coexist simultaneously, or may be selected therefrom to be set up in either one or both of them according to the actual needs of use, and this embodiment does not make any specific limitations thereon. For example, to obtain a better light display effect, as shown in FIG. 23, the display diaphragm 276, the flexible diffusion film 275, the flexible light-shielding sheet 274, the flexible reflective layer 273, and the flexible printed circuit board 271 are set up in a sequential layer stack, where two adjacent layers of the structure may be stacked together by adhesive bonding.

Further, referring to FIGS. 19, 22, 25, and 30, in some optional embodiments of the present disclosure, one side surface of the flexible printed circuit board 271 provided with the plurality of light-emitting elements 272 has a first installation area 2711 and a second installation area 2712 that are interconnected with each other. The first installation area 2711 having an area larger than the area of the second installation area 2712. The second installation area 2712 is exposedly disposed at an edge position of the display assembly 27 (e.g., assuming that the display assembly 27 is a strip sheet having a certain length and width, the second installation area 2712 is disposed at a length edge setting or a width edge setting of the display assembly 27). The plurality of light-emitting elements 272 are fixed within the first installation area 2711. The second installation area 2712 contains at least one of a current input interface 277, a current drive element 278, or a plurality of metal test points 279 that are electrically connected to the circuit traces 2710.

In this embodiment, the current input interface 277 is provided to facilitate electrical connection between the circuit traces 2710 of the flexible printed circuit board 271 and the second control circuit board 25. For example, in some application scenarios, it is only necessary to plug one end of a flexible row of wires to the current input interface 277, and the other end of the flexible row of wires is plugged to the current output interface of the second control circuit board 25. It is possible to quickly realize the electrical connection between the circuit traces 2710 of the flexible printed circuit board 271 and the second control circuit board 25, which is very convenient to operate. Among them, the structure form of the current input interface 277 may be a socket type connector or other types of communication interfaces, as long as it can meet the needs of use, and this embodiment does not impose any specific limitations thereon. Accordingly, the structural form of the current output interface of the second control circuit board 25 may be the same as the structural form of the current input interface 277 of the flexible printed circuit board 271.

In this embodiment, the current drive element 278 is provided so as to be able to facilitate the second control circuit board 25 to control the individual light-emitting elements 272 in the display assembly 27 to emit light according to a preset manner after the battery 24 is turned on through the current input interface 277, so that the display diaphragm 276 can display the desired visual information. It is to be noted herein that, the current drive element 278 may adopt a driving chip commonly used in the field, which will not be repeated herein since its specific structure and principle of use are already known to those skilled in the field.

In this embodiment, the plurality of the metal test points 279 may be provided to facilitate testers to perform corresponding function tests or fault tests on the display assembly 27.

Figure 24:
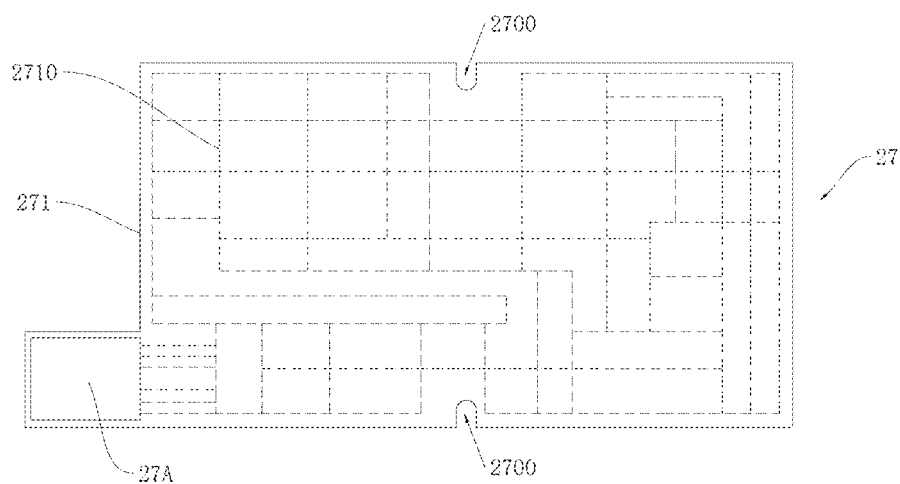
FIG. 24 is a schematic view of the backside of the display assembly of FIG. 22.
Figure 25:
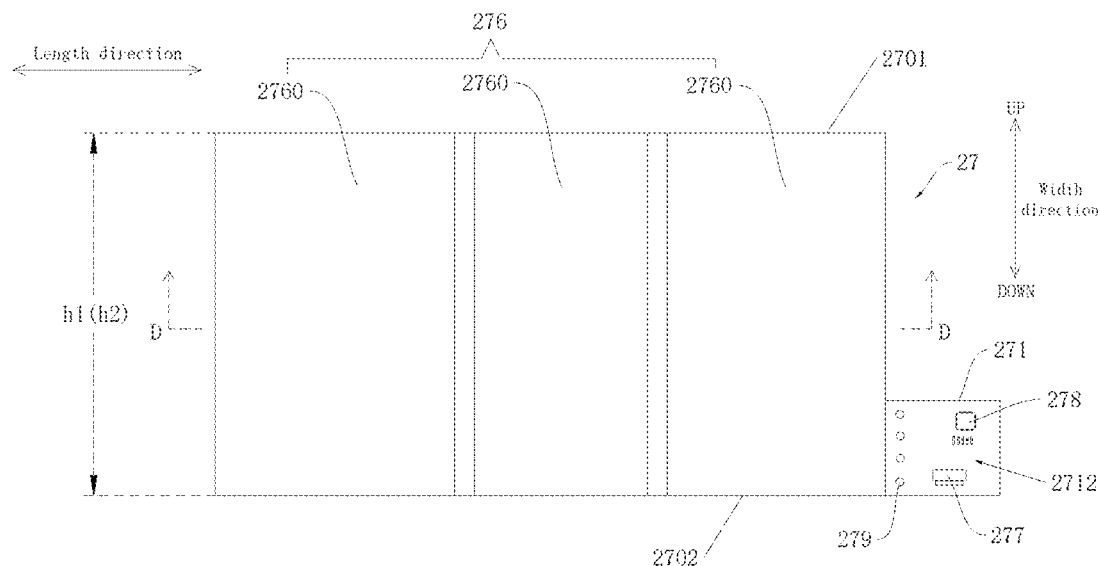
FIG. 25 is a plan view of the display assembly of FIG. 19 when the display assembly is in the unfolded state in a third implementation approach of the present disclosure.

Further, referring to FIGS. 22 and 24, in some optional embodiments of the present disclosure, the flexible display assembly 27 further includes a reinforcement sheet 27A made of a rigid material. The reinforcement sheet 27A is secured to a side of the flexible printed circuit board 271 that is backed to the second installation area 2712.

In this embodiment, the specific material of the reinforcing sheet 27A may be a hard material such as a metal material, or a hard plastic, etc. The reinforcement sheet 27A may reinforce (e.g., supplement the strength of) the portion of the flexible printed circuit board 271 containing the second installation area 2712, making it difficult for the portion of the flexible printed circuit board 271 containing the second installation area 2712 to be bent, so as to prevent the portion of the flexible printed circuit board 271 containing the second installation area 2712 from being repeatedly bent in a way that affects the stability of the electrical connection between the components (such as the current input interface 277, the current drive element 278, and the plurality of metal test points 279) in the second installation area 2712 and the circuit traces 2710.

Further, considering that in some scenarios, when a single display diaphragm 276 with a longer length is used to simultaneously cover the light-emitting elements 272 in each of the first installation areas 2711, it is easy for some of the light-emitting elements 272 to be damaged during the process of mounting the display assembly 27 on the plurality of third side walls 213 of the second housing 21. The reason is that, during the process of wrapping the display assembly 27 containing the display diaphragm 276 around the third side walls 213 of the second housing 21 in the circumferential direction of the second housing 21, it is difficult to avoid the need to bend the display assembly 27 several times. In the event of a situation in which it is necessary to reattach the display assembly 27 because the display assembly 27 has not been mounted in place, it may be necessary to bend the display assembly 27 a number of more times. Each bending of the display assembly 27, the entire display diaphragm 276 can be subjected to different degrees of stretching and local the phenomenon of localized stress concentration, and the greater the degree of bending of the display assembly 27, the greater the degree of stretching of the display diaphragm 276 and the phenomenon of localized stress concentration is also more pronounced. However, each stretching of the display diaphragm 276 causes different degrees to the light-emitting element 272, and the part of the display diaphragm 276 where the local stress concentration phenomenon occurs causes the greatest degree to the light-emitting element 272. Therefore, when the display unit 27 is repeatedly bent, e.g., when the bending degree is large, it is easy to cause a problem that part of the light-emitting element 272 is crushed by the display diaphragm 276.

Based on the above discovery, to solve the technical problem that some of the light-emitting elements 272 are prone to be damaged during the process of mounting the display assembly 27 to the plurality of third side walls 213 of the second housing 21 when a single piece of display diaphragm 276 with a longer length is used to simultaneously cover the light-emitting elements 272 in the respective first installation areas 2711, a plurality of pieces of flexible display film 2760 with a shorter length may be used to replace the single piece of the display diaphragm 276 with a longer length.

In some implementations, e.g., as illustrated in FIGS. 13, 16-17, and 25-29, the flexible printed circuit board 271 is provided with at least two first installation areas 2711 on a side surface along its thickness direction. The at least two first installation areas 2711 are spaced apart along the length direction of the flexible printed circuit board 271. A plurality of light-emitting elements 272 are fixed in each of the first installation areas 2711. The display diaphragm 276 includes at least two spaced-apart flexible display films 2760, each of which covers one of the first installation areas 2711. Each of the at least two flexible display films 2760 has a plurality of the light transmission regions 2761. Among the at least two third side walls 213 covered by the flexible printed circuit board 271, each third sidewall 213 corresponds to at least one piece of the flexible display film 2760.

In the technical solution of this embodiment, since each first installation area 2711 is individually covered with a flexible display film 2760 of a relatively short length, and each flexible display film 2760 is separately set up from each other instead of being connected to each other into a one-piece diaphragm structure, the bending and stretching of each the flexible display film 2760 are independent of each other and have no influence on each other. For example, after the first flexible display film 2760 is covered on the first third side wall 213 of the second housing 21 (such as the front side wall of the second housing 21), the first flexible display film 2760 does not stretch due to this bending of the display assembly 27 during the process of covering the second third side wall 213 (such as the right side wall of the second housing 21) with the second flexible display film 2760 by bending the display assembly 27 once, so that the first flexible display film 2760 does not squeeze the light-emitting element 272 opposite it during the process of mounting the display assembly 27 on the third side walls 213 of the second housing 21. Thereby, it is possible to effectively reduce the risk of some of the light-emitting elements 272 being crushed by the flexible display film 2760 during the process of mounting the display assembly 27 on the plurality of third side walls 213 of the second housing 21.

In this embodiment, it should be added that in some application scenarios, to improve the production efficiency of the display assembly 27, a plurality of the flexible display films 2760 with shorter lengths may be obtained by cutting a single display diaphragm 276 with longer lengths. For example, after a single display diaphragm 276 with longer lengths may be used to cover the light-emitting elements 272 in the respective first installation areas 2711 simultaneously, before mounting the display assembly 27 on a plurality of third side walls 213 of the first housing 11, the parts of the single longer length display diaphragm 276 that do not cover the first installation area 2711 may be cut, thereby enabling a plurality of spaced apart shorter length flexible display films 2760 to be obtained in the length direction of the display assembly 27.

Further, referring to FIGS. 12-17 and FIGS. 19-27, in some optional embodiments of the present disclosure, the power supply module 2 further includes a protective shell 28 made of a light-transparent material (a light-transparent material such as glass, acrylic, etc.). The outer surface of the second housing 21 can be provided with a mounting groove 215 extending along the circumferential direction of the second housing 21. The groove wall surface of the mounting groove 215 can include the at least two third side walls 213. The bendable display assembly 27 can be fixed in the mounting groove 215 by glue adhesion or the like and can cover at least two the third side walls 213. For example, the groove wall surface of the mounting groove 215 can include three the third side walls 213, and the display assembly 27 can be disposed to cover three the third side walls 213. The protective shell 28 is mounted to the second housing 21 and is arranged to cover the display assembly 27. There can be a second gap between the inner surface of the protective shell 28 and the side surface of the display assembly 27 back to the second housing 21 (e.g., the light-emitting surface of the display assembly 27). In some examples, the size of the second gap may be in a range from 0.1 mm to 2 mm. As shown in FIG. 16, the second gap is d, and there is 0.1 mm≤d≤2 mm.

In this embodiment, on one hand, the light-transmissible protective shell 28 can ensure that the user can observe the visual information displayed by the display assembly 27 through the protective shell 28, and also protect the display assembly 27 to reduce the risk of damage to the display assembly 27 occurring due to impact by an external object. On the other hand, there exists a second gap d between the inner surface of the protective shell 28 and the light-emitting surface of the display assembly 27. The second gap d can, on the one hand, be used as a heat dissipation space of the display assembly 27 to improve the heat dissipation efficiency of the display assembly 27 during operation, and on the other hand, it can prevent the inner surface of the protective shell 28 from extruding on the display assembly 27 and causing damage to the display assembly 27 (e.g., preventing the light-emitting element 272 in the display assembly 27 from being damaged by the inner surface of the protective shell 28).

Optionally, the size of the second gap d may be further set from 0.1 mm to 0.5 mm, so that in some application scenarios, even if the flexible printed circuit board 271 and the second housing 21 are not reliably bonded to each other, resulting in a tendency for the entire bendable display assembly 27 to open outward, the entire bendable display assembly 27 can still be stably confined within the narrow space between the inner peripheral surface of the protective shell 28 and the outer peripheral surface of the second housing 21, and is not likely to undergo a large positional shift, thereby avoiding a large positional shift in the bendable display assembly 27 that would affect the light display effect presented by the bendable display assembly 27 to the outside.

Further, in some optional embodiments of the present disclosure, the second housing 21 and the protective shell 28 may be fixed to each other by snap connections. In some implementations, referring to FIGS. 16-17, the protective shell 28 wraps around the second body portion 216 of the second housing 21 (e.g., the third end face 2A, the fourth end face 2B, and the three third side walls 213 of the second body portion 216 are covered by the protective shell 28). The second side panel portion 217 is further provided with at least two third snap portions 2172 on one side back to the second side wall 211. At least two third snap portions 2172 are spaced apart along the height direction of the second side panel portion 217 (e.g., the height direction in FIGS. 16-17). The interior wall of the protective shell 28 facing the third end face 2A and the interior wall of the protective shell 28 facing the fourth end face 2B are both provided with at least one a third snap hole 280, and each third snap portion 2172 is snap-fitted with each the third snap hole 280 in one-to-one correspondence, that is, the third snap portion 2172 located on the upper side of the second side panel portion 217 is snapped to the third snap hole 280 located at the top of the protective shell 28, and the third snap portion 2172 located on the lower side of the second side panel portion 217 is snapped to the third snap hole 280 located at the bottom of the protective shell 28.

Further, referring to FIGS. 16-17 and FIGS. 22-24, in some optional embodiments of the present disclosure, the groove wall of the mounting groove 215 is protrudingly provided with two locating bulges 212, and the two locating bulges 212 are disposed at relatively spaced-apart intervals along the height direction of the second housing 21. The first edge 2701 and the second edge 2702 of the flexible display assembly 27 are each provided with a locating hole 2700 adapted to the locating bulge 212, and the corresponding locating bulge 212 extends into the corresponding locating hole 2700. In this embodiment, the locating bulge 212 and the locating hole 2700 are provided to be able to position the display assembly 27 during installation of the bendable display assembly 27 within the mounting groove 215, preventing excessive movement of the display assembly 27 in the height direction and circumferential direction of the second housing 21. This facilitates quick and neat installation of the display assembly 27 in the mounting groove 215 of the second housing 21.

Further, referring to FIGS. 13 and 16, in some optional implementations of the first embodiment of the present disclosure, the power supply module 2 further includes a charging interface 26 electrically connected to the second control circuit board 25. A first penetration hole 214 is provided on the outer wall of the second housing 21 that is in communication with the outside world. The first penetration hole 214 is provided in correspondence to the charging interface 26. In some implementations, as shown in FIG. 16, the first penetration hole 214 is provided on the fourth end face 2B of the second housing 21, and a second penetration hole 281 corresponding to the first penetration hole 214 is provided on the bottom end face of the protective shell 28, e.g., the first penetration hole 214 is in communication with the outside world through the second penetration hole 281. Thus, when the battery 24 is lower or exhausted, it is convenient for the user to charge the battery 24, thereby extending the service life of the power supply module 2 and enabling the power supply module 2 to be used repeatedly. Among them, the type of the charging interface 26 may be a USB interface or a Type-C interface, and this embodiment does not make any specific limitations in this regard.

Optionally, FIGS. 34-37 illustrate the relevant structural composition of an aerosol generating device provided in a third embodiment of the present disclosure. The aerosol generating device can include an atomizing module 1 and a power supply module 2, where the atomizing module 1 is used to atomize a liquid aerosol-forming substrate to generate an aerosol, and the power supply module 2 is used to provide electrical power to the atomizing module 1.

In some implementations, the atomizing module 1 includes a first housing 11, an atomizing core 14, a mouthpiece assembly 15, a first electrode assembly 12, a first switch button 18, a first airflow sensor 17 mounted inside the first housing 11, and a first control circuit board 16 mounted inside the first housing 11. The first housing 11 has a first end face 11A and a second end face 11B opposite to each other along its height direction. The first housing 11 has a first side wall 111 located between the first end face 11A and the second end face 11B along its circumferential direction. The interior of the first housing 11 is provided with a first airway 10A and a storage cavity 1041 for storing the liquid aerosol-forming substrate. The mouthpiece assembly 15 is attached to the first end face 11A and is in communication with the outlet end of the first airway 10A. The atomizing core 14 is mounted in the airflow path of the first airway 10A and is in communication with the storage cavity 1041. A portion of the first electrode assembly 12 is disposed exposedly on the first side wall 111. The first switch button 18 is disposed exposed on the outer surface of the first housing 11. The first control circuit board 16 is electrically connected to the atomizing core 14, the first electrode assembly 12, the first airflow sensor 17, and the first switch button 18, respectively. The first airflow sensor 17 is used to detect airflow changes in the first airway 10A. The first control circuit board 16 may be structured in the form of a micro-controller, a processor, a controller, and other devices with control functions.

In some implementations, the power supply module 2 includes a second housing 21, a battery 24, a second electrode assembly 22, a second control circuit board 25, and a charging interface 26. The second housing 21 has a third end face 21A and a fourth end face 21B opposite to each other along its height direction. The second housing 21 has a second side wall 211 located between the third end face 21A and the fourth end face 21B in its circumferential direction. The battery 24 and the second control circuit board 25 are mounted in the second housing 21. A portion of the second electrode assembly 22 is exposedly disposed on the second side wall 211. The charging interface 26 is exposed and disposed in the fourth end face 21B. The second control circuit board 25 is electrically connected to the battery 24, the second electrode assembly 22, and the charging interface 26, respectively. The second control circuit board 25 may be structurally specific in a form of a single-chip microcomputer, a processor, a controller, and other devices with a control function that have been maturely developed in the field. The second side wall 211 can be detachably connected to the first side wall 111. And the second electrode assembly 22 can be electrically contacted with the first electrode assembly 12. In some implementations, the second positive electrode 221 of the second electrode assembly 22 is electrically contacted with the first positive electrode 121 of the first electrode assembly 12, and the second negative electrode 222 of the second electrode assembly 22 is electrically contacted with the first negative electrode 122 of the first electrode assembly 12.

The operating principle of the aerosol generating device provided by the third embodiment of the present disclosure can be described as follows.

When the user bites down on the mouthpiece assembly 15 to suction, a suction airflow can be formed in the airflow flow path of the first airway 10A. The suction airflow can trigger the first airflow sensor 17 to act, so that the first airflow sensor 17 sends a suction signal to the first control circuit board 16 for characterizing that the user is suctioning. When the first control circuit board 16 receives the suction signal, the first control circuit board 16 conducts an electrical connection between the atomizing core 14 and the first electrode assembly 12, thereby causing the atomizing core 14 to be energized to perform atomizing work. When the user stops suction, no suction airflow can be formed in the airflow flow path of the first airway 10A, so that the first airflow sensor 17 can send a stop signal to the first control circuit board 16 for characterizing that the user has stopped suction. When the first control circuit board 16 receives the stop signal, the first control circuit board 16 can disconnect the electrical connection between the atomizing core 14 and the first electrode assembly 12, thereby causing the atomizing core 14 to be de-energized and stops atomizing work.

In this embodiment, it should be noted that the first switch button 18 and the first airflow sensor 17 may be present simultaneously or may be provided by one or the other. In some embodiments where only the first switch button 18 is provided without the first airflow sensor 17, the user can trigger the first control circuit board 16 to control the atomizing core 14 to turn on the first electrode assembly 12 by pressing the first switch button 18. In some embodiments where both the first switch button 18 and the first airflow sensor 17 are provided, the user can trigger the first control circuit board 16 to control the operating power of the atomizing core 14 by pressing the first switch button 18.

In the technical solution of this embodiment, the first side wall 111 of the first housing 11 and the second side wall 211 of the second housing 21 are detachably connected, thereby enabling mutual disassembly and assembly between the atomizing module 1 and the battery 24. The first electrode assembly 12 can be in electrical contact with the second electrode assembly 22, thereby realizing an electrical connection between the atomizing module 1 and the battery 24. Thus, on the one hand, when the battery 24 is damaged, it is only necessary to dismantle the power supply module 2 from the atomizing module 1, and then assemble the new power supply module 2 on the atomizing module 1, so that the aerosol generating device can continue to be used without replacing the entire aerosol generating device, which effectively reduces the user's cost of using the device and is conducive to environmental protection. That is equivalent to the atomizing module 1 being able to be repeatedly used. On the other hand, similarly, when the atomizing module 1 is damaged (e.g., the atomizing core 14 is damaged), it is only necessary to disassemble the atomizing module 1 from the power supply module 2, and then assemble the new atomizing module 1 on the power supply module 2, so that the aerosol generating device can be continued to be used without the need to replace the entire aerosol generating device, which effectively reduces the user's cost of using the device and is also conducive to environmental protection. This is equivalent to the power supply module 2 can be reused.

Further, referring to FIGS. 34-37, in some optional embodiments of the third embodiment of the present disclosure, the side of the first housing 11 facing the power supply module 2 can be provided with a second protruding portion 111A. The end surface of the second protruding portion 111A facing the power supply module 2 can be the first side wall 111 of the first housing 11. The side of the second housing 21 facing the atomizing module 1 can be provided with a second limiting groove 211A adapted to the second protruding portion 111A. The second side wall 211 of the second housing 21 can be disposed in the second limiting groove 211A and be provided opposite to a groove opening of the second limiting groove 211A. The second protruding portion 111A and the second limiting groove 211A can be arranged to cooperate with each other. In this way, using the mutual cooperation between the second protruding portion 111A and the second limiting groove 211A, the power supply module 2 can be restricted from moving relative to the atomizing module 1 along the up and down direction or the front and back direction of the aerosol generating device, thereby contributing to improving the stability of the connection between the atomizing module 1 and the battery 24.

In this embodiment, it should be noted that the aerosol generating device provided in the third embodiment of the present disclosure is mainly different from the aerosol generating device provided in the first embodiment (as shown in FIGS. 1-17), as described below.

First, the aerosol generating device provided in the third embodiment of the present disclosure does not have the function of being able to be repeatedly filled with the liquid aerosol-forming substrate for reuse because it is not provided with a liquid injection hole 1012 and the mouthpiece assembly 15 is not detachable. That is, when the liquid aerosol-forming substrate in the storage cavity 1041 has been consumed by the atomizing core 14, the atomizing module 1 in the third embodiment can only be discarded and cannot be reused.

Second, the aerosol generating device provided in the third embodiment of the present disclosure does not have an anti-counterfeiting function because it is not provided with a communication electrode (e.g., both the first electrode assembly 12 and the second electrode assembly 22 have only two electrodes). That is, after the user has assembled the atomizing module 1 and the power supply module 2 in the third embodiment into a single unit, even if the atomizing module 1 is a counterfeited counterfeit product, when the user bites down on the mouthpiece assembly 15 to inhale, the first airflow sensor 17 can still trigger the atomizing core 14 to power on and to perform atomizing work.

Third, the aerosol generating device provided in the third embodiment of the present application does not have the function of displaying visual information for the user because the display assembly 27 is not provided.

Fourth, the atomizing module 1 in the third embodiment of the present disclosure is not provided with a liquid storage cotton 105 in the storage cavity 1041.

In this embodiment, it is to be noted that other contents of the aerosol generating device provided in the third embodiment of the present disclosure (such as the method for realizing the detachable connection between the first side wall 111 and the second side wall 211) can be described with reference to the relevant contents of the aerosol generating device of the first embodiment, and will not be repeated herein.

Optionally, refer to FIGS. 38-43, which illustrate a relevant structural composition of an aerosol generating device provided in a fourth embodiment of the present disclosure. The aerosol generating device can include an atomizing module 1 and a power supply module 2. The atomizing module 1 can be used to atomize a liquid aerosol-forming substrate to generate an aerosol, and the power supply module 2 can be used to provide electrical power to the atomizing module 1.

In some implementations, the atomizing module 1 includes a first housing 11, an atomizing core 14, a mouthpiece assembly 15, and a first electrode assembly 12. The first housing 11 has a first end face 11A and a second end face 11B opposite to each other along its height direction. The first housing 11 has a first side wall 111 located between the first end face 11A and the second end face 11B along its circumferential direction. The interior of the first housing 11 is provided with the first airway 10A and a storage cavity 1041 for storing a liquid aerosol-forming substrate. The mouthpiece assembly 15 is attached to the first end face 11A and is in communication with the outlet end of the first airway 10A. The inlet end of the first airway 10A (e.g., the air intake hole 10A1) is located on the first side wall 111. The atomizing core 14 is mounted in an airflow flow path of the first airway 10A and is in communication with the storage cavity 1041. A portion of the first electrode assembly 12 is exposed on the first side wall 111, and the first electrode assembly 12 is electrically connected to the atomizing core 14.

The power supply module 2 can include a second housing 21, a battery 24, a second electrode assembly 22, a second airflow sensor 29, a second control circuit board 25, a charging interface 26, a second switch button 210, and a bendable display assembly 27. The battery 24, the second airflow sensor 29, and the second control circuit board 25 can be both mounted inside the second housing 21.

In some implementations, the second housing 21 has a third end face 21A and a fourth end face 21B opposite to each other along the height direction of the second housing 21. The second housing 21 has three third side walls 213 and a second side wall 211, which are located between the third end face 21A and the fourth end face 21B along the circumferential direction of the second housing 21. A second airway 20A is provided in the second housing 21. The outlet end of the second airway 20A1 is disposed on the second side wall 211. The inlet end of the second airway 20A may be disposed on the fourth end face 21B of the second housing 21. The second airflow sensor 29 is used to detect changes in the airflow of the second airway 20A. A portion of the second electrode assembly 22 is disposed exposedly on the second side wall 211. The charging interface 26 is disposed exposedly on the fourth end face 21B. The display assembly 27 is disposed along the circumferential direction of the second housing 21 and covers at least two third side walls 213. The second switch button 210 is exposed on the outer surface of the second housing 21. The second control circuit board 25 is electrically connected to the battery 24, the second electrode assembly 22, the second airflow sensor 29, the charging interface 26, the second switch button 210, and the display assembly 27, respectively. The second side wall 211 is detachably connected to the first side wall 111. And furthermore, the outlet end of the second airway 20A1 is in communication with the inlet end of the first airway 10A correspondingly, and the second electrode assembly 22 is electrically contacted with the first electrode assembly 12. In some implementations, the second positive electrode 221 of the second electrode assembly 22 is electrically contacted with the first positive electrode 121 of the first electrode assembly 12. The second negative electrode 222 of the second electrode assembly 22 is electrically contacted with the first negative electrode 122 of the first electrode assembly 12 in electrical contact.

The operating principle of the aerosol generating device provided in the fourth embodiment of the present disclosure can be described as follows.

When the user bites the mouthpiece assembly 15 for suction, a suction airflow can be formed in the airflow flow path in which the first airway 10A and the second airway 20A communicate with each other. The suction airflow can trigger the second airflow sensor 29 to act, so that the second airflow sensor 29 sends a suction signal to the second control circuit board 25 for characterizing that the user is suctioning. When the second control circuit board 25 receives the suction signal, the second control circuit board 25 conducts the electrical connection between the second electrode assembly 22 and the battery 24, so that the atomizing core 14 is energized to carry out atomization work. When the user stops suctioning, no suction airflow can be formed in the airflow flow path where the first airway 10A and the second airway 20A communicate with each other, thereby causing the second airflow sensor 29 to send a stop signal to the second control circuit board 25 to characterize that the user has stopped suctioning. When the second control circuit board 25 receives the stop signal, the second control circuit board 25 disconnects the electrical connection between the second electrode assembly 22 and the battery 24, thereby causing the atomizing core 14 to power down and stop the atomization work.

In this embodiment, it should be noted that the second switch button 210 and the second airflow sensor 29 can exist simultaneously or can be provided with one or the other. In some embodiments where only the second switch button 210 is provided without the second airflow sensor 29, the user can trigger the second control circuit board 25 to control the second electrode assembly 22 to turn on the battery 24 by means of pressing the second switch button 210. And, in this case, the second airway 20A may not be provided, while at the same time the inlet end (e.g., the air intake hole 10A1) of the first airway 10A may be provided on the second end face 11B of the first housing 11. In some embodiments in which both the second switch button 210 and the second airflow sensor 29 are provided, the user can trigger the second control circuit board 25 to control the output power of the battery 24 by pressing the second switch button 210 to adjust the operating power of the atomizer core 14.

In this embodiment, it is also noted that the technical effect that can be achieved by the aerosol generating device provided in the fourth embodiment of the present disclosure is similar to the technical effect that can be achieved by the aerosol generating device in the third embodiment described above (shown in FIGS. 34-37), and will not be repeated herein.

In this embodiment, it should also be explained that the aerosol generating device provided in the fourth embodiment of the present disclosure is mainly different from the aerosol generating device of the first embodiment (as shown in FIGS. 1-17), as described below.

First, the aerosol generating device provided in the fourth embodiment of the present disclosure does not have the function of being able to be repeatedly filled with the liquid aerosol-forming substrate for reuse because it is not provided with a liquid injection hole 1012 and the mouthpiece assembly 15 is not detachable. That is, when the liquid aerosol-forming substrate in the storage cavity 1041 has been consumed by the atomizing core 14, the atomizing module 1 in the fourth embodiment can only be discarded and cannot be reused.

Second, the aerosol generating device provided in the fourth embodiment of the present disclosure does not have an anti-counterfeiting function because it is not provided with a communication electrode. That is, after the user has assembled the atomizing module 1 and the power supply module 2 in the fourth embodiment into a single unit, even if the atomizing module 1 is an imitation product, when the user bites down on the mouthpiece assembly 15 for suctioning, the second airflow sensor 29 still triggers the atomizing core 14 to power on and to perform atomizing work.

Third, the aerosol generating device provided in the fourth embodiment of the present disclosure does not have anti-counterfeiting function, thus reducing the number of the control circuit boards to be used. That is, the atomizing module 1 in the fourth embodiment does not contain a control circuit board.

Fourth, the air channel design is increased in the second housing 21 and the location of the air flow sensor is changed. That is, the location of the air flow sensor is shifted from the first housing 11 of the atomizing module 1 to the second housing 21 of the power supply module 2. Fifth, the atomizing module 1 in the fourth embodiment of the present disclosure is not provided with a liquid storage cotton 105 in the storage cavity 1041. Sixth, the second housing 21 in the fourth embodiment of the present disclosure is not provided with a locating bulge 212 and the display assembly 27 is not provided with a locating hole 2700. Seventh, in some embodiments, the aerosol generating device provided in the fourth embodiment of the present disclosure may control the on-off state between the second electrode assembly 22 and the battery 24 by pressing the second switch button 210.

In this embodiment, it should also be explained that the aerosol generating device provided in the fourth embodiment of the present disclosure is mainly different from the aerosol generating device of the third embodiment (as shown in FIGS. 34-37), as described below.

First, the aerosol generating device provided in the fourth embodiment of the present disclosure has the function of displaying visual information for the user because the display assembly 27 is provided.

Second, the number of the control circuit board is reduced and the location of the air flow sensor is changed. That is, the atomizing module 1 in the fourth embodiment of the present disclosure does not contain a control circuit board, and the location of the air flow sensor is shifted from the first housing 11 of the atomizing module 1 to the second housing 21 of the power supply module 2. The advantageous of the change is that it is conducive to better reduce the user's cost of using the atomizing module 1, because in some practical application scenarios, the service life of the power supply module 2 is usually longer than the service life of the atomizing module 1. For example, when the liquid aerosol-forming substrate in the storage cavity 1041 has been consumed by the atomizing core 14, the first control circuit board 16 and the first airflow sensor 17 in the third embodiment can be discarded along with the atomizing module 1. While the second control circuit board 25 and the second airflow sensor 29 in the fourth embodiment of the present disclosure can still be retained in the power supply module 2 for continued use, and can not be wasted as the atomizing module 1 is discarded.

Third, in some embodiments including the switch button, the position of the switch button is changed. That is, the switch button in the fourth embodiment of the present disclosure is exposed on the second housing 21 and the switch button in the third embodiment is exposed on the first housing 11.

In this embodiment, it is also to be added that other contents of the aerosol generating device provided in the fourth embodiment of the present application (such as the specific manner of realizing the detachable connection between the first side wall 111 and the second side wall 211, the specific structural form and arrangement of the display assembly 27, etc.) can be described with reference to the relevant contents of the aerosol generating device of the first embodiment described above, and will not be repeated herein.

Optionally, refer to FIGS. 44-50, which illustrate a relevant structural composition of an aerosol generating device provided in a fifth embodiment of the present disclosure. The aerosol generating device can include an atomizing module 1 and a power supply module 2. The atomizing module 1 can be used to atomize a liquid aerosol-forming substrate for generating an aerosol, and the power supply module 2 can be used to provide electrical energy to the atomizing module 1.

In some implementations, the atomizing module 1 includes a first housing 11, an atomizing core 14, a mouthpiece assembly 15, a first electrode assembly 12, a first airflow sensor 17 installed in the first housing 11, and a first control circuit board 16 installed in the first housing 11. The first housing 11 has a first end face 11A and a second end face 11B opposite to each other along its height direction. The first housing 11 has a first side wall 111 located between the first end face 11A and the second end face 11B along its circumferential direction. The interior of the first housing 11 is provided with a first airway 10A and a storage cavity 1041 for storing liquid aerosol-forming substrate. The mouthpiece assembly 15 is connected to the first end face 11A and is in communication with the outlet end of the first airway 10A. The atomizing core 14 is installed in the airflow path of the first airway 10A and is in communication with the storage cavity 1041. A portion of the first electrode assembly 12 is exposed and arranged on the first side wall 111. The first control circuit board 16 is electrically connected with the atomizing core 14, the first electrode assembly 12, and the first airflow sensor 17, respectively. The first airflow sensor 17 is used to detect the airflow changes in the first airway 10A.

In some implementations, the power supply module 2 includes a second housing 21, a battery 24, a second electrode assembly 22, a second control circuit board 25, a charging interface 26, and a bendable display assembly 27. The second housing 21 has a third end face 21A and a fourth end face 21B opposite to each other along its height direction, and the second housing 21 has three third side walls 213 and a second side wall 211 which are located between the third end face 21A and the fourth end face 21B along its circumferential direction. The battery 24 and the second control circuit board 25 are both installed in the second housing 21. A portion of the second electrode assembly 22 is exposed and arranged on the second side wall 211, and the charging interface 26 is exposed and arranged on the fourth end face 21B. The display assembly 27 is mounted to the second housing 21 in the circumferential direction of the second housing 21 and covers at least two the third side walls 213. The second control circuit board 25 is electrically connected with the battery 24, the second electrode assembly 22, the charging interface 26, and the display assembly 27 respectively. The second side wall 211 and the first side wall 111 are detachably connected, and the second electrode assembly 22 is electrically in contact with the first electrode assembly 12. In some implementations, the second positive electrode 221 of the second electrode assembly 22 is electrically in contact with the first positive electrode 121 of the first electrode assembly 12, The second negative electrode 222 of the second electrode assembly 22 is in electrical contact with the first negative electrode 122 of the first electrode assembly 12.

In this embodiment, it should be noted that the principle of use of the aerosol generating device provided in the fifth embodiment of the present application and the technical effect that can be achieved are similar to the principle of use of the aerosol generating device in the third embodiment described above and the technical effect that can be achieved, and will not be repeated herein.

In this embodiment, it is also noted that the main differences between the aerosol generating device provided in the fifth embodiment of the present disclosure and the aerosol, generating device of the first embodiment described above (shown in FIGS. 1-17) are as described below.

First, the aerosol generating device provided in the fifth embodiment of the present disclosure does not have the function of being able to be repeatedly filled with the liquid aerosol-forming substrate for reuse because it is not provided with a liquid injection hole 1012 and the mouthpiece assembly 15 is not removable. That is, when the liquid aerosol-forming substrate in the storage cavity 1041 has been consumed by the atomizing core 14, the atomizing module 1 in the fifth embodiment can only be discarded and cannot be reused.

Second, the aerosol generating device provided in the fifth embodiment of the present disclosure does not have an anti-counterfeiting function because it is not equipped with a communication electrode. That is, after the user has assembled the atomizing module 1 and the power supply module 2 in the fifth embodiment into a single unit, even if the atomizing module 1 is an imitation product, when the user bites down on the mouthpiece assembly 15 for suctioning, the first airflow sensor 17 still triggers the atomizing core 14 to power on and to perform atomizing work.

Third, the atomizing module 1 in the fifth embodiment of the present disclosure is not provided with a liquid storage cotton 105 in the storage cavity 1041.

Fourth, the second housing 21 in the fifth embodiment of the present disclosure is not provided with a locating bulge 212, and the display assembly 27 is not provided with a locating hole 2700.

In this embodiment, it is also noted that the main difference between the aerosol generating device provided in the fifth embodiment of the present disclosure and the aerosol generating device in the third embodiment described above (as shown in FIGS. 34-37) is that the aerosol generating device provided in the fifth embodiment of the present disclosure is provided with the function of presenting visual information for the user due to the provision of the display assembly 27.

In this embodiment, it should also be noted that the main difference between the aerosol generating device provided in the fifth embodiment of the present disclosure and the aerosol generating device in the fourth embodiment (shown in FIGS. 38-43) is that the number of control circuit board used has been increased, the location of the air flow sensor has been changed and the number of the airway provided has been reduced. That is, the atomizing module 1 in the fifth embodiment includes the control circuit board. The power supply module 2 is not provided with the switch button and the position of the air flow sensor is transferred from the second housing 21 of the power supply module 2 to the first housing 11 of the atomizing module 1 while the airway in the second housing 21 is omitted.

In this embodiment, it should be added that other contents of the aerosol generating device provided in the fifth embodiment of the present disclosure (such as the specific way of realizing a detachable connection between the first side wall 111 and the second side wall 211, a specific structural form and arrangement of the display assembly 27, etc.) can be described with reference to the relevant contents of the aerosol generating device of the first embodiment described above, and will not be repeated herein.

It should be noted herein that other contents of the atomizing module 1, the power supply module 2 and the aerosol generating device disclosed in various embodiments of the present disclosure that are not described in detail can be found in the prior art and will not be repeated herein.

The above are only example embodiments of the present disclosure, and is not intended to limit the patent scope of the application. Any equivalent structural transformations made under the technical concept of the present disclosure utilizing the contents of the specification of the present disclosure and the accompanying drawings, or directly/indirectly utilized in other related fields of technology, are all included in the scope of protection of the present disclosure.

What is claimed is:

1. An aerosol generating device, comprising:
an atomizing module that comprises a first housing, an atomizing core, and a first electrode assembly, wherein the first housing has a first end face and a second end face opposite to each other along a height direction of the first housing, and the first housing has a first side wall located between the first end face and the second end face along a circumferential direction of the first housing, wherein an interior of the first housing is provided with an airway and a storage cavity for storing a liquid aerosol-forming substrate, and the atomizing core is disposed in an airflow path of the airway and is in communication with the storage cavity, and wherein the first electrode assembly is electrically connected to the atomizing core, and a portion of the first electrode assembly is exposed on the first side wall; and
a power supply module that comprises a second housing, a battery, and a second electrode assembly, wherein the second housing has a third end face and a fourth end face opposite to each other along a height direction of the second housing, and the second housing has a second side wall located between the third end face and the fourth end face along a circumferential direction of the second housing, and wherein the battery is mounted in the second housing and is electrically connected to the second electrode assembly, a portion of the second electrode assembly is exposed on the second side wall, and the second side wall is detachably connected to the first side wall and the second electrode assembly is in electrical contact with the first electrode assembly,
wherein the atomizing module further comprises a mouthpiece assembly and a liquid storage cup installed in the first housing, wherein the mouthpiece assembly is connected to the first end face and is in communication with the airway, and the airway comprises an atomizing channel, wherein the liquid storage cup comprises a top cover made of a first sealing material, a bottom cover made of a second sealing material, an air tube with the atomizing channel, and a cup body that has a through hole extending through a bottom end and a top end of the cup body, the top cover being fitted to the top end of the cup body, the bottom cover being fitted to the bottom end of the cup body, wherein the top cover is provided with a first mounting hole, the bottom cover is provided with a second mounting hole, and a first end of the air tube extends into the first mounting hole and a second end of the air tube is fitted into the second mounting hole, and wherein the top cover, the bottom cover, the air tube and the cup body together define the storage cavity, a liquid inlet hole communicated with the storage cavity is arranged on a side wall of the air tube, and the atomizing core is mounted in the air tube and covers the liquid inlet hole, and
wherein the storage cavity is provided with a liquid storage cotton that is arranged to cover the liquid inlet hole, there is a spacing between a side surface of the top cover facing the bottom cover and a side surface of the liquid storage cotton facing the top cover, and wherein a side of the top cover facing the bottom cover is provided with a protruding block that is located in the storage cavity, and an end surface of the protruding block departing from the top cover is offset against a side surface of the liquid storage cotton facing the protruding block.

2. The aerosol generating device of claim 1, wherein the first side wall is provided with a protruding portion, an end surface of the first electrode assembly is exposedly disposed on the protruding portion, and the second side wall is concavely disposed with a limiting groove adapted to the protruding portion, and
wherein the second electrode assembly is exposedly disposed inside the limiting groove, and the protruding portion fits in the limiting groove.

3. The aerosol generating device of claim 1, wherein the top cover is further provided with a liquid injection hole arranged at intervals from the first mounting hole, the liquid injection hole being in communication with the storage cavity,
wherein a top of the first housing is provided with a mouthpiece mounting port located above the liquid injection hole,
and the liquid injection hole is provided opposite to the mouthpiece mounting port; and
wherein the mouthpiece assembly comprises a mouthpiece body having a suction channel and a seal disposed within the mouthpiece body, wherein the mouthpiece body is detachably connected to the mouthpiece mounting port and the suction channel is in communication with the atomizing channel, wherein the seal is configured to seal the liquid injection hole, and wherein the liquid injection hole is exposed after the mouthpiece assembly is removed from the mouthpiece mounting port.

4. The aerosol generating device of claim 3, wherein the mouthpiece body is rotatably connected to the mouthpiece mounting port and is capable of being rotated to a first position and a second position relative to the first housing, an outer peripheral wall of the mouthpiece body is convexly provided with a limiting protrusion and an inner peripheral wall of the mouthpiece mounting port is convexly provided with a step portion, and the step portion is provided with a notch capable of being passed through by the limiting protrusion, and
wherein:
when the mouthpiece body is rotated to the first position, the seal covers an orifice of the liquid injection hole and the limiting protrusion is misaligned with the notch, such that the limiting protrusion is capable of abutting against a side surface of the step portion facing the liquid storage cup, and
when the mouthpiece body is rotated to the second position, the limiting protrusion is positioned opposite to the notch, such that the limiting protrusion is capable of passing through the notch in a direction away from the liquid storage cup.

5. The aerosol generating device of claim 3, wherein the seal is in contact with the top cover and covers an orifice of the liquid injection hole, and a material of the seal includes at least one of silicone, rubber, silicone rubber, or liquid-absorbent cotton, and
wherein the seal has an annular structure with an air vent, and an upper end of the air vent is in corresponding communication with the suction channel and a lower end of the air vent is in corresponding communication with the atomizing channel.

6. The aerosol generating device of claim 1, wherein a size of the spacing is in a range from 4 mm to 12 mm, and
wherein at least one first magnetic member fixed on the first side wall, and at least one second magnetic member fixed on the second side wall, wherein the at least one first magnetic member and the at least one second magnetic member are attracted to each other.

7. The aerosol generating device of claim 1, wherein the power supply module further comprises a control circuit board mounted in the second housing, a display assembly for displaying visual information and a protective shell made of a light-transmitting material,
  wherein the control circuit board is electrically connected to the battery, the second electrode assembly, and the display assembly, respectively,
  wherein the second housing further has three third side walls located between the third end face and the fourth end face along the circumferential direction of the second housing, wherein the display assembly is a flexible display, and the display assembly is mounted on the second housing along the circumferential direction of the second housing and covers at least two of the three third side walls,
  wherein one of the three third side walls is disposed back-to-back with the second side wall along a first direction of the second housing, and the remaining two of the three third side walls are disposed back-to-back with each other along a second direction of the second housing, and the first direction, the second direction, and the height direction of the second housing are mutually perpendicular to each other,
  wherein an outer surface of the second housing is provided with a mounting groove extending along the circumferential direction of the second housing, a groove wall surface of the mounting groove comprises the three third side walls, and the display assembly is fixed in the mounting groove and covers at least two of the three third side walls,
  wherein the display assembly comprises a display diaphragm made of a flexible material, a flexible printed circuit board with circuit traces, and a plurality of light-emitting elements arranged on a first side of the flexible printed circuit board, and the plurality of light-emitting elements being electrically connected to the circuit traces,
  wherein a second side of the flexible printed circuit board facing away from the plurality of light-emitting elements is connected to the second housing and covers at least two of the three third side walls,
  wherein the circuit traces are electrically connected to the control circuit board,
  wherein the display diaphragm is fixedly connected to the first side of the flexible printed circuit board and covers each of the plurality of light-emitting elements, the display diaphragm has a plurality of light transmitting regions for light emitted by the plurality of light-emitting elements to pass through, and a region of the display diaphragm other than the plurality of light transmitting regions is a light shielding region,
  wherein the display assembly further comprises a flexible reflective layer and a flexible light-shielding sheet, the display diaphragm, the flexible light-shielding sheet, the flexible reflective layer and the flexible printed circuit board are set up in a sequential layer stack,
  wherein each of the plurality of light-emitting elements is disposed revealingly from the flexible reflective layer, and
  wherein the flexible light-shielding sheet is provided with a plurality of light transmission holes, at least one light-emitting element is disposed within each light transmission hole, and each light transmitting region corresponds to at least one light transmission hole.

8. The aerosol generating device of claim 7, wherein the display assembly is fixed in the mounting groove by glue adhesion,
  wherein a groove wall of the mounting groove is protrudingly provided with a first locating bulge and a second locating bulge, the first locating bulge and the second locating bulge are disposed at intervals along the height direction of the second housing,
  wherein, along the height direction of the second housing, the display assembly has a first edge and a second edge opposite to each other, the first edge is provided with a first locating hole adapted to the first locating bulge, and the second edge is provided with a second locating hole adapted to the second locating bulge, and
  wherein the first locating bulge extends into the first locating hole, and the second locating bulge extends into the second locating hole.

9. The aerosol generating device of claim 7, wherein one side surface of the flexible printed circuit board provided with the plurality of light-emitting elements has a first installation area and a second installation area that are interconnected with each other, and the first installation area has a larger area than the second installation area,
  wherein the second installation area is exposedly disposed at an edge position of the display assembly, and the plurality of light-emitting elements are fixed within the first installation area,
  wherein at least one of a current input interface, a current drive element, or a plurality of metal test points that are electrically connected to the circuit traces is disposed in the second installation area, and
  wherein the display assembly further comprises a reinforcement sheet made of a rigid material, and the reinforcement sheet is secured to a side of the flexible printed circuit board that is backed to the second installation area.

10. The aerosol generating device of claim 1, wherein the top cover is further provided with a vent hole being in communication with the storage cavity, and the vent hole is spaced apart from the first mounting hole,
  wherein a top of the first housing is provided with a mouthpiece mounting port located above the vent hole,
  wherein the mouthpiece assembly comprises a mouthpiece body having a suction channel, the mouthpiece body is connected to the mouthpiece mounting port, and the suction channel is in communication with the atomizing channel,
  wherein a side of the top cover facing away from the bottom cover is provided with a groove, a lower end of the mouthpiece body is fit into the groove, and
  wherein an inner peripheral wall of the mouthpiece mounting port is convexly provided with a step portion, an outer peripheral wall of the mouthpiece body is provided with a shaft shoulder portion, and the shaft shoulder portion contacts a side surface of the step portion facing away from the liquid storage cup and covers the step portion.

11. An aerosol generating device, comprising:
  an atomizing module that comprises a first housing, an atomizing core, and a first electrode assembly, wherein the first housing has a first end face and a second end face opposite to each other along a height direction of the first housing, and the first housing has a first side wall located between the first end face and the second end face along a circumferential direction of the first housing, wherein an interior of the first housing is provided with an airway and a storage cavity for storing a liquid aerosol-forming substrate, and the atomizing core is disposed in an airflow path of the airway and is in communication with the storage cavity, and wherein the first electrode assembly is electrically connected to the atomizing core, and a portion of the first electrode assembly is exposed on the first side wall; and a power supply module that comprises a second housing, a battery, and a second electrode assembly, wherein the second housing has a third end face and a fourth end face opposite to each other along a height direction of the second housing, and the second housing has a second side wall located between the third end face and the fourth end face along a circumferential direction of the second housing, and wherein the battery is mounted in the second housing and is electrically connected to the second electrode assembly, a portion of the second electrode assembly is exposed on the second side wall, and the second side wall is detachably connected to the first side wall and the second electrode assembly is in electrical contact with the first electrode assembly, wherein the atomizing module further comprises a first control circuit board mounted in the first housing, wherein the first control circuit board is electrically connected to the atomizing core, and the first electrode assembly, respectively, and wherein the first electrode assembly comprises a first positive electrode, a first negative electrode, and a first communication electrode that are spaced apart from each other, wherein the power supply module further comprises a second control circuit board mounted in the second housing, and the second control circuit board is electrically connected to the battery and the second electrode assembly, respectively, wherein the second electrode assembly comprises a second positive electrode, a second negative electrode, and a second communication electrode that are spaced apart from each other, and wherein the second positive electrode is electrically in contact with the first positive electrode, the second negative electrode is electrically in contact with the first negative electrode, and the second communication electrode is in electrical contact with the first communication electrode, wherein the first control circuit board is configured to transmit pre-stored first inspection information to the second control circuit board after the first negative electrode is in contact with the second negative electrode and the first communication electrode is in contact with the second communication electrode, wherein the second control circuit board is configured to:
in response to determining that the first inspection information matches a pre-stored second inspection information, establish an electrical connection between the second positive electrode and the battery, and
in response to determining that the first inspection information does not match the second inspection information, perform at least one of disconnecting the electrical connection between the second positive electrode and the battery, or outputting a first prompt message, wherein the atomizing module further comprises an airflow sensor for detecting changes in airflow of the airway, and the airflow sensor is mounted in the first housing, wherein the first control circuit board comprises a first control unit and a first switch tube, the first control unit is respectively electrically connected to the first switch tube, the airflow sensor, the atomizing core, the first negative electrode, and the first communication electrode, and the first switch tube is electrically connected to the atomizing core and the first positive electrode, respectively, wherein the second control circuit board comprises a second control unit and a second switch tube, the second control unit is electrically connected to the battery, the second switch tube, the second negative electrode, and the second communication electrode, respectively, and the second switch tube is electrically connected to the battery and the second positive electrode, respectively, wherein the first control unit is configured to:
transmit the first inspection information to the second control unit after the first negative electrode is in contact with the second negative electrode and the first communication electrode is in contact with the second communication electrode, and
control the first switch tube to be turned on when the second positive electrode is in a conductive state with the battery and the first control unit receives a suction signal sent by the airflow sensor, and wherein the second control unit is configured to:
in response to determining that the first inspection information matches the second inspection information, control the second switch tube to be turned on, and
in response to determining that the first inspection information does not match the second inspection information, perform at least one of controlling the second switch tube to be turned off or outputting a second prompt message.

12. The aerosol generating device of claim 11, wherein the power supply module further comprises:
a display assembly for displaying visual information, and
a protective shell comprising a light-transmitting material,
wherein the second control circuit board is electrically connected to the display assembly, and
wherein the display assembly is mounted on a circumferential side wall of the second housing other than the second side wall, and the protective shell is mounted on the second housing and covers the display assembly.

13. The aerosol generating device of claim 12, wherein the second housing comprises a body portion and a side panel portion with the second side wall,
wherein the body portion has the third end face, the fourth end face, and an opening toward the first side wall, and a side of the side panel portion facing away from the second side wall is fixed at the opening,
wherein the battery and the second control circuit board are both disposed in the body portion,
wherein the display assembly is disposed on a circumferential side wall of the body portion, the protective shell is arranged to wrap around the body portion, and the protective shell is snap- fit connected to the side panel portion,
wherein at least two first snap portions and at least two second snap portions are provided on the side of the side panel portion back to the second side wall, the at least two first snap portions are arranged at intervals along a width direction of the side panel portion, and the at least two second snap portions are arranged at intervals along a height direction of the side panel portion,
wherein at least two first snap holes are provided on the body portion, a first inner wall of the protective shell facing the third end face and a second inner wall of the protective shell facing the fourth end face are both provided with at least one second snap hole, and wherein the at least two first snap portions are snap-fitted with the at least two first snap holes in one-to-one correspondence; each of the at least two second snap portions is snap-fitted with each of the at least two second snap holes in one-to-one correspondence.

14. The aerosol generating device of claim 12, wherein the second housing further has three third side walls located between the third end face and the fourth end face along the circumferential direction of the second housing, wherein the display assembly comprises a flexible display, and the display assembly is mounted on the second housing along the circumferential direction of the second housing and covers the three third side walls, wherein one of the three third side walls is disposed back-to-back with the second side wall along a first direction of the second housing, and the remaining two of the three third side walls are disposed back-to-back with each other along a second direction of the second housing; the first direction, the second direction, and the height direction of the second housing are mutually perpendicular to each other, and wherein an outer surface of the second housing is provided with a mounting groove extending along the circumferential direction of the second housing, a groove wall surface of the mounting groove comprises the three third side walls, and the display assembly is fixed in the mounting groove and covers the three third side walls.

15. The aerosol generating device of claim 14, wherein a gap between an inner surface of the protective shell and the side surface of the display assembly back to the second housing has a size in a range from 0.1 mm to 2 mm.

16. The aerosol generating device of claim 14, wherein, along the height direction of the second housing, the display assembly has a first edge and a second edge opposite to each other, and wherein a minimum vertical height between the first edge and the second edge is h1, a maximum vertical height between the first edge and the second edge is h2, and a vertical height between the third end face and the fourth end face is h3, and wherein $0.5h3 \leq h1 \leq 0.9h3$ and $0.5h3 \leq h2 \leq 0.9h3$.

17. The aerosol generating device of claim 11, wherein the atomizing module further comprises a liquid storage cup and a mouthpiece assembly, and wherein the airway comprises an atomizing channel, and a mouthpiece mounting port is provided at a top of the first housing, wherein the liquid storage cup is installed in the first housing, an interior of the liquid storage cup is provided with the atomizing channel and the storage cavity, wherein the atomizing core is installed in the atomizing channel, and wherein the liquid storage cup is provided with a liquid injection hole at the top of the liquid storage cup and opposite to the mouthpiece mounting port, the liquid injection hole being in communication with the storage cavity, and wherein the mouthpiece assembly comprises a mouthpiece body with a suction channel and a seal disposed within the mouthpiece body, wherein the mouthpiece body is detachably connected to the mouthpiece mounting port and the suction channel is in communication with the atomizing channel, wherein the seal is configured to seal the liquid injection hole.

18. The aerosol generating device of claim 17, wherein the mouthpiece body is rotationally connected to the mouthpiece mounting port and is capable of being rotated to a first position and a second position relative to the first housing, wherein an outer peripheral wall of the mouthpiece body is convexly provided with a limiting protrusion, and an inner peripheral wall of the mouthpiece mounting port is convexly provided with a step portion, and wherein the step portion is provided with a notch capable of being passed through by the limiting protrusion, and wherein:

when the mouthpiece body is rotated to the first position, the seal covers an orifice of the liquid injection hole and the limiting protrusion is misaligned with the notch to enable the limiting protrusion to abut against a side surface of the step portion facing the liquid storage cup, and when the mouthpiece body is rotated to the second position, the limiting protrusion is positioned opposite to the notch to enable the limiting protrusion to pass through the notch in a direction away from the liquid storage cup.

19. The aerosol generating device of claim 11, further comprising: at least one first magnetic member fixed on the first side wall, and at least one second magnetic member fixed on the second side wall, wherein the at least one first magnetic member and the at least one second magnetic member are attracted to each other, and wherein the atomizing module further comprises: a mouthpiece assembly and a liquid storage cup installed in the first housing, wherein the mouthpiece assembly is connected to the first end face and is in communication with the airway, and the airway comprises an atomizing channel, wherein the liquid storage cup comprises a top cover, a bottom cover, an air tube with the atomizing channel and a cup body that has a through hole extending through a bottom end and a top end of the cup body, the top cover being fitted to the top end of the cup body, the bottom cover being fitted to the bottom end of the cup body, wherein the top cover is provided with a first mounting hole, the bottom cover is provided with a second mounting hole, and a first end of the air tube extends into the first mounting hole and a second end of the air tube is fitted into the second mounting hole, and wherein the top cover, the bottom cover, the air tube and the cup body together define the storage cavity, a liquid inlet hole communicated with the storage cavity is arranged on the side wall of the air tube, and the atomizing core is mounted in the air tube and covers the liquid inlet hole.

20. The aerosol generating device of claim 19, wherein the storage cavity is provided with a liquid storage cotton that is arranged to cover the liquid inlet hole, and wherein a side of the top cover facing the bottom cover is provided with a protruding block that is located in the storage cavity, and wherein, along a height direction of the cup body, there is a first minimum distance H1 between an end face of the protruding block backing away from the top cover and a side surface of the liquid storage cotton facing the protruding block, and a second minimum distance H2 between a hole wall of the liquid inlet hole and a side surface of the liquid storage cotton facing the bottom cover, and wherein $H1 \leq H2$.

21. The aerosol generating device of claim 14, wherein the display assembly comprises a display diaphragm made of a flexible material and a flexible printed circuit board with circuit traces,
  wherein the display assembly comprises a plurality of light-emitting elements arranged on a first side of the flexible printed circuit board, the plurality of light-emitting elements being electrically connected to the circuit traces,
  wherein a second side of the flexible printed circuit board facing away from the plurality of light-emitting elements is connected to the second housing by glue and covers the three third side walls,
  wherein the circuit traces are electrically connected to the control circuit board, wherein the display diaphragm is fixedly connected to the first side of the flexible printed circuit board and covers each of the plurality of light-emitting elements, the display diaphragm has a plurality of light transmitting regions for light emitted by the plurality of light-emitting elements to pass through, and a region of the display diaphragm other than the plurality of light transmitting regions is a light shielding region,
  wherein the display assembly further comprises a flexible reflective layer and a flexible light-shielding sheet, the display diaphragm, the flexible light-shielding sheet, the flexible reflective layer and the flexible printed circuit board are set up in a sequential layer stack,
  wherein each of the plurality of light-emitting elements is disposed revealingly from the flexible reflective layer, and
  wherein the flexible light-shielding sheet is provided with a plurality of light transmission holes, at least one light-emitting element is disposed within each light transmission hole, and each light transmitting region corresponds to at least one light transmission hole.

22. An aerosol generating device, wherein the aerosol generating device comprises a power supply module and an atomizing module that comprises a first housing, an atomizing core and a first electrode assembly, the power supply module comprising:
  a second housing;
  a battery mounted in the second housing;
  a control circuit board mounted in the second housing and electrically connected to the battery;
  a second electrode assembly electrically connected to the control circuit board, wherein the second electrode assembly is configured to be in electrical contact with the first electrode assembly;
  a display assembly for displaying visual information, wherein the display assembly is electrically connected to the control circuit board; and
  a protective shell made of a light-transmitting material, wherein the protective shell is mounted on the second housing and covers the display assembly,
  wherein the first housing of the atomizing module has a first end surface and a second end surface opposite to each other along a height direction of the first housing, and the first housing has a first side wall located between the first end surface and the second end surface along a circumferential direction of the first housing, and wherein an interior of first housing is provided with an airway and a storage cavity for storing a liquid aerosol-forming substrate, the atomizing core is mounted in an air flow path of the airway and is in communication with the storage cavity, and the first electrode assembly is disposed exposedly on the first side wall and is electrically connected to the atomizing core,
  wherein the second housing of the power supply module has a third end face and a fourth end face opposite to each other along a height direction of the second housing, the second housing has a second side wall and three third side walls, which are located between the third end face and the fourth end face along a circumferential direction of the second housing, and wherein the second electrode assembly of the power supply module is disposed exposedly on the second side wall,
  wherein the second side wall of the second housing is configured to detachably connect with the first side wall of the atomizing module, one of the three third side walls and the second side wall are disposed back-to-back with each other along a first direction of the second housing, and remaining two of the three third side walls are disposed back-to-back with each other along a second direction of the second housing, and the first direction, the second direction, and a height direction of the second housing are mutually perpendicular to each other,
  wherein the atomizing module further comprises a liquid storage cup installed in the first housing, and the airway comprises an atomizing channel, wherein the liquid storage cup comprises a top cover made of a first sealing material, a bottom cover made of a second sealing material, an air tube with the atomizing channel, and a cup body that has a through hole extending through a bottom end and a top end of the cup body, the top cover being fitted to the top end of the cup body, the bottom cover being fitted to the bottom end of the cup body, wherein the top cover is provided with a first mounting hole, the bottom cover is provided with a second mounting hole, and a first end of the air tube is in communication with the first mounting hole and a second end of the air tube is fitted into the second mounting hole, and wherein the top cover, the bottom cover, the air tube and the cup body together define the storage cavity, a liquid inlet hole communicated with the storage cavity is arranged on a side wall of the air tube, and the atomizing core is mounted in the air tube and covers the liquid inlet hole, and
  wherein the storage cavity is provided with a liquid storage cotton that is arranged to cover the liquid inlet hole, and wherein a side of the top cover facing the bottom cover is provided with a protruding block, and an end surface of the protruding block departing from the top cover is offset against a side surface of the liquid storage cotton facing the protruding block.

23. The aerosol generating device of claim 22, wherein the second housing comprises: a body portion and a side panel portion having the second side wall,
  wherein the body portion has the third end face, the fourth end face, the three third side walls, and an opening for mounting of the side panel portion, and a side of the side panel portion facing away from the second side wall is fixed at the opening,
  wherein the battery and the control circuit board are both mounted within the body portion, the display assembly is mounted on the body portion, the protective shell is arranged to wrap around the body portion, and the protective shell is snap-fit connected to the side panel portion, wherein at least two first snap portions and at least two second snap portions that are provided on a side of the side panel portion facing away from the second side wall, wherein the at least two the first snap portions are spaced along a width direction of the side panel portion, and the at least two the second snap portions are spaced along a height direction of the side panel portion, and wherein at least two first snap holes are provided on the body portion, an inner wall of the protective shell facing the third end face and the inner wall of the protective shell facing the fourth end face are both provided with at least one second snap hole, the at least two first snap portions are snap-fitted in one-to-one correspondence with the at least two first snap holes, and each of the at least two second snap portions is snap-fitted in one-to-one correspondence with each of the at least two second snap holes.

24. The aerosol generating device of claim 22, wherein the display assembly is a flexible display, wherein an outer surface of the second housing is provided with a mounting groove extending along the circumferential direction of the second housing, and a groove wall surface of the mounting groove comprises the three third side walls, wherein the display assembly is fixed in the mounting groove and covers at least two of the three third side walls, wherein, along the height direction of the second housing, the display assembly has a first edge and a second edge opposite to each other, and wherein a minimum vertical height between the first edge and the second edge is h1, a maximum vertical height between the first edge and the second edge is h2, and a vertical height between the third end face and the fourth end face is h3, and wherein $0.5h3 \leq h1 \leq 0.9h3$, and $0.5h3 \leq h2 \leq 0.9h3$.

25. The aerosol generating device of claim 22, wherein the display assembly is a flexible display, wherein an outer surface of the second housing is provided with a mounting groove extending along the circumferential direction of the second housing, and a groove wall surface of the mounting groove comprises the three third side walls, wherein the display assembly is fixed in the mounting groove and covers at least two of the three third side walls, wherein the display assembly comprises: a display diaphragm made of a flexible material and a flexible printed circuit board with circuit traces, wherein the display assembly comprises a plurality of light-emitting elements arranged on a first side of the flexible printed circuit board, the plurality of light-emitting elements being electrically connected to the circuit traces, wherein a second side of the flexible printed circuit board facing away from the plurality of light-emitting elements is connected to the second housing and covers the three third side walls, wherein the circuit traces are electrically connected to the control circuit board, wherein the display diaphragm is fixedly connected to the first side of the flexible printed circuit board and covers each of the plurality of light-emitting elements, the display diaphragm has a plurality of light transmitting regions for light emitted by the plurality of light-emitting elements to pass through, and a region of the display diaphragm other than the plurality of light transmitting regions is a light shielding region.

26. The aerosol generating device of claim 25, wherein a gap between an inner surface of the protective shell and the display diaphragm has a size in a range from 0.1 mm to 2 mm.

27. The aerosol generating device of claim 25, wherein the display assembly further comprises a flexible reflective layer and a flexible light-shielding sheet, the display diaphragm, the flexible light-shielding sheet, the flexible reflective layer and the flexible printed circuit board are set up in a sequential layer stack, wherein each of the plurality of light-emitting elements is disposed revealingly from the flexible reflective layer, and wherein the flexible light-shielding sheet is provided with a plurality of light transmission holes, at least one light-emitting element is disposed within each light transmission hole, and each light transmitting region corresponds to at least one light transmission hole.

28. The aerosol generating device of claim 25, wherein one side surface of the flexible printed circuit board provided with the plurality of light- emitting elements has a first installation area and a second installation area that are interconnected with each other, and the first installation area has a larger area than the second installation area, wherein the second installation area is exposedly disposed at an edge position of the display assembly, and the plurality of light-emitting elements are fixed within the first installation area, and wherein at least one of a current input interface, a current drive element, or a plurality of metal test points that are electrically connected to the circuit traces is disposed in the second installation area.

29. The aerosol generating device of claim 28, wherein the display assembly further comprises a reinforcement sheet made of a rigid material, and the reinforcement sheet is secured to a side of the flexible printed circuit board that is backed to the second installation area.

* * * * *